(12) United States Patent
Hayashi et al.

(10) Patent No.: US 8,683,208 B2
(45) Date of Patent: Mar. 25, 2014

(54) INFORMATION PROCESSING DEVICE, PROGRAM DEVELOPING DEVICE, PROGRAM VERIFYING METHOD, AND PROGRAM PRODUCT

(75) Inventors: Ryotaro Hayashi, Tokyo (JP); Mikio Hashimoto, Tokyo (JP); Hiroyoshi Haruki, Tokyo (JP); Yurie Fujimatsu, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 189 days.

(21) Appl. No.: 13/162,955

(22) Filed: Jun. 17, 2011

(65) Prior Publication Data

US 2011/0296192 A1 Dec. 1, 2011

Related U.S. Application Data

(63) Continuation of application No. PCT/JP2009/066380, filed on Sep. 18, 2009.

(30) Foreign Application Priority Data

Dec. 18, 2008 (JP) ................................ 2008-322907

(51) Int. Cl.
- *G06F 12/14* (2006.01)
- *G06F 21/00* (2013.01)
- *G06F 21/54* (2013.01)
- *G06F 21/53* (2013.01)

(52) U.S. Cl.
CPC ............ *G06F 21/54* (2013.01); *G06F 12/1416* (2013.01); *G06F 21/53* (2013.01)
USPC .......................................... 713/180; 713/164

(58) Field of Classification Search
CPC ............ G06F 12/1416; G06F 12/1418; G06F 12/1458; G06F 21/53; G06F 21/54; G06F 21/6218
See application file for complete search history.

(56) References Cited

U.S. PATENT DOCUMENTS 6,470,450 B1 * 10/2002 Langford et al. ............. 713/182
6,785,820 B1 * 8/2004 Muttik et al. .................. 726/24

(Continued)

FOREIGN PATENT DOCUMENTS

| JP | 2000-267844 | 9/2000 |
|----|-------------|--------|
| JP | 2004-118494 | 4/2004 |

(Continued)

OTHER PUBLICATIONS

International Search Report mailed Dec. 22, 2009 in PCT/JP2009/066380 filed Dec. 18, 2008 (with English Translation).

(Continued)

*Primary Examiner* — Gilberto Barron, Jr.
*Assistant Examiner* — David Le
(74) *Attorney, Agent, or Firm* — Oblon, Spivak, McClelland, Maier & Neustadt, L.L.P.

(57) ABSTRACT

According to one embodiment, an information processing device stores a program list and plural types of security functions each defining therein protection attributes for respective arguments related to input and output of data to be protected, and stores function argument protection attributes and dependency relations each of which is defined by a determinant set and a dependent attribute that satisfy a predetermined condition. The device detects a combination of first and second security functions in which integrity of variables included in a determinant set of one dependency relation in the first security function are verified by the second security function, generates a third security function which adds protection attributes that guarantee integrity to variables included in the dependent attribute of the dependency relation in the first security function when verification of the second security function is successful and which outputs the variables, and updates the function argument protection attribute and the dependency relation concomitantly with an addition of the third security function.

30 Claims, 37 Drawing Sheets

(56) References Cited

U.S. PATENT DOCUMENTS

| | | |
|---|---|---|
| 6,983,374 B2 | 1/2006 | Hashimoto et al. |
| 7,065,215 B2 | 6/2006 | Shirakawa et al. |
| 7,136,488 B2 | 11/2006 | Hashimoto et al. |
| 7,143,436 B2 | 11/2006 | Yamaguchi et al. |
| 7,219,369 B2 | 5/2007 | Hashimoto et al. |
| 7,270,193 B2 | 9/2007 | Hashimoto et al. |
| 7,299,363 B2 | 11/2007 | Yamaguchi et al. |
| 7,424,622 B2 | 9/2008 | Hashimoto et al. |
| 7,568,112 B2 | 7/2009 | Yamaguchi et al. |
| 7,590,869 B2 | 9/2009 | Hashimoto |
| 7,603,566 B2 | 10/2009 | Hashimoto et al. |
| 7,707,645 B2 | 4/2010 | Haruki et al. |
| 7,853,954 B2 | 12/2010 | Haruki et al. |
| 2002/0053024 A1 | 5/2002 | Hashimoto et al. |
| 2003/0033537 A1 | 2/2003 | Fujimoto et al. |
| 2003/0050962 A1* | 3/2003 | Monsen et al. ............... 709/203 |
| 2003/0126458 A1 | 7/2003 | Teramoto et al. |
| 2004/0030911 A1 | 2/2004 | Isozaki et al. |
| 2004/0187019 A1 | 9/2004 | Nanki et al. |
| 2005/0289397 A1 | 12/2005 | Haruki et al. |
| 2007/0050619 A1 | 3/2007 | Miyamori et al. |
| 2008/0034010 A1* | 2/2008 | Quan et al. .................... 707/201 |
| 2009/0138729 A1 | 5/2009 | Hashimoto et al. |

FOREIGN PATENT DOCUMENTS

| | | |
|---|---|---|
| JP | 2004-240536 | 8/2004 |
| JP | 2005-4301 | 1/2005 |
| JP | 2009-129206 | 6/2009 |

OTHER PUBLICATIONS

International Written Opinion mailed Dec. 22, 2009 in PCT/JP2009/06638 filed Dec. 18, 2008.

Ryotaro Hayashi et al., "Secure Software Development Environment DFITS (Data Flow Isolation Technology for Security)", Information Processing Society of Japan Kenkyu Hokoku, vol. 2009, No. 20, IPSJ SIG Technical Reports, Feb. 26, 2009, 12 pages.

Aslan Askarov et al., "Cryptographicaly-Masked Flows", Proceedings of the International Static Analysis Symposium, LNCS4134, Aug. 2006, 17 pages.

Mikio Hashimoto et al., "Secure Processor Consistent with Both Foreign Software Protection and User Privacy Protection", Proceedings of Security Protocols Workshop 2004, LNCS3957, 2006, pp. 276-286.

Li Gong, et al., "Reasoning about Belief in Cryptographic Protocols", Proceedings 19990 IEEE Symposium on Research in Security and Privacy, Feb. 11, 1990, 14 pages.

Mikio Hashimoto et al., "Multi-vendor Secure Processor under a Hostile Operating System", vol. 45, No. SIG3(ACS5), Mar. 2004, 10 pages.

* cited by examiner

FIG.3

| NAME OF ATTRIBUTE | MEANING | INTEGRITY | | CONFIDENTIALITY | |
|---|---|---|---|---|---|
| | | FALSIFICATION PREVENTION (MEMORY) | PRESENCE AND ABSENCE OF INTEGRITY (SEMANTIC) | ENCRYPTION (MEMORY) | PRESENCE AND ABSENCE OF CONFIDENTIALITY (SEMANTIC) |
| exposed | UNPROTECTED VARIABLE THIS CAN BE FREELY CHANGED AND REFERRED TO BY EXTERNAL ENTITY | - | × | - | × |
| fixed | VARIABLE OF WHICH THE VALUE IS STORED IN MEMORY AREA WHERE FALSIFICATION IS PREVENTED VALUE OF THIS CAN BE REFERRED TO BY EXTERNAL ENTITY | + | × | +- | × |
| verified | VARIABLE OF WHICH THE VALUE IS STORED IN MEMORY AREA WHERE FALSIFICATION IS PREVENTED AND THE VALUE IS VERIFIED FOR INTEGRITY. VALUE OF THIS CAN BE REFERRED TO BY EXTERNAL ENTITY | + | ○ | +- | × |
| hidden | VARIABLE OF WHICH THE VALUE IS STORED IN MEMORY AREA WHERE ENCRYPTION IS PERFORMED AND THE VALUE IS NOT CHECKED FOR CONFIDENTIALITY. | +- | × | + | × |
| concealed | VARIABLE OF WHICH THE VALUE IS STORED IN MEMORY AREA WHERE ENCRYPTION IS PERFORMED AND THE VALUE DECRYPTED WITH DECRYPTION KEY HAVING CONFIDENTIALITY AND INTEGRITY IS ASSIGNED (INPUT VALUE ITSELF IS NOT VERIFIED). | +- | × | + | ○ |
| confidential | VARIABLE OF WHICH THE VALUE THAT HAS BEEN CHECKED FOR INTEGRITY AND CONFIDENTIALITY IS ASSIGNED | + | ○ | + | ○ |

| LEGEND | |
|---|---|
| ○ | CHECKING FOR INTEGRITY OR CONFIDENTIALITY IS REQUIRED |
| × | CHECKING FOR INTEGRITY OR CONFIDENTIALITY IS UNNECESSARY |
| + | MEMORY PROTECTION FUNCTION IS REQUIRED |
| +- | MEMORY PROTECTION FUNCTION IS AT WILL (OPTIONAL) |
| - | MEMORY PROTECTION FUNCTION IS UNNECESSARY |

FIG.4

| FROM \ TO | exposed | fixed | verified | hidden | concealed | confidential |
|---|---|---|---|---|---|---|
| exposed | ○ | ○ | × | × | × | × |
| fixed | ○ | ○ | × | × | × | × |
| verified | ○ | ○ | ○ | × | × | × |
| hidden | × | × | × | ○ | × | × |
| concealed | × | × | × | × | ○ | × |
| confidential | × | × | × | × | × | ○ |

FIG.5A

| NAME OF SECURITY FUNCTION | SUB CLASSIFICATION | INPUT (FIRST ARGUMENT) | | INPUT KEY VALUE (SECOND ARGUMENT) | | OUTPUT (THIRD ARGUMENT) | |
|---|---|---|---|---|---|---|---|
| | | MEANING | PROTECTION ATTRIBUTE | MEANING | PROTECTION ATTRIBUTE | MEANING | PROTECTION ATTRIBUTE |
| PKEncrypt | PUBLIC KEY ENCRYPTION A | PLAINTEXT A | confidential | PUBLIC KEY | verified | CIPHERTEXT A | verified |
| | PUBLIC KEY ENCRYPTION B | PLAINTEXT B | concealed | PUBLIC KEY | verified | CIPHERTEXT B | exposed |
| SKDecrypt | PUBLIC KEY CIPHERTEXT DECRYPTION A | CIPHERTEXT A | verified | SECRET KEY | confidential | PLAINTEXT A | confidential |
| | PUBLIC KEY CIPHERTEXT DECRYPTION B | CIPHERTEXT B | exposed | SECRET KEY | confidential | PLAINTEXT B | concealed |
| CKEncrypt | COMMON KEY ENCRYPTION A | PLAINTEXT A | confidential | SECRET KEY | confidential | CIPHERTEXT A | verified |
| | COMMON KEY ENCRYPTION B | PLAINTEXT B | concealed | SECRET KEY | confidential | CIPHERTEXT B | exposed |
| CKDecrypt | COMMON KEY DECRYPTION A | CIPHERTEXT A | verified | SECRET KEY | confidential | PLAINTEXT A | confidential |
| | COMMON KEY DECRYPTION B | CIPHERTEXT B | exposed | SECRET KEY | confidential | PLAINTEXT B | concealed |
| Sign | SIGNATURE GENERATION A | INPUT MESSAGE A | confidential | SECRET KEY | confidential | SIGNATURE A | confidential |
| | SIGNATURE GENERATION B | INPUT MESSAGE B | verified | SECRET KEY | confidential | SIGNATURE B | verified |
| MACSign | MAC GENERATION A | INPUT MESSAGE A | confidential | SECRET KEY | confidential | MAC A | confidential |
| | MAC GENERATION B | INPUT MESSAGE B | verified | SECRET KEY | confidential | MAC B | verified |

| NAME OF SECURITY FUNCTION | SUB CLASSIFICATION | INPUT (FIRST ARGUMENT) | | INPUT 2 (SECOND ARGUMENT) | | KEY VALUE (THIRD ARGUMENT) | | OUTPUT (FOURTH ARGUMENT) | | OUTPUT 2 (FIFTH ARGUMENT) | | SUPPLEMENTARY OUTPUT | |
|---|---|---|---|---|---|---|---|---|---|---|---|---|---|
| | | MEANING | PROTECTION ATTRIBUTE | MEANING | PROTECTION ATTRIBUTE | MEANING | PROTECTION ATTRIBUTE | MEANING | PROTECTION ATTRIBUTE | MEANING | PROTECTION ATTRIBUTE | MEANING | PROTECTION ATTRIBUTE |
| PKVerify | SIGNATURE VERIFICATION A | INPUT MESSAGE A | concealed | SIGNATURE A | concealed | PUBLIC KEY | verified | OUTPUT MESSAGE A | confidential | OUTPUT SIGNATURE A | confidential | RESULT | confidential |
| | SIGNATURE VERIFICATION B | INPUT MESSAGE B | exposed | SIGNATURE B | exposed | PUBLIC KEY | verified | OUTPUT MESSAGE B | verified | OUTPUT SIGNATURE B | verified | RESULT | verified |
| | SIGNATURE VERIFICATION C | INPUT MESSAGE C | concealed | SIGNATURE C | exposed | PUBLIC KEY | verified | OUTPUT MESSAGE C | confidential | OUTPUT SIGNATURE C | verified | RESULT | confidential |
| MACVerify | MAC VERIFICATION A | INPUT MESSAGE A | concealed | INPUT MAC A | concealed | SECRET KEY | confidential | OUTPUT MESSAGE A | confidential | OUTPUT MAC A | confidential | RESULT | confidential |
| | MAC VERIFICATION B | INPUT MESSAGE B | exposed | INPUT MAC B | exposed | SECRET KEY | confidential | OUTPUT MESSAGE B | verified | OUTPUT MAC B | verified | RESULT | verified |

| NAME OF SECURITY FUNCTION | SUB CLASSIFICATION | INPUT (FIRST ARGUMENT) | | OUTPUT (SECOND ARGUMENT) | |
|---|---|---|---|---|---|
| | | MEANING | PROTECTION ATTRIBUTE | MEANING | PROTECTION ATTRIBUTE |
| Hash | HASH A | INPUT A | exposed | OUTPUT A | exposed |
| | HASH B | INPUT B | verified | OUTPUT B | verified |
| | HASH C | INPUT C | concealed | OUTPUT C | concealed |
| | HASH D | INPUT D | concealed | OUTPUT D | exposed |
| | HASH E | INPUT E | confidential | OUTPUT E | confidential |
| | HASH F | INPUT F | confidential | OUTPUT F | verified |

FIG.5B

| NAME OF SECURITY FUNCTION | SUB CLASSIFI-CATION | INPUT (FIRST ARGUMENT) | | OUTPUT (SECOND ARGUMENT) | | OUTPUT 2 (THIRD ARGUMENT) | |
|---|---|---|---|---|---|---|---|
| | | MEANING | PROTECTION ATTRIBUTE | MEANING | PROTECTION ATTRIBUTE | MEANING | PROTECTION ATTRIBUTE |
| Hash | KDF A | INPUT A | exposed | OUTPUT 1A | exposed | OUTPUT 2A | exposed |
| | KDF B | INPUT B | verified | OUTPUT 1B | verified | OUTPUT 2B | verified |
| | KDF C | INPUT C | concealed | OUTPUT 1C | concealed | OUTPUT 2C | concealed |
| | KDF D | INPUT D | concealed | OUTPUT 1D | exposed | OUTPUT 2D | exposed |
| | KDF E | INPUT E | confidential | OUTPUT 1E | confidential | OUTPUT 2E | confidential |
| | KDF F | INPUT F | confidential | OUTPUT 1F | verified | OUTPUT 2F | verified |

| NAME OF SECURITY FUNCTION | SUB CLASSIFICATION | OUTPUT (FIRST ARGUMENT) | |
|---|---|---|---|
| | | MEANING | PROTECTION ATTRIBUTE |
| Physical Random | PHYSICAL RANDOM NUMBER A | RANDOM NUMBER A | confidential |
| | PHYSICAL RANDOM NUMBER B | RANDOM NUMBER B | concealed |
| | PHYSICAL RANDOM NUMBER C | RANDOM NUMBER C | verified |

| NAME OF SECURITY FUNCTION | SUB CLASSIFICATION | INPUT (FIRST ARGUMENT) | | OUTPUT (SECOND ARGUMENT) | |
|---|---|---|---|---|---|
| | | MEANING | PROTECTION ATTRIBUTE | MEANING | PROTECTION ATTRIBUTE |
| Let | | INPUT | verified | OUTPUT | exposed |

FIG.8

| NAME | FUNCTION ARGUMENT PROTECTION ATTRIBUTE | FUNCTION |
|---|---|---|
| Input | ALL exposed | STORE DATA TO INPUT BUFFER AND ACQUIRE DATA BY OS API CALL |
| Output | ALL exposed OR ALL verified (OVERLOAD) | STORE DATA TO OUTPUT BUFFER CORRESPONDING TO DESIGNATED SIZE AND CALL OS |

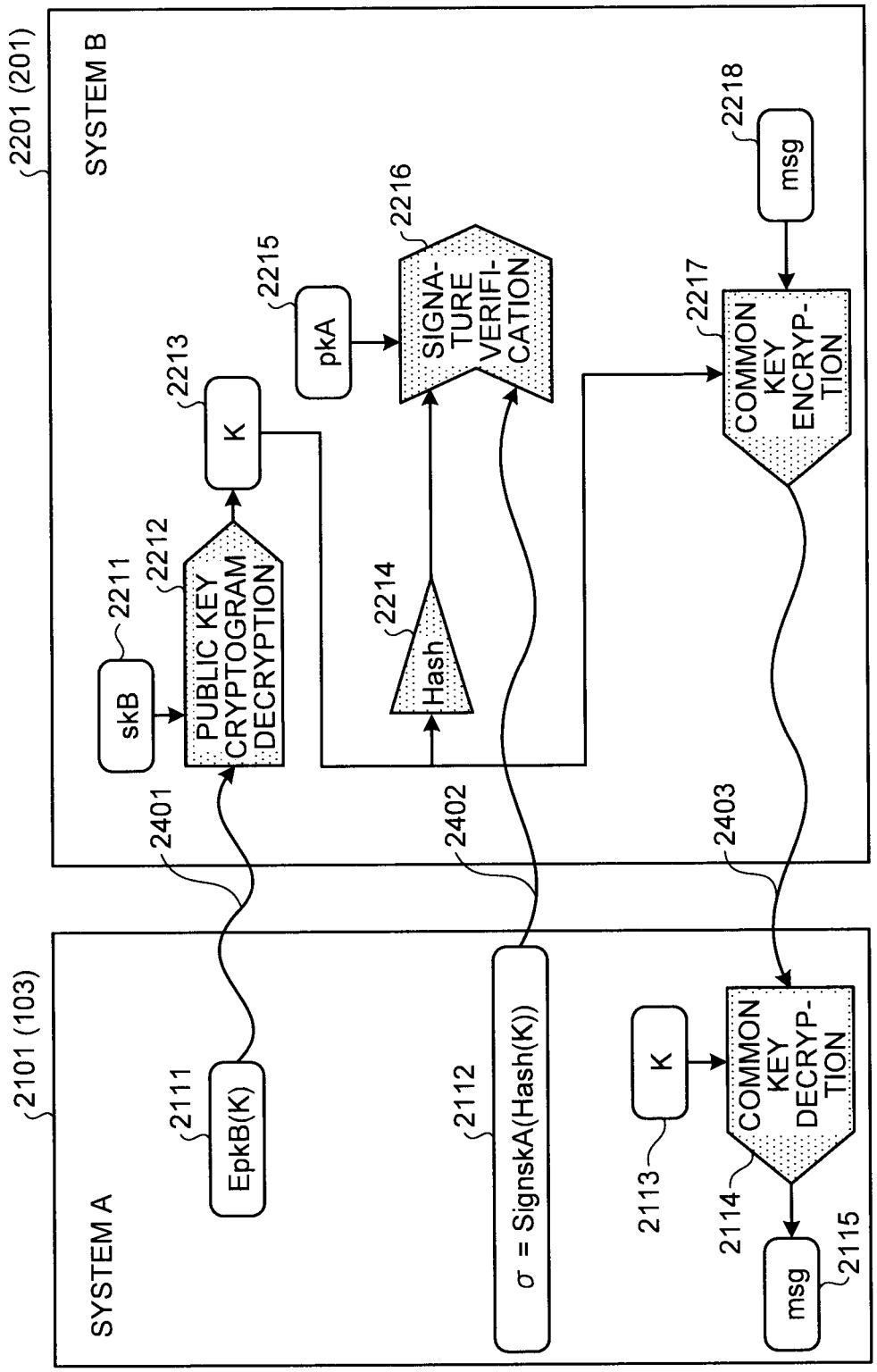

FIG.10

| FUNCTION | SUB CLASSIFICATION | DETERMINANT SET | DEPENDENT ATTRIBUTE |
|---|---|---|---|
| PUBLIC KEY CIPHERTEXT DECRYPTION | - | CIPHERTEXT, SECRET KEY | PLAINTEXT |
| COMMON KEY DECRYPTION | - | CIPHERTEXT, COMMON KEY | PLAINTEXT |
| HASH (1 INPUT 1 OUTPUT) | HASH a | INPUT | OUTPUT |
| | HASH b | OUTPUT | INPUT |
| KDF (1 INPUT 2 OUTPUT) | KDF a | INPUT | OUTPUT 1, OUTPUT 2 |
| | KDF b | OUTPUT 1 | INPUT, OUTPUT 2 |
| | KDF c | OUTPUT 2 | INPUT, OUTPUT 1 |
| MAC VERIFICATION | MAC a | INPUT MESSAGE, MAC | COMMON KEY |
| | MAC b | COMMON KEY | INPUT MESSAGE, MAC |

FIG.11

```
1:     // INITIAL DATA (WITH PROTECTION ATTRIBUTE)
2:     const verified PKVerKey pkA
3:     const confidential SKDecKey skB
4:     const confidential Byte SecretMessage
5:     // PARAMETER
6:     const int EncMsgSize
7:     // VARIABLE DECLARATION
8:     int size
9:     Byte buf[4096]
10:    Cipher_From_A
11:    ComKey
12:    Sign_A
13:    SigMsg_A
14:    Cert_SigMsg_A
15:    Cert_Sign_A
16:    EncTxt
17:
18:    // PROCESSING FLOW
19:    Input(buf, size)
20:    Cipher_From_A = buf
21:    Input(buf, size)
22:    Sign_From_A = buf
23:
24:    SKDecrypt(Cipher_From_A, skB, ComKey)
25:
26:    Hash(ComKey, SigMsg_From_A)
27:
28:    if PKVerify(SigMsg_A, Sign_A, pkA, Cert_SigMsg_A, Cert_Sign_A) then
29:       CKEncrypt(SecretMessage, ComKey, EncTxt)
30:    else
31:       exit
32:
33:    Output(EncTxt, EncMsgsize)
```

FIG.15

| PARTIAL DATA FLOW NUMBER | NAME OF CONSTANT, VARIABLE, AND ARGUMENT TO BE INITIALIZED | INITIAL PROTECTION ATTRIBUTE |
|---|---|---|
| 1 | #2401_Input (#1) | |
| | buf | |
| | Cipher_From_A | |
| | #2212_SKDecrypt (#1) | |
| 2 | #2211_skB | confidential |
| | #2212_SKDecrypt (#2) | |
| 3 | #2212_SKDecrypt (#3) | |
| | ComKey | |
| | #2217_CKEncrypt (#2) | |
| | HashIn | |
| | #2214_Hash (#1) | |
| 4 | #2214_Hash (#2) | |
| | SigMsg_A | |
| | #2216_PKVerify (#1) | |
| 5 | #2215_pkA | verified |
| | #2216_PKVerify (#3) | |
| 6 | #2402_Input (#1) | |
| | buf | |
| | Sign_A | |
| | #2216_PKVerify (#2) | |
| 7 | #2216_PKVerify (#4) | |
| | Cert_SigMsg_A | |
| 8 | #2216_PKVerify (#5) | |
| | Cert_Sign_A | |
| 9 | #2218_SecretMessage | confidential |
| | #2217_CKEncrypt (#1) | |
| 10 | #2217_CKEncrypt (#3) | |
| | EncTxt | |
| | #2403_Output (#1) | |
| 11 | EncMsgSize | |
| | #2403_Output (#2) | |
| 12 | #2401_Input (#2) | |
| | #2402_Input (#2) | |
| | size | |

FIG. 16

| PARTIAL DATA FLOW NUMBER | NAME OF CONSTANT, VARIABLE, AND ARGUMENT TO BE INITIALIZED | INITIAL PROTECTION ATTRIBUTE | AUTOMATIC DETERMINATION 1 | AUTOMATIC DETERMINATION 2 | |
|---|---|---|---|---|---|
| 1 | #2401_Input (#1) | exposed | exposed | exposed | |
|  | buf |  | exposed | exposed | |
|  | Cipher_From_A |  | exposed | exposed | |
|  | #2212_SKDecrypt (#1) | exposed/verified | exposed | exposed | |
| 2 | #2211_skB | confidential | confidential | confidential | |
|  | #2212_SKDecrypt (#2) | confidential | confidential | confidential | |
| 3 | #2212_SKDecrypt (#3) | concealed/confidential | concealed | concealed | MATCHING IS IMPOSSIBLE |
|  | ComKey |  |  |  | MATCHING IS IMPOSSIBLE |
|  | #2217_CKEncrypt (#2) | confidential | confidential | confidential | MATCHING IS IMPOSSIBLE |
|  | #2214_Hash (#1) |  |  |  | MATCHING IS IMPOSSIBLE |
| 4 | #2214_Hash (#2) |  |  |  | |
|  | SigMsg_A |  |  |  | |
|  | #2216_PKVerify (#1) | exposed/concealed | exposed/concealed | exposed/concealed | |
| 5 | #2215_pkA | verified | verified | verified | |
|  | #2216_PKVerify (#3) | verified | verified | verified | |
| 6 | #2402_Input (#1) | exposed | exposed | exposed | |
|  | buf |  |  |  | |
|  | Sign_A |  |  |  | |
|  | #2216_PKVerify (#2) | exposed/concealed | exposed/concealed | exposed/concealed | |
| 7 | #2216_PKVerify (#4) | verified/confidential | verified/confidential | verified/confidential | |
|  | Cert_SigMsg_A |  |  |  | |
| 8 | #2216_PKVerify (#5) | verified/confidential | verified/confidential | verified/confidential | |
|  | Cert_Sign_A |  |  |  | |
| 9 | #2218_SecretMessage | confidential | confidential | confidential | |
|  | #2217_CKEncrypt (#1) | concealed/confidential | concealed/confidential | concealed/confidential | |
| 10 | #2217_CKEncrypt (#3) | exposed/verified | exposed/verified | exposed/verified | |
|  | EncTxt |  |  |  | |
|  | #2403_Output (#1) | exposed/verified | exposed/verified | exposed/verified | |
| 11 | EncMsgSize |  |  |  | |
|  | #2403_Output (#2) | exposed/verified | exposed/verified | exposed/verified | |
| 12 | #2401_Input (#2) | exposed | exposed | exposed | |
|  | #2402_Input (#2) | exposed | exposed | exposed | |
|  | size |  |  |  | |

FIG.18

| Hash | | PKVerify | | CHECKING OF (c) | CHECKING OF (d) | REASON FOR JUDGMENT |
|---|---|---|---|---|---|---|
| DEPENDENCY RELATION | SUBCLAS-SIFICATION | SUBCLAS-SIFICATION | | | | |
| a | * | * | | NG | - | DETERMINANT SET VARIABLE (Hash INPUT) HAS NOT BEEN INPUT TO PKVerify |
| b | A | A | | NG | - | ATTRIBUTES OF Hash OUTPUT (exposed) AND PKVerify INPUT MESSAGE (concealed) DO NOT MATCH |
| | | B | | OK | OK | ATTRIBUTES OF Hash OUTPUT AND PKVerify INPUT MESSAGE MATCH (exposed), AND PKVerify OUTPUT MESSAGE IS LEVELED UP TO verified |
| | | C | | NG | - | ATTRIBUTES OF Hash OUTPUT (exposed) AND PKVerify INPUT MESSAGE (concealed) DO NOT MATCH |
| | B | * | | NG | - | ATTRIBUTES OF Hash OUTPUT (verified) AND PKVerify INPUT MESSAGE (exposed or concealed) DO NOT MATCH |
| | C | A | | OK | OK | ATTRIBUTES OF Hash OUTPUT AND PKVerify INPUT MESSAGE MATCH (concealed), AND PKVerify OUTPUT MESSAGE IS LEVELED UP TO confidential |
| | | B | | NG | - | ATTRIBUTES OF Hash OUTPUT AND PKVerify INPUT MESSAGE MATCH (concealed), AND PKVerify OUTPUT MESSAGE IS LEVELED UP TO confidential |
| | | C | | OK | OK | ATTRIBUTES OF Hash OUTPUT (concealed) AND PKVerify INPUT MESSAGE (exposed) DO NOT MATCH |
| | D | A | | NG | - | ATTRIBUTES OF Hash OUTPUT (exposed) AND PKVerify INPUT MESSAGE (concealed) DO NOT MATCH |
| | | B | | OK | OK | ATTRIBUTES OF Hash OUTPUT AND PKVerify INPUT MESSAGE (exposed) MATCH, AND PKVerify OUTPUT MESSAGE IS LEVELED UP TO verified |
| | | C | | NG | - | ATTRIBUTES OF Hash OUTPUT (exposed) AND PKVerify INPUT MESSAGE (concealed) DO NOT MATCH |
| | E | * | | NG | - | ATTRIBUTES OF Hash OUTPUT (confidential) AND PKVerify INPUT MESSAGE (exposed or concealed) DO NOT MATCH |
| | F | * | | NG | - | ATTRIBUTES OF Hash OUTPUT (verified) AND PKVerify INPUT MESSAGE (exposed or concealed) DO NOT MATCH |

FIG.19

| SUB CLASSIFICATION | INPUT (FIRST ARGUMENT) | | INPUT 2 (SECOND ARGUMENT) | | KEY VALUE (THIRD ARGUMENT) | | OUTPUT 1 (FOURTH ARGUMENT) | |
|---|---|---|---|---|---|---|---|---|
| | NAME OF VARIABLE | PROTECTION ATTRIBUTE | NAME OF VARIABLE | PROTECTION ATTRIBUTE | NAME OF VARIABLE | PROTECTION ATTRIBUTE | NAME OF VARIABLE | PROTECTION ATTRIBUTE |
| MODIFIED PUBLIC KEY SIGNATURE VERIFICATION 1-A | Com_Key | exposed | Sign_A | exposed | pkA | verified | Cert_SigMsg_A | verified |
| MODIFIED PUBLIC KEY SIGNATURE VERIFICATION 1-B | | concealed | | exposed | | verified | | verified |
| MODIFIED PUBLIC KEY SIGNATURE VERIFICATION 1-C | | concealed | | concealed | | verified | | confidential |

| OUTPUT 2 (FIFTH ARGUMENT) | | OUTPUT 3 (SIXTH ARGUMENT) | | SUPPLEMENTARY OUTPUT | | |
|---|---|---|---|---|---|---|
| NAME OF VARIABLE | PROTECTION ATTRIBUTE | NAME OF VARIABLE | PROTECTION ATTRIBUTE | MEANING | PROTECTION ATTRIBUTE | |
| Cert_Sign_A | verified | Cert_ComKey | verified | RESULT | verified | |
| | verified | | confidential | | confidential | |
| | confidential | | confidential | | confidential | |

| HASH | DEPENDENCY RELATION | SUBCLAS- SIFICATION | SIGNATURE VERIFICATION SUBCLAS- SIFICATION |
|---|---|---|---|
| | b | A | B |
| | b | D | B |
| | b | C | A |

FIG.22

| PARTIAL DATA FLOW NUMBER | NAME OF CONSTANT, VARIABLE, AND ARGUMENT TO BE INITIALIZED | INITIAL PROTECTION ATTRIBUTE |
|---|---|---|
| 1 | #2401_Input (#1) | |
| | buf | |
| | Cipher_From_A | |
| | #2212_SKDecrypt (#1) | |
| 2 | #2211_skB | confidential |
| | #2212_SKDecrypt (#2) | |
| 3 | #2212_SKDecrypt (#3) | |
| | ComKey | |
| | #2501_Hash_and_PKVerify (#1) | |
| 4 | #2215_pkA | verified |
| | #2501_Hash_and_PKVerify (#3) | |
| 5 | #2402_Input (#1) | |
| | buf | |
| | Sign_A | |
| | #2501_Hash_and_PKVerify (#2) | |
| 6 | #2501_Hash_and_PKVerify (#4) | |
| | Cert_Comkey | |
| | #2217_CKEncrypt (#2) | |
| 7 | #2218_SecretMessage | confidential |
| | #2217_CKEncrypt (#1) | |
| 8 | #2217_CKEncrypt (#3) | |
| | EncTxt | |
| | #2403_Output (#1) | |
| 9 | EncMsgSize | |
| | #2403_Output (#2) | |
| 10 | #2401_Input (#2) | |
| | #2402_Input (#2) | |
| | size | |

FIG.23

| PARTIAL DATA FLOW NUMBER | NAME OF CONSTANT, VARIABLE, AND ARGUMENT TO BE INITIALIZED | INITIAL PROTECTION ATTRIBUTE | AUTOMATIC DETERMINATION 1 | AUTOMATIC DETERMINATION 2 | AUTOMATIC DETERMINATION 3 | AUTOMATIC DETERMINATION 4 | AUTOMATIC DETERMINATION 5 | AUTOMATIC DETERMINATION 6 | AUTOMATIC DETERMINATION 7 | AUTOMATIC DETERMINATION 8 |
|---|---|---|---|---|---|---|---|---|---|---|
| 1 | #2401_Input (#1) | exposed | exposed | exposed | exposed | exposed | exposed | exposed | exposed | exposed |
|  | buf |  | exposed | exposed | exposed | exposed | exposed | exposed | exposed | exposed |
|  | Cipher_From_A |  | exposed | exposed | exposed | exposed | exposed | exposed | exposed | exposed |
|  | #2212_SKDecrypt (#1) | exposed/ verified | exposed | exposed | exposed | exposed | exposed | exposed | exposed | exposed |
| 2 | #2211_skB | confidential | confidential | confidential | confidential | confidential | confidential | confidential | confidential | confidential |
|  | #2212_SKDecrypt (#2) | confidential | confidential | confidential | confidential | confidential | confidential | confidential | confidential | confidential |
| 3 | #2212_SKDecrypt (#3) | concealed/ confidential | concealed | concealed | concealed | concealed | concealed | concealed | concealed | concealed |
|  | ComKey |  | concealed | concealed | concealed | concealed | concealed | concealed | concealed | concealed |
|  | #2501_Hash_and_PKVerify (#1) | exposed/ concealed | exposed/ concealed | exposed/ concealed | exposed | concealed | concealed | concealed | concealed | concealed |
| 4 | #2215_pkA | verified | verified | verified | verified | verified | verified | verified | verified | verified |
|  | #2501_Hash_and_PKVerify (#3) | verified | verified | verified | verified | verified | verified | verified | verified | verified |
| 5 | #2402_Input (#1) | exposed | exposed | exposed | exposed | exposed | exposed | exposed | exposed | exposed |
|  | buf |  |  |  | exposed |  | exposed | exposed | exposed | exposed |
|  | Sign_A |  |  |  | exposed |  | exposed | exposed | exposed | exposed |
|  | #2501_Hash_and_PKVerify (#2) | exposed/ concealed | exposed/ concealed | exposed/ concealed | exposed | exposed | exposed | exposed | exposed | exposed |
| 6 | #2501_Hash_and_PKVerify (#4) | verified/ confidential | verified/ confidential | confidential | confidential | confidential | confidential | confidential | confidential | confidential |
|  | Cert_ComKey |  |  |  |  | confidential | confidential | confidential | confidential | confidential |
|  | #2217_CKEncrypt (#2) | confidential | confidential | confidential | confidential | confidential | confidential | confidential | confidential | confidential |
| 7 | #2218_SecretMessage | confidential | confidential | confidential | confidential | confidential | confidential | confidential | confidential | confidential |
|  | #2217_CKEncrypt (#1) | concealed/ confidential | concealed/ confidential | concealed/ confidential | concealed/ verified | concealed/ confidential | concealed | confidential | confidential | confidential |
| 8 | #2217_CKEncrypt (#3) | exposed/ verified | exposed/ verified | exposed/ verified | exposed/ verified | exposed/ verified | verified | verified | verified | verified |
|  | EncTxt |  |  |  |  |  |  | verified | verified | verified |
|  | #2403_Output (#1) | exposed/ verified | exposed/ verified | exposed/ verified | exposed/ verified | exposed/ verified | verified | verified | verified | verified |
| 9 | EncMsgSize |  |  |  |  |  |  | verified | verified | verified |
|  | #2403_Output (#2) | exposed/ verified | exposed/ verified | exposed/ verified | exposed/ verified | exposed/ verified | verified | verified | verified | verified |
| 10 | #2401_Input (#2) | exposed | exposed | exposed | exposed | exposed | exposed | exposed | exposed | exposed |
|  | #2402_Input (#2) | exposed | exposed | exposed | exposed | exposed | exposed | exposed | exposed | exposed |
|  | size |  |  |  |  |  |  |  |  | exposed |

FIG.26

| CLASSIFI-CATION | NAME OF SECURITY FUNCTION | SUB CLASSIFI-CATION | INPUT (FIRST ARGUMENT) | | INPUT 2 (SECOND ARGUMENT) | | INPUT 3 (THIRD ARGUMENT) | | KEY VALUE (FOURTH ARGUMENT) | | OUTPUT 2 (FIFTH ARGUMENT) | | SUPPLEMENTARY OUTPUT | |
|---|---|---|---|---|---|---|---|---|---|---|---|---|---|---|
| | | | NAME OF VARIABLE | PROTEC-TION ATTRIBUTE | NAME OF VARIABLE | PROTEC-TION ATTRIBUTE | NAME OF VARIABLE | PROTEC-TION ATTRIBUTE | NAME OF VARIABLE | PROTEC-TION ATTRIBUTE | NAME OF VARIABLE | PROTEC-TION ATTRIBUTE | MEANING | PROTEC-TION ATTRIBUTE |
| MODIFIED PUBLIC KEY SIGNATURE VERIFICATION | Modified_PKVerify | MODIFIED PUBLIC KEY SIGNATURE VERIFICATION 2-A' | SigMsg_A | capslated_1 | Sign_A | exposed | ComKey | exposed | pkA | verified | Cert_ComKey | verified | RESULT | verified |
| | | MODIFIED PUBLIC KEY SIGNATURE VERIFICATION 2-B' | | capslated_1 | | exposed | | concealed | | verified | | confidential | | confidential |
| | | MODIFIED PUBLIC KEY SIGNATURE VERIFICATION 2-C' | | capslated_1 | | concealed | | concealed | | verified | | confidential | | confidential |
| | | MODIFIED PUBLIC KEY SIGNATURE VERIFICATION 2-D' | | capslated_1 | | exposed | | concealed | | verified | | confidential | | confidential |

| CLASSIFICATION | NAME OF SECURITY FUNCTION | SUB CLASSIFICATION | INPUT (FIRST ARGUMENT) | | OUTPUT 2 (SECOND ARGUMENT) | |
|---|---|---|---|---|---|---|
| | | | NAME OF VARIABLE | PROTECTION ATTRIBUTE | NAME OF VARIABLE | PROTECTION ATTRIBUTE |
| HASH | Hash | HASH A' | ComKey | exposed | SigMsg_A | capslated_1 |
| | | HASH B' | | verified | | capslated_1 |
| | | HASH C' | | concealed | | capslated_1 |
| | | HASH D' | | concealed | | capslated_1 |
| | | HASH E' | | confidential | | capslated_1 |
| | | HASH F' | | confidential | | capslated_1 |

FIG. 27

| PARTIAL DATA FLOW NUMBER | NAME OF CONSTANT, VARIABLE, AND ARGUMENT TO BE INITIALIZED | INITIAL PROTECTION ATTRIBUTE | AUTOMATIC DETERMINATION 1 | AUTOMATIC DETERMINATION 2 | AUTOMATIC DETERMINATION 3 | AUTOMATIC DETERMINATION 4 | AUTOMATIC DETERMINATION 5 | AUTOMATIC DETERMINATION 6 | AUTOMATIC DETERMINATION 7 | AUTOMATIC DETERMINATION 8 |
|---|---|---|---|---|---|---|---|---|---|---|
| 1 | #2401_Input (#1) | exposed | exposed | exposed | exposed | exposed | exposed | exposed | exposed | exposed |
|  | buf |  | exposed | exposed | exposed | exposed | exposed | exposed | exposed | exposed |
|  | Cipher_From_A |  | exposed | exposed | exposed | exposed | exposed | exposed | exposed | exposed |
|  | #2212_SKDecrypt (#1) | exposed/verified | exposed | exposed | exposed | exposed | exposed | exposed | exposed | exposed |
| 2 | #2211_skB | confidential | confidential | confidential | confidential | confidential | confidential | confidential | confidential | confidential |
|  | #2212_SKDecrypt (#2) | confidential | confidential | confidential | confidential | confidential | confidential | confidential | confidential | confidential |
| 3 | #2212_SKDecrypt (#3) | concealed/confidential | concealed | concealed | concealed | concealed | concealed | concealed | concealed | concealed |
|  | ComKey |  |  | concealed | concealed | concealed | concealed | concealed | concealed | concealed |
|  | #2601_Modified_PKVerify (#3) | exposed/concealed | exposed/concealed | concealed | concealed | concealed | concealed | concealed | concealed | concealed |
|  | #2214_Hash (#1) |  | concealed | concealed | concealed | concealed | concealed | concealed | concealed | concealed |
| 4 | #2214_Hash (#2) | capslated_1 | capslated_1 | capslated_1 | capslated_1 | capslated_1 | capslated_1 | capslated_1 | capslated_1 | capslated_1 |
|  | SigMsg_A | capslated_1 | capslated_1 | capslated_1 | capslated_1 | capslated_1 | capslated_1 | capslated_1 | capslated_1 | capslated_1 |
|  | #2601_Modified_PKVerify (#1) | capslated_1 | capslated_1 | capslated_1 | capslated_1 | capslated_1 | capslated_1 | capslated_1 | capslated_1 | capslated_1 |
| 5 | #2215_pkA | verified | verified | verified | verified | verified | verified | verified | verified | verified |
|  | #2601_Modified_PKVerify (#4) | verified | verified | verified | verified | verified | verified | verified | verified | verified |
| 6 | #2402_Input (#1) | exposed | exposed | exposed | exposed | exposed | exposed | exposed | exposed | exposed |
|  | buf |  |  |  | exposed | exposed | exposed | exposed | exposed | exposed |
|  | Sign_A |  |  | exposed/concealed | exposed | exposed | exposed | exposed | exposed | exposed |
|  | #2601_Modified_PKVerify (#2) | exposed/concealed | exposed/concealed | exposed/concealed | exposed | exposed | exposed | exposed | exposed | exposed |
| 7 | #2601_Modified_PKVerify (#5) | verified/confidential | verified/confidential | verified/confidential | verified/confidential | confidential | confidential | confidential | confidential | confidential |
|  | Cert_Comkey |  |  |  | confidential | confidential | confidential | confidential | confidential | confidential |
|  | #2217_CKEncrypt (#2) | confidential | confidential | confidential | confidential | confidential | confidential | confidential | confidential | confidential |
| 8 | #2218_SecretMessage | confidential | confidential | confidential | confidential | confidential | confidential | confidential | confidential | confidential |
|  | #2217_CKEncrypt (#1) | concealed/confidential | concealed/confidential | concealed/confidential | concealed/confidential | confidential | confidential | confidential | confidential | confidential |
| 9 | #2217_CKEncrypt (#3) | exposed/verified | exposed/verified | exposed/verified | exposed/verified | verified | verified | verified | verified | verified |
|  | EncTxt |  |  |  |  |  |  | verified | verified | verified |
|  | #2403_Output (#1) | exposed/verified | exposed/verified | exposed/verified | exposed/verified | exposed/verified | verified | verified | verified | verified |
| 10 | EncMsgSize |  |  |  |  |  |  |  | verified | verified |
|  | #2403_Output (#2) | exposed/verified | exposed/verified | exposed/verified | exposed/verified | exposed/verified | verified | verified | verified | verified |
| 11 | #2401_Input (#2) | exposed | exposed | exposed | exposed | exposed | exposed | exposed | exposed | exposed |
|  | #2402_Input (#2) | exposed | exposed | exposed | exposed | exposed | exposed | exposed | exposed | exposed |
|  | Size |  |  |  |  |  |  |  |  | exposed |

```
1:   // INITIAL DATA (WITH PROTECTION ATTRIBUTE)
2:   const verified PKVerKey pkA
3:   const confidential SKDecKey skB
4:   const confidential Byte SecretMessage
5:   // PARAMETER
6:   verified const int EncMsgSize
7:   // VARIABLE DECLARATION
8:   exposed int size
9:   exposed Byte buf[4096]
10:  exposed Cipher_From_A
11:  concealed ComKey
12:  exposed Sign_A
13:  verified EncTxt
14:  // BLACKBOX FUNCTION DEFINITION
15:  int Hash_and_PKVerify(ComKey, Sign_From_A, pkA, Cer_SigMsg_From_A, Cert_ComKey){
16:      SigMsg_From_A
17:      Hash(ComKey, SigMsg_From_A)
18:      if PKVerify(SigMsg_From_A, Sign_From_A, pkA, Cert_SigMsg_From_A) then
19:          Cert_ComKey = Comkey
20:          return 1
21:      else
22:          return 0
23:  }
24:
25:  // PROCESSING FLOW
26:  Input(buf, size)
27:  Cipher_From_A = buf
28:  Input(buf, size)
29:  Sign_From_A = buf
30:
31:  SKDecrypt(Cipher_From_A, skB, ComKey)
32:
33:  Hash(ComKey, SigMsg_From_A)
34:
35:  if Hash_and_PKVerify(ComKey, Sign_From_A, pkA, Cer_SigMsg_From_A, Cert_ComKey) then
36:      CKEncrypt(SecretMessage, Cert_ComKey, EncTxt)
37:  else
38:    exit
39:
40:  Output(EncTxt, EncMsgsize)
```

INFORMATION PROCESSING DEVICE, PROGRAM DEVELOPING DEVICE, PROGRAM VERIFYING METHOD, AND PROGRAM PRODUCT

CROSS-REFERENCE TO RELATED APPLICATIONS

This application is a continuation of PCT international application Ser. No. PCT/JP2009/066380 filed on Sep. 18, 2009 which designates the United States, and which claims the benefit of priority from Japanese Patent Application No. 2008-322907, filed on Dec. 18, 2008; the entire contents of which are incorporated herein by reference.

FIELD

Embodiments described herein relate generally to an information processing device for developing a program conforming to a security protocol and for verifying a program list of the program, a program developing device, a program verifying method, and a program product.

BACKGROUND

In recent years, awareness of computer security has been increased with the popularization of information devices such as a personal computer (PC). For such a reason, in order to securely execute software having data to be protected stored in a computer such as personal information or the like, the data in the software needs to be divided into data to be protected having confidentiality and data not to be protected that can be taken/returned to/from the outside in use so as to be handled separately from each other so that the data to be protected in the software cannot be leaked out. The confidentiality means "ensuring that information is accessible only to those authorized to have access." For example, in a case in which data to be protected is present within a computer, the data is prevented from being needlessly read out through division of areas accessible to users based on privileged mode and normal mode of an operating system (OS). As another example, according to the technology disclosed in JP-A 2004-240536 (KOKAI), misuse of the data to be protected is avoided by disabling reading out of data and instructions in a secure memory area, not by memory protection through mode switching. That is, as for a memory area accessed by a processor, there are a secure area and an insecure area. A sort of security tag indicating that the information is secure is given to information read from the secure area to a register, and a mechanism is provided which can prevent the data from being written into the insecure area. With such a mechanism, the information in the secure area is prevented from being leaked out to the insecure area.

As a method of realizing a memory area (a protected memory area) called a secure area in JP-A 2004-240536 (KOKAI), in addition to a technology based only on access control, there is a technology of combining an encryption mechanism with access control of a memory in a chip as disclosed in "Multi-vendor Secure Processor under a Hostile Operating System," Hashimoto et al., Transactions of information Processing Society of Japan, Vol. 45, No. SIG03. When protection is realized in this way through a combination with the encryption mechanism, the protection is conceptually classified into protection of confidentiality to protect secrets and protection of integrity to prevent falsifications. In some cases, only one type of protection is provided. However, it is also possible to provide protection for both confidentiality and integrity. The integrity refers to correctness and accuracy of information.

The method disclosed in JP-A 2004-240536 (KOKAI) realizes separation of data into data to be protected and data not to be protected. However, taking into consideration the case of implementation of security protocol, mixing of the data to be protected and the data not to be protected is inevitable in calculation of function. For example, in a case of a function performing encryption, the function encrypts a message, which is expected to be secretly exchanged, using a secret key to convert the message into a ciphertext which can be returned to the outside, and then outputs it. The "convert the message into a ciphertext which can be returned to the outside" means "changing the data into data not to be protected." That is, it means "the information of the data to be protected and the secret key is not leaked out" even if the ciphertext is returned to the outside. As for this case, the method of JP-A 2004-240536 (KOKAI) provides a mechanism that cancels the security tag in exceptional cases so that the data to be protected and the data not to be protected can be mixed. However, there is a concern that this mechanism cannot be protected from being misused. In other words, if the security tag is canceled erroneously, the data to be protected is likely to be accidentally returned to the outside.

The technology disclosed in "Cryptographically-masked Flows," Askarov et al., 2006 is a technology of executing data exchange between program portions having different security levels while preventing information having a high level from being leaked to a low level section when some sets of data and program portions having different security levels (protection attributes) are present within a program, by a method called Information Flow Analysis. Specifically, type checking is performed when data is transferred between security levels, and a programmer is explicitly forced to perform a specific operation or an encryption operation is performed when a piece of data with a high level is converted to a low level. Incidentally, the data conversion from a low level to a high level is unconditionally possible. This method allows the data to be protected and the data not to be protected to be mixed by means of a change in security level through an encryption operation.

In the technology of "Multi-vendor Secure Processor under a Hostile Operating System", encryption keys used to output the data to be protected are limited to values that a program statically possesses and derivative values from the statically possessed values. Accordingly, it is prohibited to use a value sent from the outside or a value shared with the outside as an encryption key. This method of using such an encryption key is common practice in the field of security protocol. However, it is difficult to apply the technology of "Multi-vendor Secure Processor under a Hostile Operating System" to general security protocols. Accordingly, for secure implementation of the security protocol, it is required to appropriately determine protection attributes for respective variables of a program.

BRIEF DESCRIPTION OF THE DRAWINGS

FIG. 3 is a diagram of a list of protection attributes according to the embodiment;

FIG. 4 is a diagram illustrating whether assignment is possible between variables to which protection attributes are added according to the embodiment;

FIG. 5A is a diagram illustrating a list of definitions of function argument protection attributes of a security function according to the embodiment;

FIG. 5B is a diagram illustrating a list of definitions of function argument protection attributes of a security function according to the embodiment;

FIG. 8 is a diagram illustrating function argument protection attributes of an input function and an output function that are non-security functions according to the embodiment;

FIG. 9 is a diagram illustrating the procedure of a security protocol according to the embodiment;

FIG. 10 is a diagram illustrating definitions of dependency relations created by a public key ciphertext decryption function, a common key decryption function, a key derivation function, and a MAC verification function that are security functions defined as illustrated in FIGS. 5A and 5B;

FIG. 11 is a diagram illustrating an example of a program list of a pseudo program which describes the procedure of processing performed by a system B in a security protocol illustrated in FIG. 9;

FIG. 15 is a diagram schematically illustrating 12 partial data flows;

FIG. 16 is a diagram illustrating the process of automatic determination with respect to the partial data flows illustrated in FIG. 15;

FIG. 18 is a diagram illustrating an example of the results of selecting and checking each combination of a dependency relation of a function "Hash," a subclassification of the function "Hash," and a subclassification of a function "PKVerify" in the pseudo program illustrated in FIG. 11;

FIG. 19 is a diagram illustrating definitions of a signature verification function "Hash_and_PKVerify" according to the embodiment;

FIG. 22 is a diagram schematically illustrating 10 partial data flows;

FIG. 23 is a diagram illustrating a process of the basic protection attribute determination processing of Step S4 of FIG. 12 which is performed on the partial data flow according to the embodiment;

FIG. 26 is a diagram illustrating definitions of a function "Hash" and a verification function "Modified_PKVerify" according to the embodiment;

FIG. 27 is a diagram illustrating a process of a basic protection attribute determination processing which is performed on the partial data flow according to the embodiment;

FIG. 34 is a diagram illustrating a process of a basic protection attribute determination processing which is performed on the partial data flow according to the embodiment;

FIG. 36 is a diagram illustrating an example of rewrite of a program list of the pseudo program illustrated in FIG. 11.

DETAILED DESCRIPTION

In general, according to one embodiment, an information processing device stores a program list and plural types of security functions each defining therein protection attributes for respective arguments related to input and output of data to be protected, and stores function argument protection attributes and dependency relations each of which is defined by a determinant set and a dependent attribute that satisfy a predetermined condition. The device detects a combination of first and second security functions in which integrity of variables included in a determinant set of one dependency relation in the first security function are verified by the second security function. The device generates a third security function which adds protection attributes that guarantee integrity to variables included in the dependent attribute of the dependency relation in the first security function when verification of the second security function is successful and which outputs the variables. The device updates the function argument protection attribute and the dependency relation concomitantly with an addition of the third security function.

Hereinafter, an information processing device, a program developing device, a program verifying method, and a program according to embodiments will be described with reference to the accompanying drawings.

First Embodiment

Figure 1:
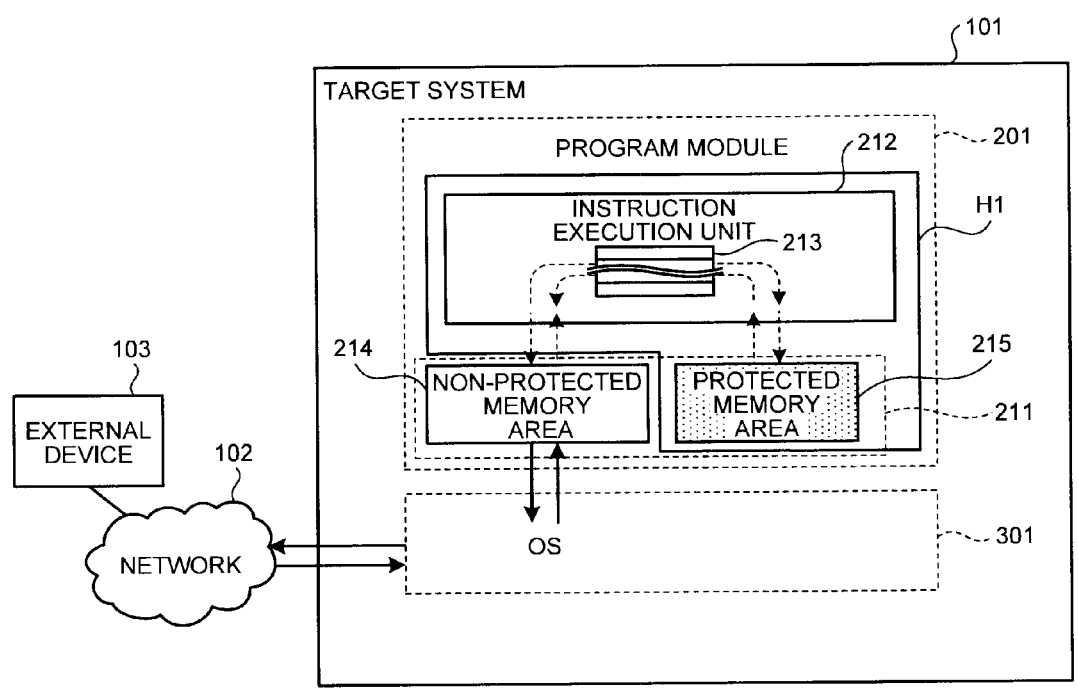
FIG. 1 is a diagram illustrating the software configuration of a target system according to a first embodiment.

Description is first made about specifications of a target system 101 in which a program module is executed according to a security protocol according to this embodiment. FIG. 1 is a diagram illustrating the software configuration of the target system 101. The target system 101 is connected to an external device 103 through a network 102, and includes a program module 201, which is a collection of programs, and an OS 301. The program module 201 includes an instruction execution unit 212 and a data storage memory area 211.

The data storage memory area 211 includes a non-protected memory area 214 and a protected memory area 215. The non-protected memory area 214 is an insecure storage area which is freely accessible. On the other hand, the protected memory area 215 is a secure storage area with a limitation in access such that it is not accessible to specific programs, processes, and the like. The non-protected memory area 214 and the protected memory area 215 may be configured to be formed in a same storage medium, or in separate storage media, respectively. Such exclusive access control with respect to specific programs or processes can be realized by known technologies.

The instruction execution unit 212 is a control unit, such as a central processing unit (CPU), serving as an executer of a program, and includes a register 213 for temporarily storing data during a program execution. The instruction execution unit 212 performs inputting and outputting of data by reading data from and writes data into the non-protected memory area 214. Meanwhile, the OS 301 writes data to be taken to the program module 201 and reads data to be returned from the program module 201. However, access to the non-protected memory area 214 is not necessarily limited to the access by the OS 301 but includes those through Direct Memory Access (DMA) transfer or the like by a peripheral device under the control of the OS 301.

The OS 301 is a control unit, such as CPU which is a subject of execution of basic software of the target system 101. It accesses the non-protected memory area 214 to write input data (for example, data input from the external device 103 through the network 102) and reads output data (for example, data output to the external device 103 through the network 102). The OS 301 can perform reading and writing with respect to the non-protected memory area 214 at an arbitrary timing. However, its access to the protected memory area 215 is limited and its reading and writing therefrom and thereto are prohibited. As described above, the exclusive access mechanism that limits access by the specific programs or processes has been disclosed, for example, in JP-A 2004-240536 (KOKAI) or "Multi-vendor Secure Processor under a Hostile Operating System".

The notable point is that the present embodiment is based on the assumption that the OS 301 steals or falsifies (hereinafter, collectively called attacks) the input data and the output data of the program module 201 stored in the non-protected memory area 214. When the program module 201 communicates with the external device 103 through the network 102, the OS 301 and the non-protected memory area 214 can be regarded as an expansion of the network 102 because stealing or message falsification may occur therein. In such a system, in ensuring security of data processing performed by the program module 201, it is important to appropriately classify data into two types of memories (non-protected memory area 214 and protected memory area 215). In FIG. 1, the range in which stealing or falsification by the OS 301 is prohibited is a range H1 including the instruction execution unit 212 and the protected memory area 215.

In this embodiment, it is assumed that the program module 201 is secure in executing an instruction. This is because it can be realized by protecting the memory area (not shown), in which calls of instructions and functions, recovery addresses, or the like are stored, from the attacks of the OS 301 through the technique disclosed in literatures such as JP-A 2004-240536 (KOKAI), "Cryptographically-masked Flows", and the like. The memory area can be protected by other actual means and thus the configuration of the target system 101 may not be limited to the embodiment illustrated in FIG. 1.

The instruction execution unit 212 of the program module 201 and the OS 301 can be the same control unit. Alternatively, they may be separate control units specific to respective purposes. The non-protected memory area 214 and the protected memory area 215 may be provided within a same storage device. Alternatively, they may be provided in separate storage devices.

Next, an information processing device that automatically determines protection attributes for a function used in a program will be described with an example of the program module 201 operating in the target system 101 described above. First, the hardware configuration of the information processing device is described. The information processing device according to this embodiment includes a control device, such as a central processing unit (CPU) or the like, which controls the entire device, a storage device such as a read only memory (ROM), a random access memory (RAM), or the like, which stores various data and various programs, an external storage device such as a hard disk drive (HDD), a compact disk (CD) drive, or the like, which stores various data and various programs, and a bus that connects them to one another. The hardware configuration is the configuration using a normal computer. The information processing device is connected with a display device that displays information thereon, an input device such as a keyboard or a mouse that receives an instruction as an input from a user, and a communication interface (I/F) that controls communication with the external device in a wired or wireless manner.

Figure 2:
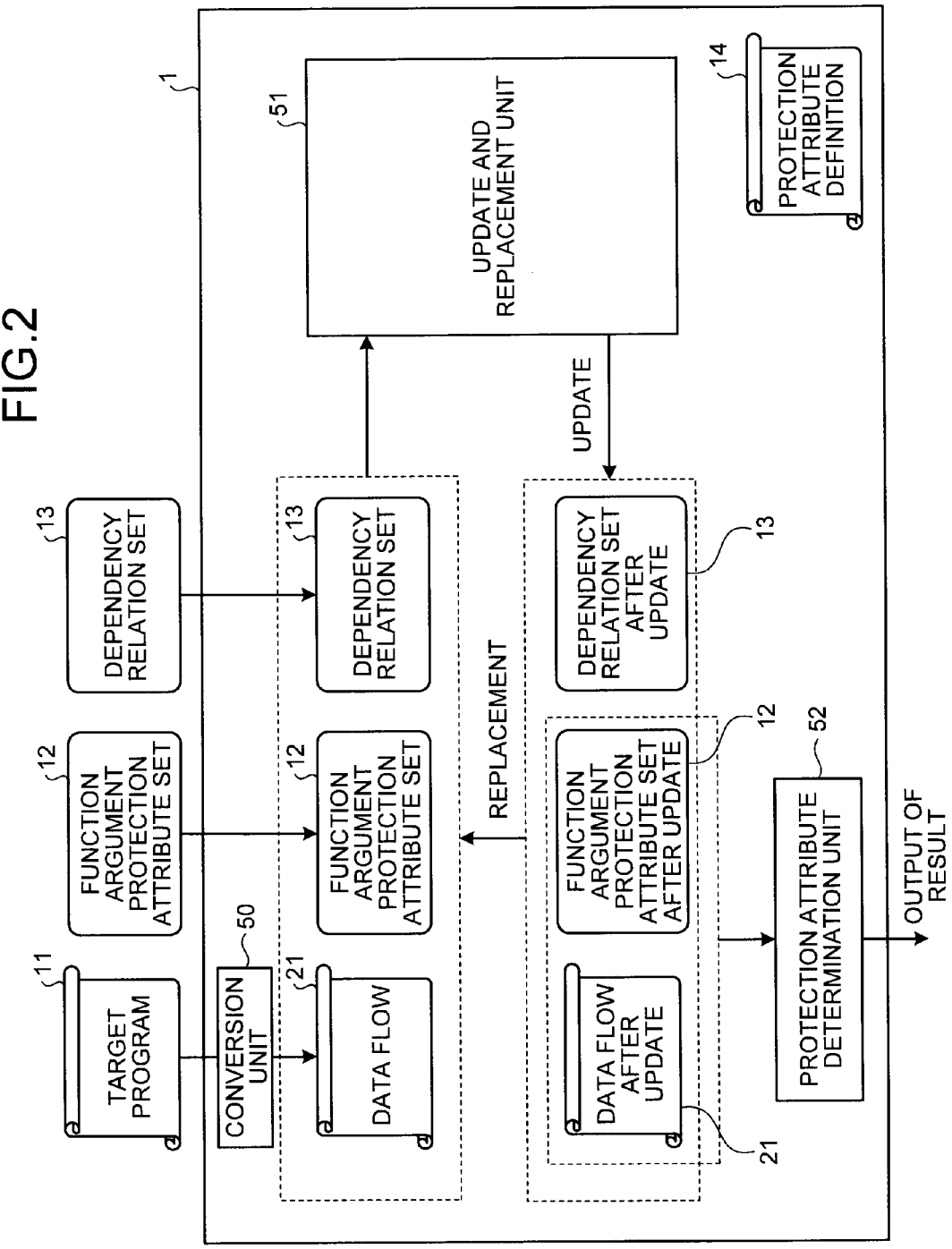
FIG. 2 is a diagram illustrating an example of the functional configuration of an information processing device according to the embodiment.

Various functions in the above-described hardware configuration will be described below. The functions are realized when the CPU provided in the information processing device executes the various programs stored in the storage device or the external storage device. FIG. 2 is a diagram illustrating an example of the functional configuration of the information processing device 1. The information processing device 1 includes a conversion unit 50, an update and replacement unit 51, and a protection attributes determination unit 52. The update and replacement unit 51 and the protection attributes determination unit 52 are units generated on the storage device, such as the RAM when the CPU executes the program. The definitions 14 of the protection attributes are stored in the external storage device, for example, the HDD of the information processing device 1.

The target program 11 is input to the information processing device 1, as a program for which protection attributes of functions therein are automatically determined. The target program 11 is a program described in a human-readable high level language such as C language. In the functions used in the target program 11, the function argument protection attributes and dependency relations thereof are defined. The function argument protection attribute refers to a protection attribute defined based on the presence or absence of a computational one-wayness property between input and output in the computation by the function and the presence or absence of guarantee of integrity. Dependency relation is defined by a pair of a determinant set and a dependent attribute that satisfies the following condition. Each pair satisfies the condition that, when a value of a function argument included in a determinant set out of function arguments is fixed, it is difficult to find two or more kinds of values that can be taken in as a value of an argument included in a dependent attribute. The details of the protection attribute and the dependency relation will be described later. In the program list of the target program 11, not only the protection attributes added to the variables representing the memory area to store data to be protected are described, but also the execution procedure of processing using the security functions is described. The details of the security function will be described later.

The conversion unit 50 parses a program list of the target program 11 to generate a data flow, thereby converting the target program 11 into a data flow 21. The data flow 21 represents associations between respective functions used in a program, arguments and variables taken to the function, and arguments and variables that are returned as the results of computations based on the functions. The update and replacement unit 51 receives the data flow 21 converted from the target program 11 by the conversion unit 50, a function argument protection attribute set 12 that is a collection of function argument protection attributes, and a dependency relation set 13 which is a collection of dependency relations. The update and replacement unit 51 updates the data flow 21 by detecting a pair (A, B) of functions where integrity of a variable included in a determinant set of a certain dependency relation in a certain function (referred to as function A) is verified by another function (referred to as function B) among functions appearing in the data flow 21, and by generating a function (referred to as function C) which adds a protection attribute that guarantees integrity to a variable included in a dependent attribute of the dependency relation in the function A only when the function B is successfully verified and outputs the variable, and adding it to the data flow without changing the function of the target program. The function of the target program 11 refers to an action of processing of which the execution procedure is described in the program list of the target program 11. In addition, the update and replacement unit 51 updates the function argument protection attribute set 12 and the dependency relation set 13 concomitantly with the addition of the function C. The protection attributes determination unit 52 uses the data flow 21, the function argument protection attribute set 12, and the dependency relation set 13 updated by the update and replacement unit 51 to output a variable protection attribute table and a function overload table that store therein the protection attributes uniquely determined for respective variables. The variable protection attribute table and the function overload table will be described in detail in the section "operation" to be described below.

The protection attribute definitions 14 refer to a table defining protection attributes added to variables and arguments (hereinafter, collectively referred to as variables) of a function, the table being stored in an external storage device, for example, an HDD.

Hereinbelow, the protection attributes will be described. The protection attributes are classified roughly in terms of a manner in which protection is performed, into no-protection, confidentiality (only) protection, integrity (only) protection, and both confidentiality and integrity protection. FIG. 3 is a diagram illustrating a list of protection attributes according to the present embodiment. As illustrated in the figure, six types of protection attributes are added to variables. Each protection attribute has two types of mutually orthogonal properties regarding security requirements, integrity and confidentiality: whether a protective means is provided in each memory area and whether a semantic verification is performed.

In regard to the protective means for the memory area, items to be achieved, such as access control and encryption/falsification verification are different in accordance with the protective means. For example, in the protected memory area 215 having an access control mechanism that completely prohibits access from anywhere other than the program of an execution subject, protection is provided both for integrity and confidentiality (denoted by "+" in the table). However, in a case in which access to all memory areas from anywhere except for the program of the execution subject is prohibited, inputting and outputting services provided by the OS 301 cannot be used at all. For such a reason, as illustrated in FIG. 1, the non-protected memory area 214, for which the protection mechanism for integrity and confidentiality is not realized, is provided to enable inputting and outputting.

Incidentally, in a case in which confidentiality protection is achieved by a hardware encryption mechanism during access to a memory, there may be a memory area where only confidentiality is protected. In addition, as for integrity protection, if it is achieved by a hardware MAC generation/verification mechanism, there may be a memory area where only integrity is protected. Naturally, if both are combined, like in the access control, it is possible to realize a protection mechanism for both integrity and confidentiality. The configuration according to the present embodiment can be applied to any of these protective means.

Semantic verification indicates whether or not a value stored in a variable has been checked for one of integrity and confidentiality, or both. For example, even when integrity and confidentiality are protected in a protected memory area storing a certain variable, if a value obtained from the non-protected memory area 214 is assigned to the variable, there is a concern that the value itself stored in the variable is falsified or stolen at any time point during execution of a program. Accordingly, even if it is the variable that can be allocated to the protected memory area 215, it cannot be considered that integrity and confidentiality of the value are guaranteed. Even if the value itself of an assignment source is guaranteed for its integrity, if no protection mechanism for protecting integrity is provided for the memory area in which a variable X of an assignment destination is stored, the value of the variable X may have been rewritten to a different value when the variable X is referenced again. Therefore, it cannot be handled as a value of which integrity is guaranteed. To guarantee integrity and confidentiality of a value of a certain variable, both the assignment to a suitable protected memory area and the semantic verification are required. The protection attributes according to the present embodiment are set based on such idea.

Hereinafter, the case in which information required for integrity is carelessly stored into the non-protected memory area 214 and thus is rewritten by a program other than the target program is expressed as "information is tainted."

Next, types of the protection attribute will be described. "Exposed" is provided for input variables and output variables. In order for an OS to give an input to a program, the OS needs to write a value of an input into a memory area that can be referenced by the program. Further, when the program performs outputting, the program needs to write a value of an output to a memory area that can be referenced by the OS. Since "exposed" is a variable held in a memory area where neither integrity nor confidentially is protected, the OS can freely read and write the variable with this protection attribute. Since the memory area holding a value is not provided with a protection mechanism, semantic integrity and confidentiality of the value are not guaranteed at all. This is because, even if there is a value which has had confidentiality and has been held in a protected memory area where confidentiality has been protected until this point, as soon as the value is copied to the variable with the protection attribute of "exposed," confidentiality of the value is spoiled. In the description below, the protection attribute "exposed" is explicitly described for the purpose of clarification of differences from the variable of which confidentiality is protected (referred to as protected variable). Incidentally, it is also allowed to omit the representation of the protection attribute "exposed" to maintain compatibility with existing programs and to avoid troublesomeness in description.

"Fixed" is a protection attribute referring to a variable which is stored in a memory area where falsification is prevented and which has a value of which semantic integrity and confidentiality are not verified. The variable with the protection attribute "fixed" can be inter-converted with a variable with the protection attribute "exposed" in exceptional cases. When a data structure which has a plurality of words with the protection attribute "exposed" is referenced, there is a possibility that it is falsified while it is being referenced. If such an attack occurs during an integrity verification of a value in particular, the verification ends up meaningless. When it is desired to eliminate such a risk, the falsification of data during the verification can be prevented by copying the entire data structure of those to the variable with the protection attribute "fixed" and then performing the verification.

"Verified" is a protection attribute referring to a variable which is stored in a memory where falsification is prevented and which has a value having no confidentiality but being guaranteed for its integrity. Assignment to the variable with the protection attribute "verified" is limitedly allowed for the computation result of the variables having the same attribute. However, assignment of the value of the variable with the protection attribute "verified" to the variable with the protection attribute "exposed" or the variable with the protection attribute "fixed" is allowed at any time. In a case in which output processing involving the variables with the protection attribute "verified" is not performed, confidentiality protection may be given to the memory area.

"Hidden" is a protection attribute referring to a variable which is stored in an area where confidentiality is protected and which has neither semantic confidentially nor semantic integrity. It is different from the protection attribute "fixed" in the point that assignment of the variable having the protection attribute "hidden" to and from the protection attribute "exposed" or the protection attribute "fixed" is prohibited, and inputting and outputting between the variable having the protection attribute "hidden" are not performed. The variable having the protection attribute "hidden" is never used for an input from the outside. Accordingly, provision of a falsification prevention mechanism for the memory area may not cause a problem.

"Concealed" is a protection attribute referring to a variable which is stored in an area where confidentiality is protected and which has semantic confidentiality but no semantic integrity. The variable with the protection attribute "concealed" is never used for an input from the outside in the similar manner to the protection attribute "hidden." Accordingly, provision of a falsification prevention mechanism for the memory area may not cause a problem.

"Confidential" is a protection attribute referring to a variable which is stored in an area where confidentiality protection and falsification prevention are performed and which is verified in terms of both semantic confidentiality and semantic integrity.

Next, the protection attributes and the types will be described. The protection attributes can be considered almost the same as the variable types in language, though a type in an ordinary language refers to a data type, such as the number of fields or length in many cases. In the example below, a strict match is required regarding protection attribute types. However, to simplify the description, a strict restriction is not placed on data type. According to the embodiments, consistency between data types is secondary. Therefore, the term "protection attribute" is used regarding security. In regard to application of the present embodiment, the protection attributes may also be implemented in the form of data types.

Next, assignment between variables with protection attributes will be described. FIG. 4 is a diagram illustrating whether assignment is possible between variables with protection attributes in a table format. The variables with the protection attribute "confidential," the variables with the protection attribute "concealed," and the variables with the protection attribute "hidden" that have confidentiality are not permitted to be inter-converted or to be assigned to variables other than those with the same protection attribute. As for the variables with the protection attribute "verified" having both memory protection and semantic verification for integrity, values thereof are permitted to be assigned to variables with the protection attribute "fixed" and variables with the protection attribute "exposed." However, assignment of variables with the protection attribute "fixed" and variables with the protection attribute "exposed" to the variables with the protection attribute "verified" are not allowed. Assignment can be freely performed between the protection attributes "fixed" and "exposed."

Next, resolution of data types and protection attributes will be described. As for the protection attributes, the above-described assignment rules between variables are applied. This is a rule that should be strictly followed, independently of the conversion of the data types. In the case of adopting an embodiment in which data types and protection attributes are integrated, it is surely necessary to follow the rule regarding the protection attributes. This rule is particularly problematic in the case in which return values or arguments of a function are overloaded. In the present embodiment, a description is made with an example in which data types and protection attributes are independently described, the resolution of overload of the data types and the resolution of overload of the protection attributes are independently performed, and the resolution of overload of the protection attributes is performed without depending on the overload of the data types. In the case of applying the data types and the protection attributes in the integrated form, the conversion rule of the protection attribute should be cautiously handled. The details of the overloading will be described later.

Next, the function argument protection attribute to be dealt in the present embodiment will be described. The function argument protection attribute defines a restriction on the protection attributes of an input argument and an output argument which are defined for each function. In the following description, a function is classified into a security function and a non-security function (general function), and the function argument protection attribute of each will be described. First, the security function will be described. The security function refers to a function actualizing a so-called security primitive having a computational one-wayness property, such as encryption, decryption, and signature verification. The computational one-wayness property means that forward direction computation is easy to perform but reverse (inverse) direction computation is difficult to perform (within reasonable time). FIGS. 5A and 5B are diagrams illustrating a list of definitions of function argument protection attributes of a security function.

The security function is generally classified into seven classifications. The classifications include public key encryption (encryption, decryption), common key encryption (encryption, decryption), signature (generation, verification), Message Authentication Code (MAC) (generation, verification), hash function, Key Derivation Function (KDF), and random number generation. KDF refers to a function for use in a case of generating two or more key data items sufficient in data length from input variables. In the security function, certain protection attributes are defined for an input variable and an output variable, respectively. As for output of a function, both of a case in which it has a form of an argument, such as "func(input, output)" and a case in which it is regarded as a value returned by a function such as "output=func(input)" are included. In FIG. 5A, for example, when looking into the function argument protection attribute of a public key encryption function, the protection attribute "verified" is necessarily required to input a public key. This is because there is a concern that a ciphertext produced through encryption with a public key of which integrity is not verified can be cracked (decrypted) by an attacker. A plaintext as an input is required to have the protection attribute "confidential" or "concealed" having memory confidentiality so as not to be read out from the outside, and a ciphertext as an output is overloaded in such a manner that the protection attributes "verified" and "exposed" having no memory confidentiality are added thereto so that it can be read from the outside. The term "overloaded" means that function argument protection attribute is defined by a plurality of entries.

In the present embodiment, in a protection attribute determination processing of determining automatically protection attributes, a security function having a plurality of arguments with different protection attributes is limited to a security primitive surely having computational one-wayness property, such as encryption, decryption, signature generation, and signature verification. The mixing of different protection attributes means that the protection attributes of all arguments of the function are not the same. That is, for example, it is the case in which a message with the protection attribute "confidential" and a public key with the protection attribute "verified" are given as input entries and the output has the protection attribute "verified." If it is possible to freely define the function in which protection attributes of arguments are not the same, for example, the case may occur in which the calculation result of the variable (protected variable) of which confidentiality is protected is assigned to "a variable which is not protected" (referred to as "non-protected variable"), and thus information of the originally protected variable is likely to be leaked from the non-protected variable. An object of the mechanism of the present embodiment is to prohibit to perform this kind of calculation freely, and to limit such calculation to certain processing, such as encryption. In a case in which all arguments of a certain function have the same protection attribute, it is not a security function. Although the function is overloaded, if the protection attributes of all arguments are identical in each overloaded definition, it is not a security function and thus it needs not have the computational one-wayness property. The security functions are surely required to have the computational one-wayness property. However, it is noted that calculations with computational one-wayness property need not be defined as a security function. As for the hash function and the KDF, protection attributes for all arguments are the same in a hash C or a KDF C, which is a sub classification in FIGS. 5A and 5B for example, but at the same time there are also overloaded ones such that protection attributes are different between input and output like in a hash D or a KDF D. Accordingly, these are security functions.

Figure 6:
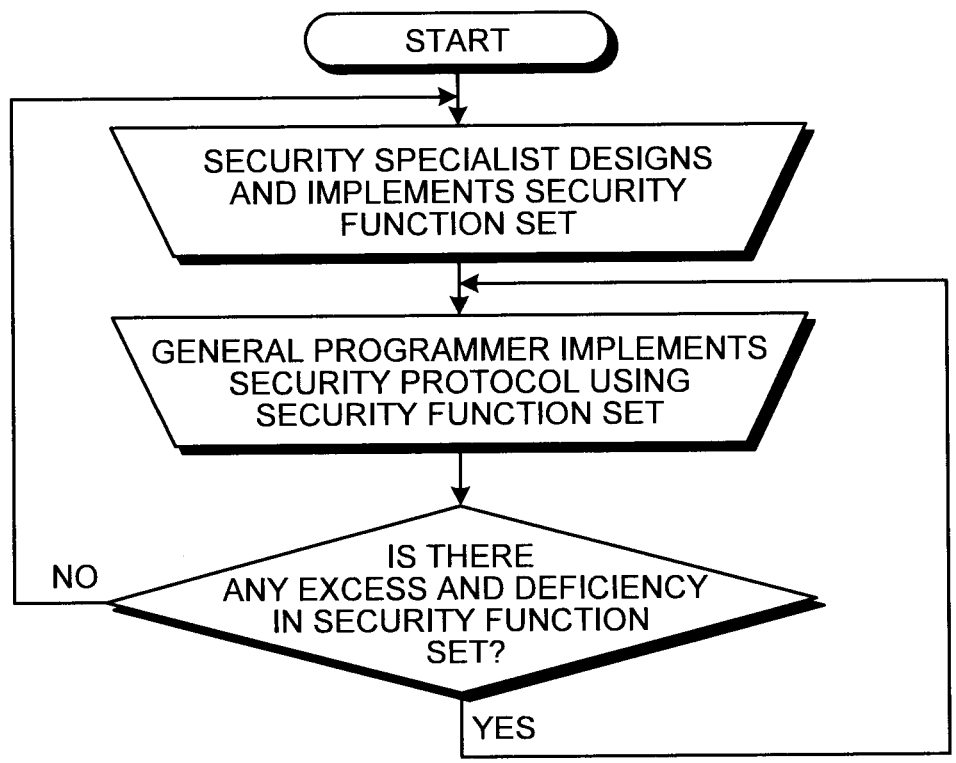
FIG. 6 is a diagram illustrating the work procedure of development of a security function and an application program according to the embodiment.

Development of a security function, that is, definition and implementation of a function argument protection attribute must be performed with more caution than development of ordinary application programs. FIG. 6 is a diagram illustrating the work procedure of development of a security program and an application program. The security program is developed by special programmers who are security professionals skilled in both cryptographic primitive and memory management of a program, and has to be paid full attention not only in terms of correctness of operation but also of whether protection attributes are appropriately defined. After that, a security protocol is implemented using a set of security functions by ordinary programmers. In some cases, cryptographic algorithms used therein vary depending on application programs. In such a case, it is necessary to ask special programmers to add or delete a security function thereto or therefrom for prevention of misuse.

Further, the definition of a function argument protection attribute of a security function varies according to an algorithm used in the primitive. The definition of the function illustrated in FIG. 5A or 5B is performed based on the condition to satisfy the security that is generally required. However, for example, in the case of a weak system, i.e., a public key signature system such as a RSA signature in which a message can be easily guessed from a signature, entries such as a signature verification C of a sub classification in FIG. 5A or 5B have to be deleted. This is because even if this message is present in the protected memory area where the protection attribute "concealed" is protected, if the signature is given the protection attribute "exposed," the message can be recovered due to this signature. In addition, in some specific systems, overloaded definitions can be added.

Figure 7:
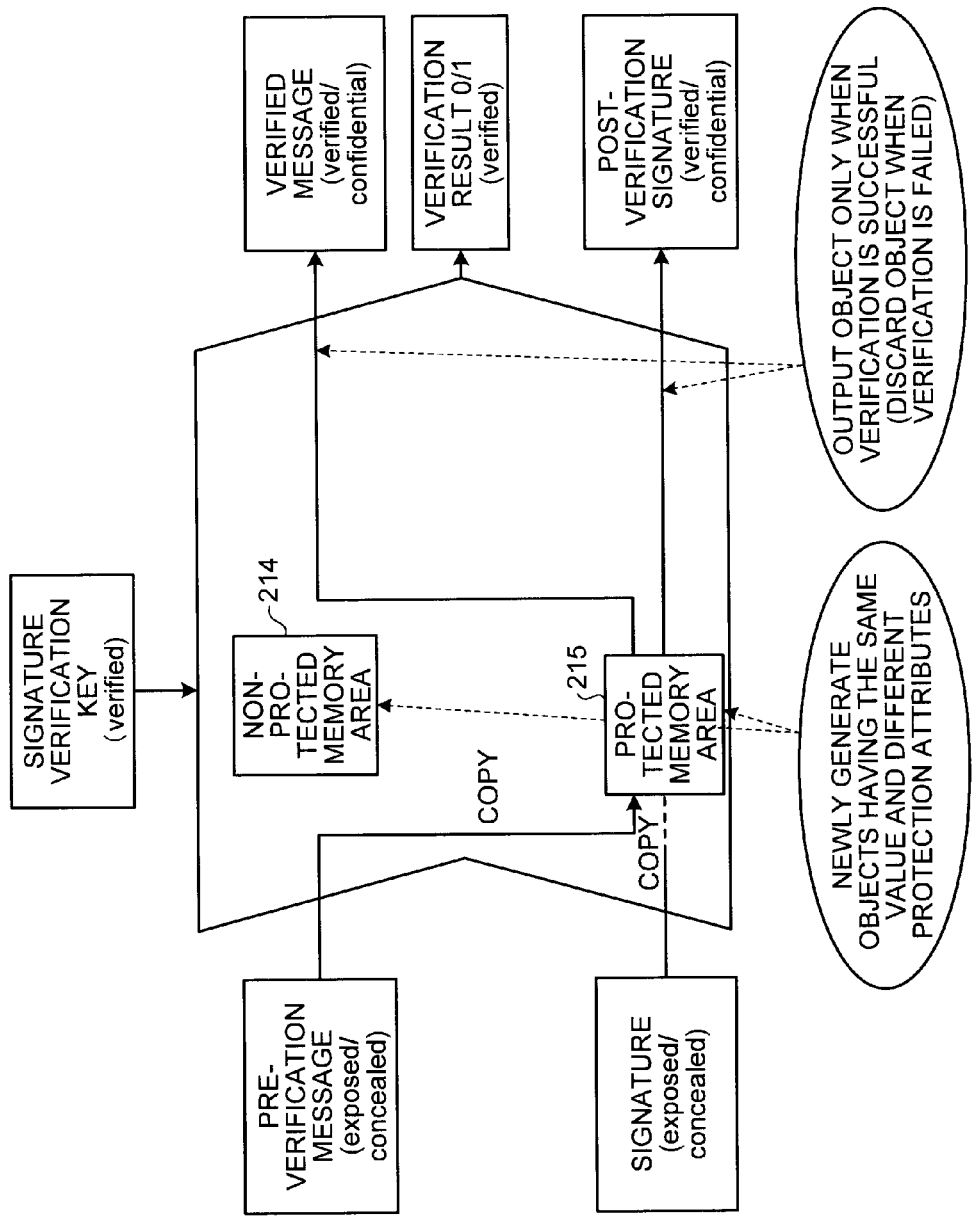
FIG. 7 is a diagram schematically illustrating the procedure of signature authentication according to the embodiment.

Next, among security functions, a signature verification function and a MAC verification function are particularly described. FIG. 7 is a diagram schematically illustrating the procedure of the signature verification according to the present embodiment. In general signature verification, only information on whether or not it is successfully verified is returned. However, in FIG. 7, a memory area of a newly generated variable corresponding to a protection attribute of an output is allocated, a value of a variable of a verification subject is copied to the newly generated variable, and a newly generated variable is returned only when the newly generated variable is successfully verified. The reason is as follows. In a case in which a verification subject variable is located in the non-protected memory area 214, an attacker can rewrite the value of the verification subject variable during verification or right after verification. Accordingly, a value as a verification subject is in advance copied in the protected memory area 215 so that the rewrite can be prevented. In addition, there is another reason. That is, since an output after verification is given a protection attribute different from that of an input, it is possible to avoid an event that the pre-verification variable is erroneously used after verification. Since the pre-verification variable and the post-verification variable have the same value, the program functionally operates even when they are accidently misused. However, the program is vulnerable since it can be attacked as above. The above-described verification method has an effect of preventing such a fault. In addition, regarding the MAC verification function, the verified variable is returned in a similar manner to the signature verification function. Further, as for the encryption function, the decryption function, the signature generation function, and the MAC generation function, since values of an input and an output are different from each other, it is not necessary to take into consideration a caution to avoid erroneous use of the pre-verification variable after verification.

Next, a non-security function will be described. The non-security function refers to a function which does not have computational one-wayness property unlike the security function and in which protection attributes for input and protection attributes for output are the same. FIG. 8 is a diagram illustrating function argument protection attributes of an input function and an output function that are non-security functions according to the present embodiment. An input function "Input" handling inputs via an OS and an output function "Output" handling outputs handle only non-protected variables. All so-called service functions performing exchange of data with an OS handle only non-protected variables. Since an input variable to the function "Input" involves a writing operation by the OS, the input variable is limited to the variable with the protection attribute "exposed," and the output variable is also limited to the variable with the protection variable "exposed." Because an output variable returned by the function "Output" does not require a writing operation, it is overloaded by both the protection attributes "exposed" and "verified." The protection attribute of the output variable is fixed to the same protection attribute as the input variable. Further, functions of, for example, performing conversion of data type are also non-security functions. These do not perform inputting and outputting operations via the OS but can take protected variables as arguments under the condition in which protection attributes of input variables and output variables are all the same. For such a reason, the functions may be defined with different names for each protection attribute, for example, a data type conversion function for a protection attribute "exposed," a data type conversion function for a protection attribute "verified," or the like. Alternatively, it may be possible to provide functions for respective protection attributes through function overloading. Furthermore, calculation of four arithmetic operations, assignment, or the like that do not have computational one-wayness property are non-security functions in which protection attributes of all variables have to be the same. For example, as for the calculation "A=B+C," it is required that protection attributes of A, B, and C be all the same.

The present embodiment is configured in such a manner that taint of information is prevented and protection attributes are securely converted with use of only security functions by limiting the function argument protection attribute, or the like.

Subsequently, the dependency relation employed in the present embodiment will be described. In preparation thereof, the sequence of a security protocol according to the present embodiment will be first described with reference to FIG. 9. The figure illustrates an example in which message transfer using a hybrid encryption is performed between a system A 2101 operating in the external device 103 illustrated in FIG. 1 and a system B 2201 actualized by the program module 201 illustrated in FIG. 1. Here, to be noted is that the system A 2101 represents the entire system including an OS but the system B 2201 which is to be subjected to a protection attribute determination processing of the present embodiment, which will be described later, is limited to a program module (201 of FIG. 1) that is an application program. In the following description, a description is focused on security in implementation of the system B 2201, and an internal operation of the system A 2101 will not be described.

First, the system B 2201 preliminarily acquires a public key (pkA) 2215 of the system A 2101 ahead of execution of a security protocol. The system B 2201 separately verifies integrity of the public key (pkA) 2215 based on a certificate issued by CA but such a process is not illustrated in the drawings. In the program module 201 for actualizing the system B 2201, a secret key (skB) 2211 of system B and a message (msg) 2218 are statically embedded in advance.

The system A 2101 generates a common key (temporary key) (K) 2113 for transferring the message (msg) 2218 and generates a signature 2112 for a hash value of the common key (K) 2113 using the secret key of system A, thereby sending it to the system B 2201 (2402). Further, the system A 2101 sends data 2111 obtained through encryption of the common key (K) 2113 with use of the public key (pkB) of the system B 2201 to the system B 2201 (2401). The system A 2101 separately verifies integrity of the public key (pkB) using the certificate issued by CA, but it is not illustrated in the drawing.

On the other hand, in 2401, if the data 2111 sent from the system A 2101 is received, the system B 2201 acquires the common key (K) using a public key ciphertext decryption function 2212 using the secret key (skB) 2211 of system B. Next, the system B 2201 calculates a hash value using a hash function 2214, and performs signature verification using a signature verification function 2216 with the public key (pkA) 2215 and the signature 2112 received in 2402. In the case in which the signature is successfully verified, confidentiality and integrity of the common key (K) are verified through decryption using the secret key (skB) of the system B 2201 and through the signature verification using the public key (pkA) 2215 of which integrity is verified. This point will be described in detail in the following description. For this reason, the common key (K) 2213 can be used as an encryption key for encrypting the message (msg) 2218 based on a common key encryption system. In addition, the system B 2201 encrypts the message (msg) 2218 based on the common key encryption function 2217 with the common key (k) 2213 to generate a ciphertext, and sends the ciphertext to the system A 2101 (2403). If the ciphertext sent from the system B 2201 is received in 2403, the system A 2101 decrypts the ciphertext based on the decryption function 2114 with use of the common key (K) 2213 to obtain the message (msg) 2115.

Next, the dependency relation in the sequence of a security protocol described above with reference to FIG. 9 will be described. The notable point in the security protocol is guarantee of integrity of the common key (K) based on the signature verification. In the security protocol, the common key (K) 2113 is not directly input to the signature verification function 2216, but a hash value of the common key (K) 2113 is input to the signature verification function 2216. Further, the system A 2101 sends a signature 2112 of a hash value of the common key (K) 2113 to the system B 2201 in 2402. Accordingly, integrity of the hash value of the common key (K) 2113 is directly verified by the signature verification function 2216. Here, it is assumed that the hash function satisfies collision resistance. The collision resistance means a property that it is difficult to find a plurality of input values producing the same output value. This collision resistance is a basic property that the hash function used as an encryption primitive must have. Under such an assumption, it is difficult to find an input value that produces a hash value the same as the hash value of the common key (K) 2113 except for the common key (K) 2113, and it is possible to eliminate a risk that the common key (K) 2113 which is an input is replaced without changing an output of the hash value. Accordingly, if integrity of the hash value is verified, integrity of the common key (K) 2113 which is an input of the hash function 2214 can be also verified. As described above, it can be interpreted such that this security protocol implicitly checks the common key (K) 2113 for integrity, instead of directly verifying the common key (K) 2113.

In other words, in this security protocol, a computational one-to-one relationship is established between an input and an output by the hash function. For such a reason, by verifying integrity of the output, which is one in the relationship, of the hash function, integrity of the input, which is the other in the relationship, of the hash function is also verified. Dependency relation is such a relationship generated by a function. Since such dependency relation is taken into consideration, not only variables directly verified but also variables implicitly verified can be detected and also the integrity thereof can be also taken into consideration. Security specialists may find such a relationship between the hash function and the signature verification function, but it is difficult for programmers having less knowledge about security. Further, there are many protocols in which a case occurs in which such a dependency relation must be taken into consideration. For example, even in PGP (Pretty Good Privacy) or S/MIME (Secure/Multipurpose Internet Mail Extensions) which is a transmission/reception protocol for mail, or SSL (Secure Socket Layer) and TLS (Transport Layer Security) that are normally used in cryptographic communication, similar cases appear. In a conventional method of automatically determining protection attributes using only a protection attribute and a function argument protection attribute, there is a concern that such cases cannot be considered and thus an appropriate protection attribute cannot be determined. According to the present embodiment, it is possible to deal with cases where dependency relation must be considered, and even programmers with little knowledge about security can determine appropriate protection attributes of respective variables.

Here, the dependency relation in the present embodiment is defined in detail. As described above, the dependency relation is provided to guarantee that, by verifying integrity of any one of an input variable and an output variable of a function, integrity of the other variable is verified. The dependency relation is defined by a determinant set and a dependent attribute, and these terms include subsets of input variables and output variables of a function. The determinant set and the dependent attribute of the dependency relation have a property that it is difficult to find two or more kinds as a value of a variable included in the dependent attribute, which make values of variables included in the determinant set identical. To be more specific, the determinant set and the dependent attribute have a property of either of the followings, (a) and (b):

(a) If a value of a variable of the determinant set is determined, a value of a variable of the (corresponding) dependent attribute is uniquely determined;
(b) Even if a value of a variable of the determinant set is fixed, there exist a plurality of values of a variable of the (corresponding) dependent attribute but it is difficult to find a plurality of values of the variable of the (corresponding) dependent attribute.

The terms "determinant set" and "dependent attribute" originate from terms of function dependence used in a relational database of a computer. The function dependence corresponds to the above property (a). That is, if the value of the variable of the determinant set is determined, the value of the variable of the dependent attribute is uniquely determined. The dependency relation according to the present embodiment has not only the property (a) but also the property (b). This can be regarded as the computational one-to-one relation and corresponds to the collision resistance in the hash function or the like. The above-described hash function has such a dependency relation that the output is the determinant set and the input is the dependent attribute.

If the dependency relation is defined as such, it is possible to detect implicit verification of integrity. Specifically, it is guaranteed that, if integrity of a value of a variable of the determinant set of the dependency relation is verified by a certain verification function, integrity of a variable of the dependent attribute corresponding thereto is implicitly verified.

Next, a specific example regarding how the dependency relation is defined will be described. For example, a function "bitwise_negation(X, Y)" that bit-inverts an input bit stream X and outputs the resultant to Y is a function where inputs X and outputs Y are in one-to-one correspondence relationship. Accordingly, the dependency relation is determined such that the dependent attribute is the output Y when the determinant set is the input X, or alternatively, the dependent attribute is the input X when the determinant set is the output Y.

Next, there can be considered a function "plus (A, B, C)" where a value of the addition of A and B is returned to C. For this case, the dependency relation in which the determinant set is the output C and the dependent attribute is inputs A and B cannot be defined. The reason is that a plurality of pairs can be considered as the inputs A and B even if the value of the output C is fixed, and furthermore anybody can easily calculate the plurality of pairs. For example, "A=2 and B=3" or "A=1 and B=4" can be come up if "C=5." Accordingly, even if integrity of the output C has been verified, integrity of the inputs A and B is not considered to be verified. More specifically speaking, let's assume that "A=2, B=3, and C=5" be obtained by the function "plus" during the calculation. At this time, even if integrity of the output C could have been verified by the signature verification or the like, there is a concern that the input is actually falsified to "A=1 and B=4" or the like before the calculation by the function "plus" is performed.

On the other hand, if the value of the input B and the value of the output C are fixed, only one value exists as the value of the input A corresponding thereto. That is, in the case of the function "plus," the dependency relation between two of three variables and the remaining one variable is generated. Specifically, three relationships are defined as the dependency relation: "determinant set: inputs A and B, dependent attribute: output C;" "determinant set: input B and output C, dependent attribute: input A;" and "determinant set: output C and input A, dependent attribute: input B."

FIG. 10 is a diagram illustrating definitions of dependency relations generated by a public key ciphertext decryption function, a common key decryption function, and KDF and MAC verification functions that are parts of the security function defined as illustrated in FIGS. 5A and 5B. In the public key ciphertext decryption function and the common key decryption function, if the ciphertext and the value of the key (the secret key or the common key) are determined, the decryption result is uniquely determined. Accordingly, the determinant set consists of two variables, the ciphertext and the key, and the dependent attribute is the decryption result (plaintext). This dependency relation means that integrity of the decryption result can be verified when integrity of "both" of the ciphertext and the key are verified. This relation is considered in a case in which verification of integrity of the key is completed in advance and integrity of the ciphertext is scheduled to be verified thereafter. In this case, integrity of the decryption result is not considered to be guaranteed until verification of integrity of ciphertext is confirmed. In normal decryption functions, integrity of the key is verified in advance. However, in some cases such as a case in which the key is sent from the outside, like in a hybrid encryption, integrity of the key is unlikely to have been confirmed at the time point of decryption calculation. In such a case, integrity of the ciphertext and the key are verified after decryption, and thereafter integrity of the decryption result is guaranteed at last based on the dependency relation.

In the case of the hash function mentioned in the above example, it has only one input and one output. Even if the value of the output is fixed, the value of the input corresponding to the output is not uniquely determined. This is because there are a plurality of input values that can produce the same output value. However, in the case of the hash function, it is difficult for attackers to find a plurality of input values that produce the same output value as described above because of the collision resistance, unlike the function "plus." Accordingly, even for the hash function, the dependency relation where the output is the determinant set and the input is the dependent attribute can be defined. If the input is determined, the output is uniquely determined. Therefore, there also exists the dependency relation where the input is determinant set and the output is the dependent attribute.

The KDF has two outputs for one input. The KDF is the same as the hash function in the point in which the value of the output is uniquely determined when the value of the input is determined. In addition, even if part of the output, that is, one of two outputs, is fixed, it is difficult to find a plurality of input values that make the part of the output be the fixed value. Accordingly, it is possible to define the dependency relation in which the input is the dependent attribute when part of the output is the determinant set. Furthermore, if the value of the input is determined, the value of the output is uniquely determined. As a result, it is also possible to define the dependency relation in which part of the output is the determinant set and the input and the other part of the output are the dependent attribute.

FIG. 10 illustrates definitions of dependency relations for some security functions. However, even as for other security functions not shown in the figure, the dependency relation for each security function can be defined by asking a security specialist to check whether the security functions have the above-described properties (a) and (b) that should be possessed to define the dependency relation. However, even if they have either of the properties (a) and (b) needed to define the dependency relation, the dependency relation is unlikely to be useful in some cases. For example, when there is a function which always permits only inputs and outputs having integrity, it never happen that integrity of the input variable and the output variable is implicitly verified in later stages. This is because integrity has been guaranteed already. Accordingly, although the dependency relation can be defined, the dependency relation with no usefulness may not be actually defined in terms of the efficiency of algorithm of automatically determining protection attributes.

In addition, although FIG. 10 does not illustrate definitions of dependency relations of non-security functions, the dependency relations of non-security functions can be defined by taking uniqueness into consideration as in the above-described function "plus." Further, although they are not defined in the form of functions, the dependency relations can be similarly taken into consideration in the calculation of operators (for example, "C=A+B"). In addition, if variables are falsified after the dependency relation is generated between the variables, it is apparent that the dependency relation becomes invalid. Accordingly, in the case of generating a dependency relation, it is annotated that the function should be calculated in a state in which falsification prevention processing on each of an input variable and an output variable is performed.

Next, in connection with the security protocol illustrated in FIG. 9, a pseudo program that describes the procedure of processing performed by the system B 2201 will be described with reference to FIG. 11. In the figure, lines 2 to 4 represent a declaration of variables for which initial values are provided. In line 6, a parameter for output is shown. Lines 8 to 16 represent a variable declaration of work variables. In lines 19 to 33, the procedure of the processing is described. Specifically, in line 19, data "Cipher_From_A" (data 2111 of FIG. 9) that is obtained through encryption of the common key (K) is taken to "buf" by the functional "Input" through the OS, and the data size is stored in "size." After that, several processes are performed. Finally, the data is returned by the function "Output" through the OS, and the processing is completed. Here, protection attributes are given to the variables in lines 2 to 4, but protection attributes are not given to the other parameters and variables. In the present embodiment, the protection attributes are automatically determined for the variables to which the protection attributes are not given with rewriting the program as necessary. In addition, in this pseudo program, for many variables, the data type, such as the number or fields or length, is not described. However, in actual practice, the data type needs to be defined and matched. However, as described above, the protection attribute and data type can be independently considered. For this reason, the description is focused on only the protection attribute here. In applying the present embodiment, the protection attribute and the data type may be collectively considered.

Next, the procedure of the protection attribute determination processing performed by the information processing device 1 according to the present embodiment will be described with reference to FIG. 12. In this protection attribute determination processing, the information processing device 1, appropriately determines protection attributes to each variable of the given program, taking into consideration the above-described protection attribute calculation rule or the variable assignment rule, the function argument protection attributes of security functions and non-security functions, and the dependency relations. For this reason, if a target program, which is a program of a processing subject, is given, the information processing device 1 first acquires a function argument protection attribute set regarding the program (Step S1). This function argument protection attribute set is a collection of function argument protection attributes for each function used in the program. Next, the information processing device 1 acquires initial protection attributes of variables, security constants, and the parameter declaration in the program (Step S2). Next, the information processing device 1 generates a data flow by parsing a program list of the program which is a processing subject (Step S3).

Figure 13:
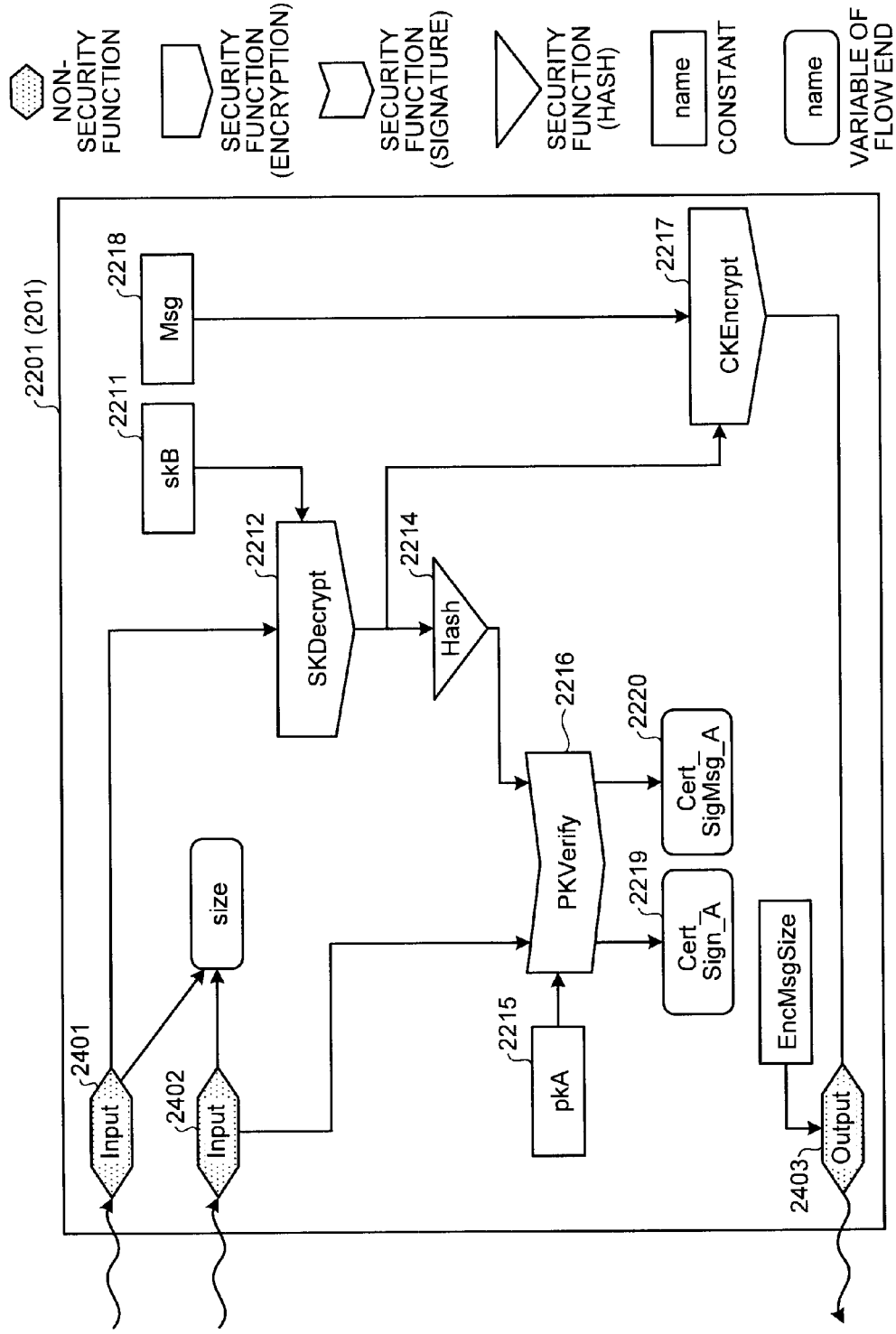
FIG. 13 is a diagram illustrating an example of a data flow of the pseudo program illustrated in FIG. 11.

FIG. 13 is a diagram illustrating an example of a data flow of the pseudo program illustrated in FIG. 11. Since this is almost the same as FIG. 9, functions and variables the same as those of FIG. 9 will be denoted with the same reference numerals. Further, inputs (2401 to 2402 of FIG. 9) from the system A 2101 are represented by functions "Input" 2401 and 2402, respectively. A public key ciphertext decryption function 2212 is represented by a function "SKDecrypt" 2212. A signature verification function 2216 is represented by a function "PKVerify" 2216. A common key encryption function 2217 is represented by a function "CKEncrypt" 2217. An output (2403 of FIG. 9) from the system B 2201 is represented by an output function "Output" 2403. Further, variables (input variables) from the external device 103 illustrated in FIG. 1 are given to the functions "Input" 2401 and 2402 each being a non-security function, and variables (output variables) are returned from the function "Output" 2403 to the external device 103. The information to be protected regarding security includes a secret key (skB) 2211 allocated to the system B 2201 realized by the pseudo program, a message (msg) 2218 and a public key (pkA) 2215, and each of them is denoted by a rectangular symbol. Among security functions, the signature verification function 2216 is denoted by a mountain-shaped symbol, the public key ciphertext decryption function 2212 and the common key encryption function 2217 are denoted by a pentagonal symbol, and the hash function 2214 is denoted by a triangular symbol. In addition, a variable which is a terminal end of the data flow and is not used from then on is denoted by a corner-rounded rectangle.

Figure 12:
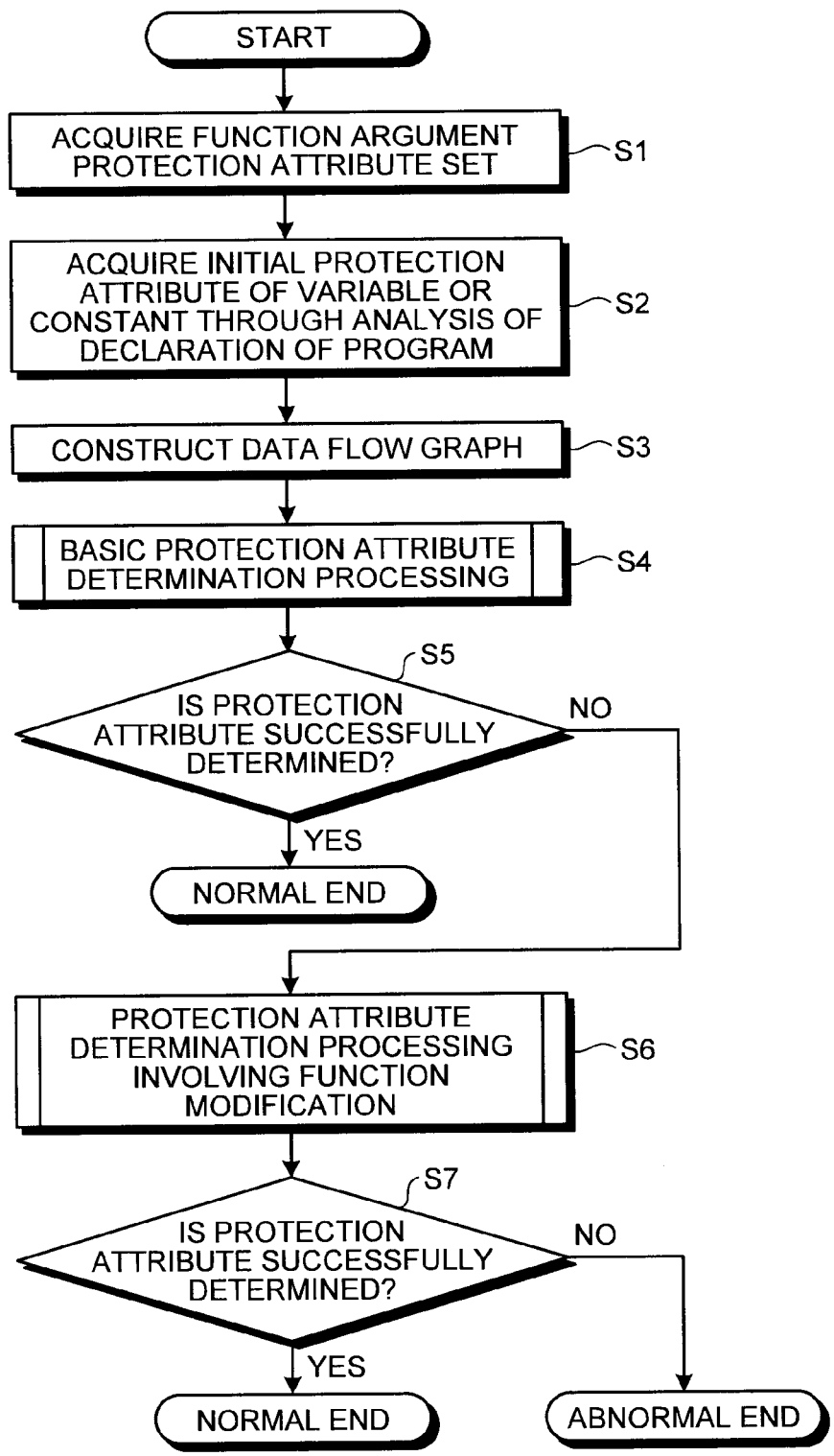
FIG. 12 is a flowchart illustrating the procedure of a protection attribute determination processing performed by the information processing device according to the embodiment.

Returning to the description of FIG. 12, after Step S3, the information processing device 1 first performs a basic protection attribute determination processing of automatically determining protection attributes without taking dependency relations into consideration by using the data flow generated in Step S3 (Step S4). The information processing device 1 completes the processing when the protection attributes are successfully determined through this basic protection attribute determination processing (Yes in Step S5). The information processing device 1 performs a protection attribute determination processing involving a function modification according to the present embodiment where dependency relations are taken into consideration (Step S6) when the basic protection attribute determination processing is failed (No in Step S5). The information processing device 1 completes the processing in a normal manner when the protection attributes are successfully determined (Yes in Step S7) through the protection attribute determination processing involving a function modification. The information processing device 1 terminates the processing, judging as being abnormal when the determination of the protection attributes is failed (No in Step S7). The details of the protection attribute determination processing involving a function modification will be described later.

Here, the basic protection attribute determination processing of Step S4 will be described in detail with reference to FIG. 14. The protection attribute determination processing is almost similar to that disclosed in Japanese Patent Application No. 2007-303765 but will be described here for easier understanding of the present embodiment. The information processing device 1 generates, for each security function, partial data flows divided from the data flow generated in Step S4 of FIG. 12 (Step S10). For example, the information processing device 1 divides a continuous data flow illustrated in FIG. 13 into 12 partial data flows as shown in the table of FIG. 15. FIG. 15 is a diagram schematically illustrating the partial data flows obtained through the division. In the figure, each partial data flow is given a partial data flow number so that it can be uniquely identified. The information processing device 1 may store information regarding the partial data flows as illustrated in FIG. 15 in a table format, for example, in a storage device, such as a RAM, or an external storage device, such as an HDD. Each end point of each partial data flow should be an input, an output, an initial value (non-protected or protected), an argument, or a terminal end variable of a security function. Here, the terminal end variable refers to a variable which is unlikely to be used in any function after it is returned from a certain function. Each partial data flow includes at least two end points as constituent elements. In FIG. 15, with respect to the variables and the functions (security functions, non-security functions) illustrated in FIG. 13, their identification numbers are expressed in the form of "#symbol_variable name." In addition, in the case of functions, an argument is expressed in the form of "#symbol_variable name (#argument number)." This is to clarify differences between the protection attributes of respective arguments. Even for the non-security functions, in order to explicitly show which variable is clearly an input of the program and which variable is an output, they are expressed using argument numbers. When the input and output of the program is viewed from a variable level, even a simple operation such as an operation of performing only inputting cannot be performed if the size of an input buffer or an implicit output such as a parameter is not given to the OS. Therefore, clarification of the arguments is required.

Next, partial data flows divided from a data flow will be described in detail. In a partial data flow with the partial data flow number "1," a value of "buf" that is a first argument of a function "#2401_Input" is assigned to "Cipher_From_A," and is taken as a first argument of a function "#2212_SKDecrypt." Since a function "SKDecrypt" is a security function, the partial data flow with the partial data flow number "1" is divided up to this point. Further, in a partial data flow with the partial data flow number "2," an initial value "#2211_skB" is assigned as a second argument of the function "#2212_SKDecrypt," and this is a partial data flow with two elements. For this case, to a secret key "skB" which is secret information, the protection attribute "confidential" is defined as an initial value. In a partial data flow with the partial data flow number "3," a third argument of the function "#2212_SKDecrypt" is taken as a second argument of the function "#2217_CKEncrypt" and a first argument of a function "#2214_Hash." A partial data flow with the partial data flow number "7" consists of "Cert_SignMsg_A" and a fourth argument of a function "#2216_PKVerify." "Cert_SignMsg_A" is a terminal end variable that is not used after being outputted, and the subsequent data flow is not built.

Figure 14:
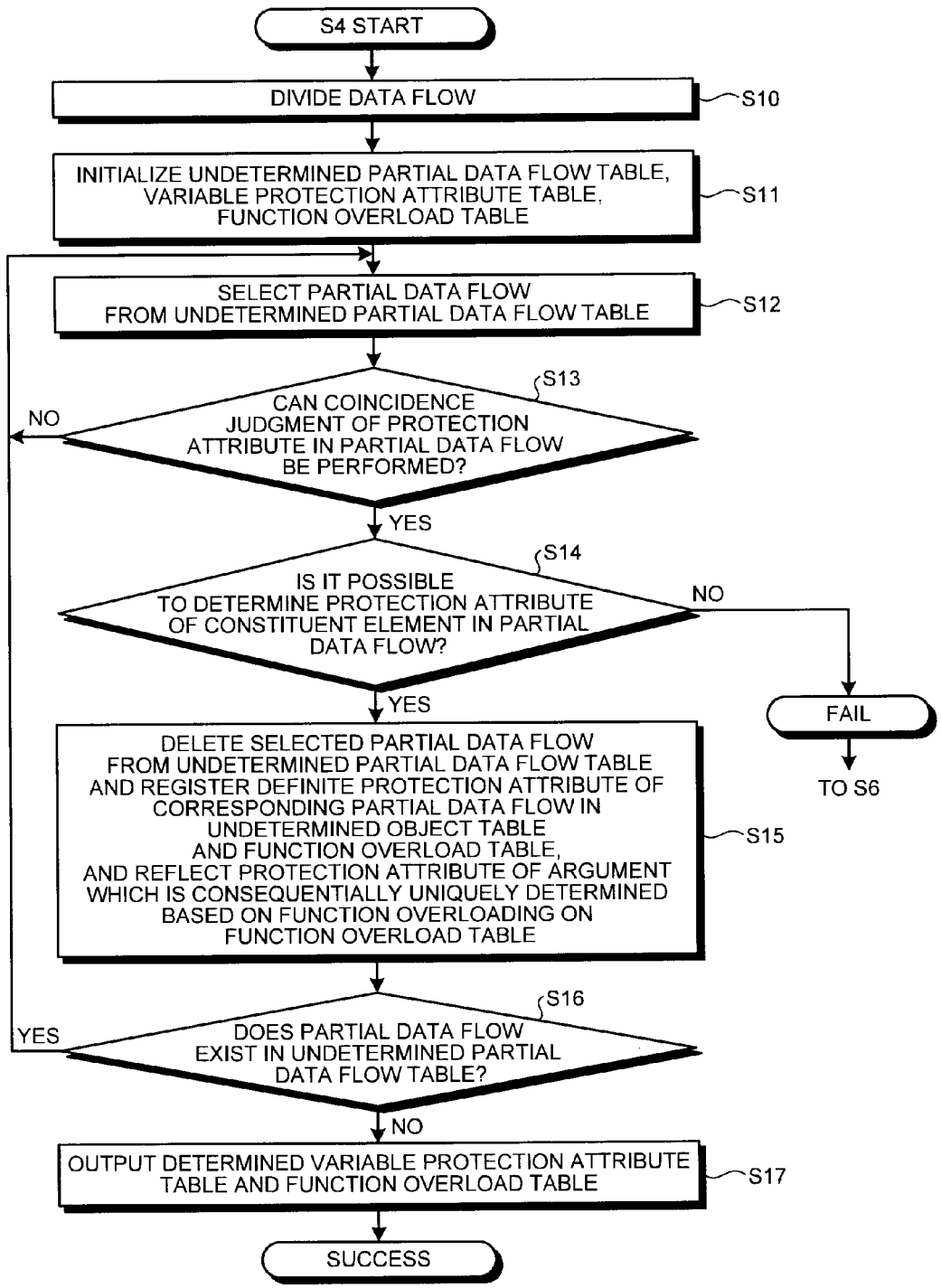
FIG. 14 is a flowchart illustrating the procedure of a basic protection attribute determination processing of Step S4 illustrated in FIG. 12.

Returning to the description of FIG. 14, after Step S10, the information processing device 1 initializes the undetermined partial data flow table, the variable protection attribute table, and the function overload table (Step S11). The undetermined partial data flow table is a table storing partial data flows of which protection attributes are not uniquely determined. It is stored, for example, in a storage device such as a RAM or an external storage device such as an HDD. During the initialization, the information processing device 1 writes all of the partial data flows divided in Step S10 into the undetermined partial data flow table. The variable protection attribute table is a table storing a completion/incompletion state indicating whether or not the protection attribute has been uniquely determined for each variable and each parameter, and is stored, for example, in a storage device such as a RAM or in an external storage device such as an HDD. During the initialization, the information processing device 1 writes initial values of the protection attributes acquired in Step S2 of FIG. 12 as the protection attributes, and the protection attributes of the other variables have not yet been determined. The function overload table is a table storing a completion/incompletion state indicating whether or not the protection attribute has been uniquely determined for each argument, and also storing the determined protection attributes of the arguments, for each function call of each overloaded function in a program which is a processing subject that is input in Step S1 of FIG. 12. The function overload table is stored, for example, in a storage device such as a RAM or an external storage device such as an HDD. Here, the notable point is that the entries of the function overload table are generated for each function call of the overloaded function. For example, in the case in which two public key encryption functions are present in a program, two entries are generated, and each entry is independently handled. During the initialization, the information processing device 1 stores information on each security functions and each non-security functions excluding input functions and output functions, in the function overload table. As for the security functions, the protection attribute of an argument varies from argument to argument. However, as for the non-security functions, all arguments have the same protection attribute. As for the arguments of the security function, there is a case that the protection attribute is determined in advance, like the key, and there is another case that the protection attribute is not determined in advance. The protection attribute of the input functions is necessarily "exposed" without exception, and the protection attribute of the output functions is limited to any of "exposed," "fixed," and "verified."

Next, the information processing device 1 selects a partial data flow to be a following verification subject from the undetermined partial data flow table (Step S12). Subsequently, the information processing device 1 judges whether or not a coincidence judgment can be performed or not, based on the protection attributes of the elements included in the partial data flow (Step S13). "Whether or not a coincidence judgment can be performed" means whether there is at least one variable, argument, or parameter for which the protection attribute is uniquely determined in the data flow. For example, as for the partial data flow with the partial data flow number "1" illustrated in FIG. 15, an argument "#2212_SKDecrypt (#1)" of the security function "SKDecrypt" is overloaded, and the protection attribute is not uniquely determined. However, since the protection attribute of the first argument "#2401_Input(#1)" is limited (determined) to "exposed" uniquely, the coincidence judgment of the protection attribute in the partial data flow can be made by checking whether or not the protection attribute of the variables in the partial data flow can be "exposed." Conversely, in the partial data flow composed of only overloaded functions, the above-described coincidence judgment cannot be made. For example, in the data flow of the partial data flow number "10" illustrated in FIG. 15, the third argument "#2217_CKEncrypt(#3)" of the function "CKEncrypt" and the first argument "#2403_Output (#1)" of the function "Output" both have the protection attribute "verified" or "exposed." Accordingly, at this stage, the coincidence judgment cannot be made. In this case, there is a possibility that the determination of the protection attribute of the partial data flow can be made after determining the protection attribute of any of other partial data flows.

When the coincidence judgment can be performed (Yes in Step S13), the information processing device 1 tries to determine protection attribute (Step S14). Specifically, for the elements that have been uniquely determined among elements of the partial data flow, the information processing device 1 first judges whether all the protection attributes are the same (Step S14). The element that has been uniquely determined refers to a variable to which the protection attribute is clearly given uniquely or refers to an argument of which the protection attribute has been determined uniquely as a result of an overload resolution of the function during analysis of another partial data flow. Further, when the protection attributes of all the elements that have been uniquely determined are the same and a certain argument of an overloaded function, of which the protection attribute thereof has not been determined, is present in the partial data flow, the information processing device 1 judges whether the protection attribute which has been uniquely determined is included in candidates of the protection attribute of the argument of the overloaded function, of which protection attribute has not been determined. When the uniquely determined protection attributes for all elements are the same, or when the protection attributes for all elements that have been uniquely determined are the same and the protection attribute is included in candidates of the protection attributes of arguments of an overloaded function, of which protection attributes are not determined, the processing proceeds to Step S15. In this way, the protection attributes that are uniquely determined for all the elements in the partial data flow are called definite protection attributes of the partial data flow.

For the uniquely determined elements, when at least one protection attribute does not match the others (No in Step S14), it is considered to be failed. As a result, in FIG. 12, the result of the judgment of Step S5 becomes negative, and thus the information processing device 1 performs the protection attribute determination processing involving a function modification which will be described later. On the other hand, in Step S15, the information processing device 1 deletes the relevant partial data flow from the data flow table. Next, for the arguments of the undetermined overloaded function which is included in the relevant data flow, the information processing device 1 registers the protection attribute which is uniquely determined in the partial data flow (referred to as "definite protection attribute") in corresponding fields of the function overload table. Further, as a result that the protection attribute of a single argument is uniquely determined, when the protection attribute of another argument of the same function can be consequentially uniquely determined based on the overloading of the function (this does not necessarily match the definite protection attribute of the partial data flow), the information processing device 1 registers the protection attribute that has been consequentially uniquely determined in a field of the data flow table corresponding to the argument. For example, in the case of the partial data flow of the partial data flow number "1" illustrated in FIG. 15, for the registration of the definite protection attribute, the information processing device 1 registers the protection attribute "exposed" in a field corresponding to a first argument "#2212_SKDecrypt(#1)" of the function "SKDecrypt" of the function overload table. A protection attribute of a third argument is uniquely determined to be "concealed" from the overloading of the function "SKDecrypt," and the information processing device 1 writes this in a field corresponding to "#2212_SKDecrypt(#3)." In this way, the protection attribute of this argument becomes uniquely determined.

After that, the information processing device 1 judges whether or not there remains a partial data flow of which a protection attribute is undetermined in the undetermined partial data flow table (Step S16). When a partial data flow of which a protection attribute is not determined is not present (No in Step S16), the determination of the protection attribute is considered to be successful, and the information processing device 1 outputs the determined variable protection attribute table and the function overload table (Step S17). Thus, the processing is completed. In this case, the result of the judgment becomes positive in FIG. 12, and the information processing device 1 ends the processing in a normal manner. Meanwhile, a partial data flow for which protection attributes are not determined is present (Yes in Step S16), returning to Step S12, the information processing device 1 repeats the above processes. As the processes are repeated more and more, arguments of which the protection attributes are uniquely determined in the function overload table increase in number, and all the fields turn to a uniquely determined state until inspection of all the partial data flows is completed.

Here, operations other than that of the security function correspond to the partial data flows, respectively obtained through division. By performing the above inspection, it is guaranteed that calculations between variables/constants, to which different protection attributes are added, are not performed except for security functions. Accordingly, it is possible to prevent confidential information from being indirectly leaked to attackers or information as a protection subject from being tainted due to information that is falsified by attackers.

Through the basic protection attribute determination processing described as Step S4, protection attributes can be automatically determined in many programs. However, there are also cases in which protection attributes cannot be automatically determined. FIG. 16 is a diagram illustrating the process of an automatic determination for the partial data flows illustrated in FIG. 15. In the figure, a shaded portion represents a partial data flow selected as a processing subject, and a bold face represents determined protection attributes (including consequentially determined ones). In this example, the partial data flow of the partial data flow number "1" is selected first, and the protection attribute thereof is determined to be "exposed." If so, as described above, from the definition of the function argument protection attribute of the public key ciphertext decryption function, a protection attribute of a third argument "#2212_SKDecrypt(#3)" of a function "SKDecrypt" which is a public key ciphertext decryption function in the partial data flow of the partial data flow number "3" is determined to be "concealed." However, a second argument "#2217_CKEncrypt(#2)" of the function "CKEncrypt" which is an encryption function should be given a protection attribute "confidential," from the definition of the function argument protection attribute of the encryption function. Accordingly, the protection attributes cannot match in the partial data flow of the partial data flow number "3." In addition, when the partial data flow of the partial data flow number "3" is selected before the partial data flow of the partial data flow number "1" is selected, a protection attribute of a third argument "#2212_SKDecrypt(#3)" of the function "SKDecrypt" is determined to be "confidential." If so, this time, the protection attribute cannot match in the partial data flow of the partial data flow number "1." In each case, the determination of the protection attribute is failed.

Here, the notable point is that this protocol is secure as described in the dependency relation section but the protection attributes have not yet been determined. In the present embodiment, in light of the dependency relation, one solution is given for such a case. As illustrated in FIG. 12, when the determination of the protection attribute is failed through the basic protection attribute determination processing of Step S4, the information processing device 1 performs, in Step S6, the protection attribute determination processing involving a function modification, in which the dependency relation is considered.

Figure 17:
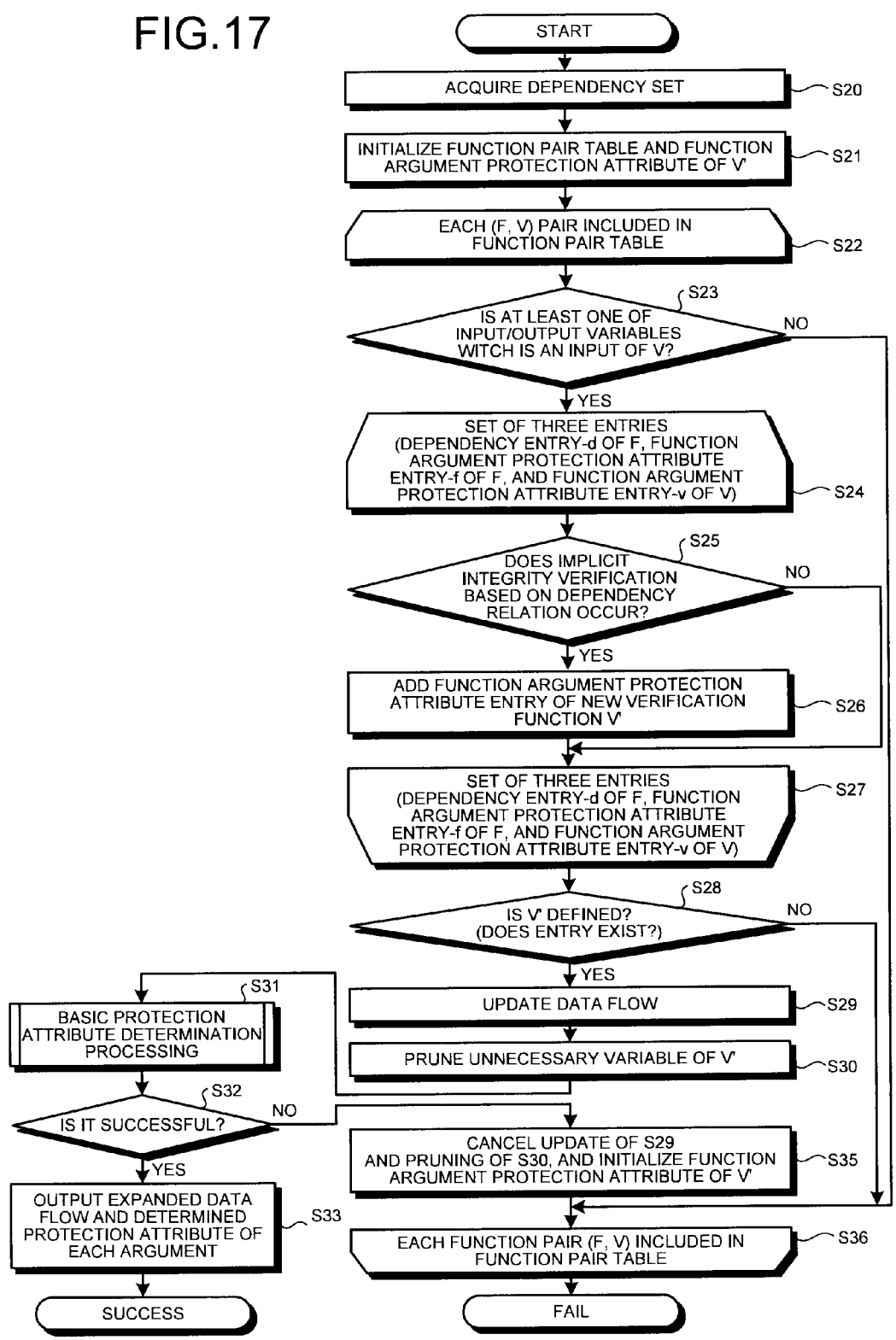
FIG. 17 is a flowchart illustrating the details of the procedure of a protection attribute determination processing involving a function modification according to the embodiment.

Here, the details of the protection attribute determination processing involving a function modification will be described with reference to FIG. 17. The purpose of the protection attribute determination processing involving a function modification is to detect an indirect (implicit) verification of integrity (hereinafter, referred to as implicit integrity verification) while considering dependency relations with respect to the data flow illustrated in FIG. 13 in which protected variables and non-protected variables are not appropriately separated, a corresponding function argument protection attribute set, and a corresponding dependency relation set, and to generate a data flow in which protected variables and non-protected variable are separable, a corresponding function argument protection attribute set, and a corresponding dependency relation set by updating the data flow by modifying a function where the implicit integrity verification occurs. The function modification is realized through composition of functions in the present embodiment.

First, the information processing device 1 acquires a dependency relation set in accordance with functions used in a data flow constructed from a program of a processing subject and dependency relations defined as illustrated in FIG. 10 (Step S20). Next, the information processing device 1 initializes a function pair table and a function argument protection attribute table of a composite function V' constructed by the protection attribute determination processing involving a function modification (Step S21). The function pair table refers to a table in which pairs (hereinafter, referred to as function pairs), each being composed of a function of generating a dependency relation and a verification function of generating an implicit integrity verification, are registered. It is stored, for example, in a storage device such as a RAM and the like or an external storage device such as an HDD and the like. During initialization, the information processing device 1 registers all function pairs illustrated in FIG. 10 in the function pair table where the function pair includes a function (referred to as a dependency relation generation function) of generating a dependency relation and a verification function (signature verification or MAC verification). In the example of the pseudo program illustrated in FIG. 11, there are three candidates of the dependency relation generation function, including a function "SKDecrypt," a function "Hash," and a function "CKEncrypt." The verification function V has only one candidate, a function "PKVerify." For this reason, the information processing device 1 registers three pairs (SKDecrypt, PKVerify), (Hash, PKVerify), (CKEncrypt, PKVerify) as function pairs in the function pair table. A function argument protection attribute table of a composite function V' refers to a table storing function argument protection attributes of the composite function V' and is stored, for example, in a storage device such as a RAM and the like, or an external storage device such as an HDD and the like. During initialization of the composite function V', the information processing device 1 resets all function argument protection attributes in the function argument protection attribute table so that the table becomes a state with no entry.

Step S22 to Step S36 are a loop process. The information processing device 1 performs processing on all function pairs (F, V) included in the function pair table. First, in Step S23, the information processing device 1 judges whether at least one of an input variable or an output variable of a dependency relation generation function F has been input to a verification function V. This means a judgment on whether or not an output of the dependency relation generation function F is given to the verification function V or whether or not an input of the dependency relation generation function F is also given to the verification function V (that is, commonly given as input to both of the dependency relation generation function F and the verification function V). When the determination result is negative (No in Step S23), an implicit integrity verification is not generated by dependency relations. Accordingly, the processing proceeds to a next function pair (F, V). When the judgment of Step S23 is positive (Yes in Step S23), the processing proceeds to Step S24. In the example of the pseudo program illustrated in FIG. 11, among (SKDecrypt, PKVerify), (Hash, PKVerify), (CKEncrypt, PKVerify) as function pairs, only the function pair (Hash, PKVerify) are connected each other on the data flow, and an output of the function "Hash" is given to the function "PKVerify." For such a reason, the judgment result of Step S23 becomes positive for only the function pair (Hash, PKVerify).

Step S24 to Step S27 are a loop process. The information processing device 1 selects an entry included in the dependency relation table of the dependency relation generation function F, an overload of the dependency relation generation function F, and an overload of the verification function V, for the function pair (F, V) of which the judgment result of Step S23 is positive. Then the process of Step S25 and the subsequent processes are performed. First, in Step S25, the information processing device 1 judges whether or not the implicit integrity verification based on dependency relations is generated. The implicit integrity verification based on dependency relations is generated when there exist variables included in the determinant set of the dependency relation such that the variable has no integrity before the verification, and all variables in the determinant set of the dependency relation have integrity after the verification, that is, when the following two conditions are satisfied:

(Condition 1) Among variables of the determinant set of the dependency relation, at least one variable is given to the verification function as input, and as a result it comes to have integrity after verification; and (Condition 2) A variable of the determinant set which has not been given to the verification function has already had integrity.

Further, in order to compose the dependency relation generation function F and the verification function V, the protection attribute of a variable of the determinant has to match between the input/output of the dependency relation generation function F and the input of the verification function V. Accordingly, the following condition needs to be checked:

(Condition 3) The protection attribute of a variable of the determinant set given to the verification function (a variable returned from the dependency relation generation function F and given to the verification function V, or a variable commonly given as input to the dependency relation generation function F and the verification function V) matches.

For the reason above, in Step S25, the information processing device 1 checks for the followings (c) and (d). (c) is to check whether Condition 3 and Condition 1 are satisfied. (d) is to check whether Condition 2 is satisfied.

(c) Among variables of the determinant set of the entries of the dependency relation, whether at least one variable has been input to the verification function V, the protection attributes of the above-mentioned variable defined in the function argument protection attribute of dependency relation generation function F and the verification function V are the same, and the variable is returned with integrity after the verification through the verification function V.

(d) Among variables of the determinant set of the entries of the dependency relation, whether a variable which has not been input to the verification function V has integrity in the definition of the input or the definition of the output of the dependency relation generation function F.

FIG. 18 is a diagram illustrating an example of a result that, in the pseudo program illustrated in FIG. 11, the information processing device 1 has selected each of the dependency relations of the function "Hash," each subclassification of function definitions of the function "Hash," and each subclassification of function definitions of the function "PKVerify," and checked them for each. In this example, since the determinant set has a single variable, Condition 2 is satisfied and thus the function pair passes checking of (d) unconditionally. When a plurality of variables are present in the determinant set like the decryption function, Condition 2 may not be satisfied in some cases.

When the function pair has passed successfully the checking of Step S25 (Yes in Step S25), the generation of the implicit integrity verification based on the dependency relation can be confirmed. Subsequently, in the following step, Step S26, the information processing device 1 composes the dependency relation generation function F and the verification function V of the function pair that has passed the checking of Step S25, and defines a composite function V' resulting from the composition as a new security verification function. By doing so, it is possible to securely modify the security function without asking a security specialist to analyze the data flow. Subsequently, the information processing device 1 registers entries in the function argument protection attribute table for the new security verification function V' to define the function. In the example of FIG. 18, in regard to (dependency relations of Hash, function definition of Hash, function definition of PKVerify), the following four sets pass the checking of Step S25: (b, A, B), (b, D, B), (b, C, A), and (b, C, C). At the completion of Step S26, as a new security verification function V', a signature verification function "Hash_and_PKVerify" is defined. FIG. 19 is a diagram illustrating the definitions of the signature verification function "Hash_and_PKVerify." If processing that will be described below is performed, overloaded entries such as (b, D, B) and (b, C, C) are generated. In the table illustrated in FIG. 19, overloading is made by three entries. Hereinbelow, the definitions of a function made by the information processing device 1 in Step S26 will be described in detail.

First, the information processing device 1 defines an input of the new security verification function V' as being "input variables of the dependency relation generation function F+(input variables of the verification function V−output variables of the dependency relation generation function F)." In addition, the information processing device 1 defines an output of the security verification function V' as being "(output variables of the dependency relation generation function F−input variables of the verification function V)+output variables of the verification function V." Subtraction of the output variable of the dependency relation generation function F from the input of V', and subtraction of the input variable from the output of V' are to eliminate an intermediate variable between the dependency relation generation function F and the verification function V. Since the intermediate variable is buried in the functions, it needs not be defined. In regard with the protection attribute of each variable, it is inherited from function argument protection attribute entry f of the dependency relation generation function F and function argument protection attribute entry v of the verification function V. In the example of the pseudo program illustrated in FIG. 11, variables other than an input variable "Cert_ComKey" and "result" illustrated in FIG. 19 have been defined so far.

Here, the processing is divided depending on whether or not a variable of the dependent attribute is included in output variables of V'. In the case in which a variable of the dependent attribute is included in output variables of V', since the variable is a variable which is implicitly verified for its integrity, the variable needs to be given a protection attribute having integrity at a time point when it is output. For such a reason, the information processing device 1 rewrites and changes the protection attribute of the variable which is inherited from the dependency relation entries f to a protection attribute maintaining (not changing) confidentiality and further having integrity. Conversely, when a variable of the dependent attribute is not present in outputs of V', the variable is included in the input of the dependency relation generation function F. Then, the information processing device 1 adds the copy of the variable to the output of the security verification function V' so that the name of the output (copied) variable is different from the original variable and the output variable is returned from the verification function V with integrity being verified. At this time, the protection attribute of the output variable is the same as the protection attribute of the original variable which is inherited from the dependency relation entries f, and further having integrity. In the example of the pseudo program illustrated in FIG. 11, since it is the case in which a variable of the dependent attribute is not included in output variables of V', the information processing device 1 changes the name of the variable "ComKey" of the dependent attribute to variable "Cert_ComKey" and adds it to the output. At this time, the protection attribute becomes the one changed from the protection attribute ("exposed" or "concealed") of the variable "ComKey" in the input definition of the dependency relation generation function F so as to be a protection attribute having integrity (changed to "verified" from "exposed" or to "confidential" from "concealed").

Finally, in regard to the result which is a supplementary output, the information processing device 1 redefines the protection attribute as "confidential" when at least one having confidentiality is present in the inputs and redefines the protection attribute as "verified" when no one having confidentiality is present in the inputs. In the example of the pseudo program illustrated in FIG. 11, the protection attribute is determined as being "verified" for a case (a modified public key signature verification 1-A of FIG. 19) which does not include any input and output having confidentiality, but determined as being "confidential" for the other cases. By doing so, the information processing device 1 defines a signature verification function "Hash_and_PKVerify" as a new security verification function V' illustrated in FIG. 19.

In the loop process of Step S24 to Step S27, when the security verification function V' is defined (Yes in Step S28), the information processing device 1 updates the data flow to respond thereto (Step S29). The information processing device 1 first deletes the dependency relation generation function F and the verification function V, but instead adds the new security verification function V'. The dependency relations of the security verification function V' are inherited from the dependency relations of the verification function V.

Figure 20:
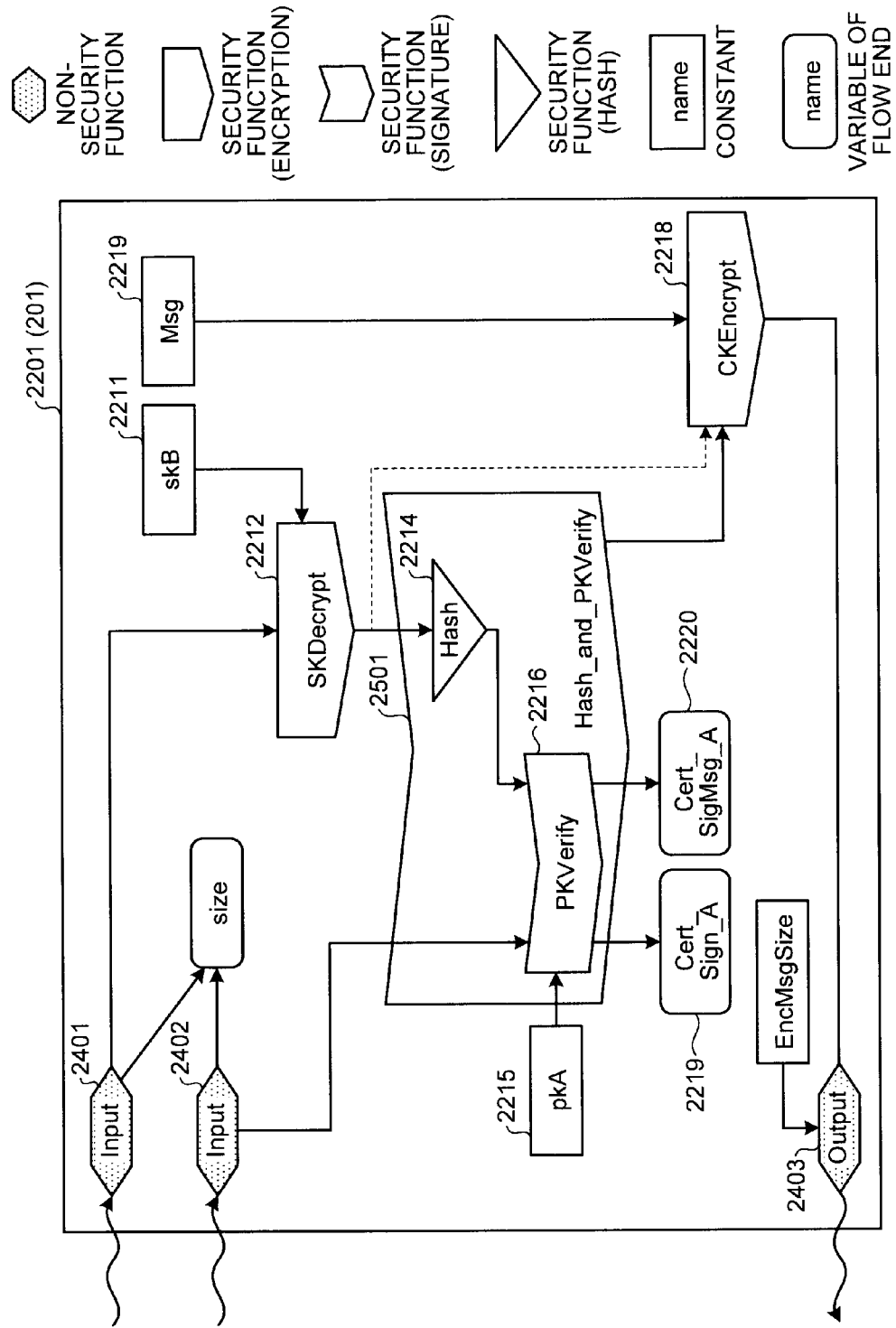
FIG. 20 is a diagram illustrating a modified data flow of Step S29 in the pseudo program illustrated in FIG. 11.

FIG. 20 is a diagram illustrating the data flow updated in Step S29 with respect to the pseudo program illustrated in FIG. 11. In the figure, as the new security verification function V', a function "Hash_and_PKVerify" 2501 has been added. Further, since the function "PKVerify" is a signature verification function, it has no dependency relations. Accordingly, dependency relations of the function "Hash_and_PKVerify" are not defined. Moreover, at this time, when the dependency relation is taken into consideration, a change in argument in the program and the data flow occurs in some cases. Specifically, with respect to the function receiving as an input a variable of the dependent attribute which has not yet been verified for its integrity, the information processing device 1 changes it so as to receive as its input a variable of the dependent attribute which is output from the new security verification function V' and has integrity, after considering the sequence of calculation. In the example of the pseudo program illustrated in FIG. 11, a variable "ComKey" corresponds thereto. When viewing from the program list, since the function "PKVerify" is used earlier than the function "CKEncrypt" in the calculation, the information processing device 1 changes the input of the function "CKEncrypt" from the variable "ComKey" to the variable "Cert_ComKey."

In this way, after the update of the data flow, the information processing device 1 prunes away unnecessary variables of the security verification function V' (Step S30). The pruning refers to deleting variables out of inputs and outputs of the security verification function V' that are not given to or returned from any other functions except for the security verification function V'. With this, it is possible to reduce the number of variables and thus to improve efficiency and security in determination of protection attributes and execution of a program. In FIG. 20, two variables of "Cert_Sign_A" and "Cert_SigMsg_A" that are returned from the Hash_and_Verify and represented by a symbol of a corner-rounded rectangular shape are output from the security verification function V' but they are variables that are not given to anywhere since then. Accordingly, they are targets to be pruned. Here, the notable point is that the variable "Cer_Sign_A," is an output in a state of being verified for its integrity through the security verification function V'. In this way, in the case of the variable which is given as input to the security verification function V' and is then returned as output after being verified for its integrity, the information processing device 1 judges whether or not the pruning is possible by checking whether or not "Sign_A" is input to or output from some dependency relation generation function F, as well as "Cert_Sign_A" are not given to or returned from any other functions except for the security verification function V'. In this case, since a function "Input" is not included in the dependency relation generation function, pruning of "Cert_Sign_A" is possible. Therefore, the information processing device 1 prunes away the two variables of "Cert_SigMsg_A" and "Cert_Sign_A." As a result, the information processing device 1 also deletes the two variables from the output definition of the function "Hash_and_PKVerify" which is the security verification function V' illustrated in FIG. 19.

Figure 21:
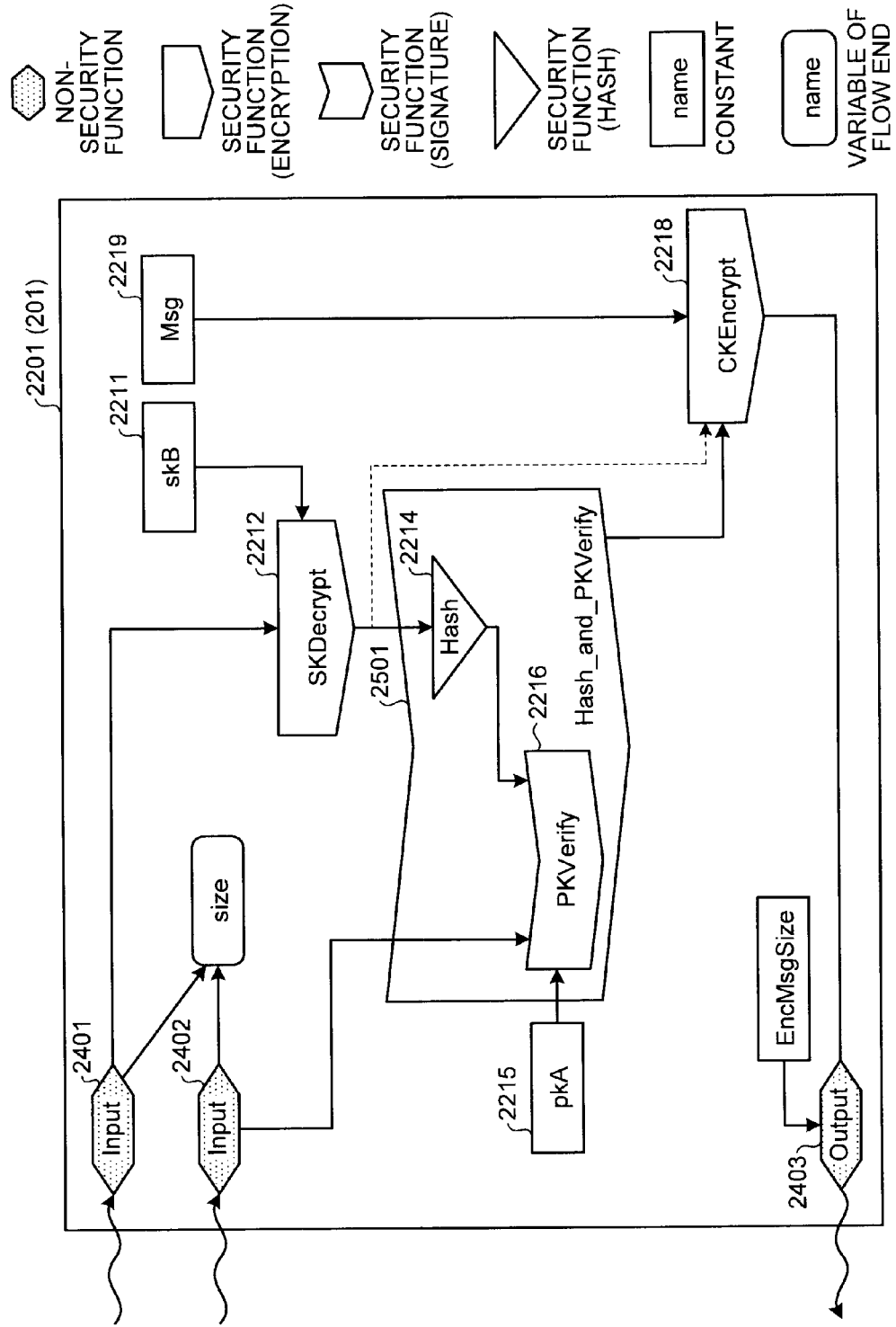
FIG. 21 is a diagram illustrating a data flow obtained when the information processing device performs pruning on the data flow illustrated in FIG. 20.

FIG. 21 is a diagram illustrating a data flow obtained by performing the pruning on the data flow illustrated in FIG. 20 by the information processing device 1. Since the fact that integrity of the input (ComKey) to the function "CKEncrypt" is guaranteed by the function "PKVerify" has been already detected, FIG. 21 shows that a value of which integrity is verified is returned from the function "Hash_and_PKVerify" which is a composite function of the function "Hash" and the function "PKVerify", and it is given to the function "CKEncrypt." Further, it is also shown that, two variables "Cert_SigMsg_A" and "Cert_Sign_A" are deleted from the function "Hash_and_PKVerify" by the pruning. This pruning is not essential, so it may not be performed.

Next, the information processing device 1 performs again the basic protection attribute determination processing similar to Step S4 of FIG. 12 on the updated data flow after the modification of Step S29 and the subsequent pruning of Step S30 are performed (Step S31). When the protection attributes are successfully determined (Yes in Step S32) through this basic protection attribute determination processing, the information processing device 1 outputs this data flow and the determined protection attributes of the respective arguments (Step S33). Meanwhile, when the determination of the protection attributes is failed in the basic protection attribute determination processing of Step S31 (No in Step S32), it is considered that the information processing device 1 cannot automatically determine the protection attributes even if it has composed functions F and V in the function pair (F, V) and thus newly defined a security verification function V'. For this instance, the information processing device 1 puts both the modification performed in Step S29 and the pruning performed in Step S30 back, that is, puts them on the state immediately before performing Step S29, thereby initializing the function argument protection attributes of the security verification function V' (Step S35). In this way, the information processing device 1 attempts to modify the function and determine the protection attributes, taking the dependency relation into consideration, for all the function pair (F, V) (Step S36). When the automatic determination of the protection attributes is failed for any of function pairs, this instance is considered to be failed in the determination of protection attributes. Here, "be failed" refers to the presence of a data flow being unsafe in terms of security although a single time of composition is considered as the function modification for a function pair. For this case, Step S7 of FIG. 12 produces a negative result, and thus the information processing device 1 completes the processing, while determining as being abnormal. Incidentally, an example in which the composition of a function pair is performed a plurality of times will be described as a third embodiment.

Next, the description on the example in which pruning of two variables is performed as illustrated in FIG. 21 will be continued. A continuous data flow illustrated in the figure is divided into 10 partial data flows as illustrated in FIG. 22. FIG. 22 is a diagram schematically illustrating the divided partial data flows. In the partial data flow of the data flow number "3," a variable "ComKey" which is a pre-verification key is present, and in the partial data flow of the partial data flow number "6," a variable "Cert_Comkey" which is a post-verification key is present. From this, the division is performed before and after verification. FIG. 23 is a diagram illustrating the procedure in which the basic protection attribute determination processing of Step S4 of FIG. 12 is performed. In the data flow updated in Step S29, as illustrated in FIG. 20, a variable "ComKey" with no integrity which results from decryption of a function "SKDecrypt" serving as a public key ciphertext decryption function, and a variable with integrity which is to be given to a function "CKEncrypt" serving as a common key encryption function are separately present, protection attributes are appropriately determined, and protection attributes of all variables are successfully given. Heretobefore, the description has been made on the case in which the pruning is performed. However, even in a case in which no pruning is performed, protection attributes are successfully determined in a similar manner to the above. For example, when the pruning is not performed on the data flow illustrated in FIG. 22, the protection attribute of a variable "Cert_SigMsg_A" and the protection attribute of a variable "Cert_Sign_A" are uniquely determined as being "verified."

As described above, according to the present embodiment, the protection attributes to be given to each variable are determined, taking into consideration the relationships between a plurality of functions as the dependency relations. For example, in the example of the pseudo program illustrated in FIG. 11, since the correspondence relationship of the hash function and the signature verification function is considered, it is possible to check for integrity of an input of the hash function after the signature verification is performed. More specifically, the inputs of the hash function before and after the signature verification can be separately handled, where the input of the hash function before the signature verification is regarded as having no integrity but the input of the hash function after the signature verification is regarded as having integrity only when the signature is successfully verified. In this way, it is possible to actualize division of protected variables and non-protected variables in the data flow. As a result, it is possible to add an appropriate protection attribute to each variable.

In addition, the protection attributes related to integrity or confidentiality are given to each variable used to describe the security protocol, the calculation by the function is limitedly performed between variables having the same protection attribute. In this manner, the data to be protected and the data not to be protected are separated. In addition, in order to deal with conversion of protection attributes in accordance with the encryption processing, the calculation between different protection attributes is limited to the functions (for example, encryption function, decryption function, signature generation function, signature verification function, or the like) having computational one-wayness property. Restriction on the protection attributes of the input and the output is given for each type of calculations. For example, the secret key is required to have both integrity and confidentiality for the public key ciphertext decryption function. Further, the ciphertext as an input is data not to be protected but the decryption result as an output becomes data to be protected with confidentiality. In this manner, conversion of the protection attributes is limited to only calculations with safety. For example, it is possible to reduce erroneous conversion of the protection attributes by eliminating a risk that the data to be protected is erroneously output to the outside as in the technology of JP-A 2004-240536 (KOKAI).

Further, according to the present embodiment, if both verification and decryption processings are performed on an input from the outside, the value obtained as a result of the processings is guaranteed for both integrity and confidentiality only when these have been performed. Accordingly, it is possible to deal with a protocol which securely uses an input from the outside as an encryption key that is used when encrypting data with confidentiality, which was not able to be dealt with by the technology of "Cryptographically-masked Flows". As described above, in the present embodiment, it is possible to appropriately add protection attributes to respective variables, based on two rules, (R1) calculation between different protection attributes is prohibited and (R2) conversion of protection attributes and protection attributes of input and output are limited in the one-way calculation, and further based on (R3) protection attributes are determined taking into consideration an implicit integrity verification. As described above, the implicit integrity verification refers to an event one occurring in a process using a combination of, for example, the hash function and the signature verification function. In this process, a message m which a party wants to verify is given to the hash function as input, and a variable H(m) which is the output thereof is taken to the signature verification function. Here, if the signature is successfully verified, integrity of the variable H(m) given to the signature verification function is guaranteed by the properties of the signature verification function. If so, for this instance, due to the collision resistance of the hash function, not only the variable H(m) which is the output of the hash function but also the corresponding message m which is the input of the hash function are guaranteed for integrity thereof. In this process, the message can be checked for integrity based on the above-described idea. However, using only two rules above, (R1) and (R2), it may be impossible to detect that the message m has integrity and it may be impossible to determine an appropriate protection attribute. However, in the present embodiment, by putting focus on the relationship (dependency relation) that, if integrity of the output is guaranteed, integrity of a corresponding input is also implicitly guaranteed; it is possible to detect a value by which integrity of the input can be implicitly checked. Accordingly, for example, in the protocol performing a process using a combination of the hash function and the signature verification, it is possible to appropriately determine a protection attribute. Such protocols include, for example, PGP and S/MIME, as standard protocols for e-mail, and SSL as a standard protocol for Internet. It is useful to apply the configuration of the present embodiment to these protocols.

From the above, for example, as shown in JP-A 2004-240536 (KOKAI) or "Multi-vendor Secure Processor under a Hostile Operating System", in a programming model that can access two types of memory areas, a protected memory area and a non-protected memory area, it is possible to support secure implementation of ordinary secure protocols using the protected memory area. That is, in the present embodiment, based on this programming model, in order to appropriately classify into the data to be protected to be stored in the protected memory area and the data not to be protected to be stored in the non-protected memory area, by putting focus on not only the flow of data (data flow) but also each process such as an encryption process, protection attributes for respective variables are appropriately determined. As a result, it is possible to properly store these variables to the protected memory area and the non-protected memory area depending on the protection attributes, and it is possible to achieve compatibility between the input and output from the outside using the non-protected memory, and protection for the variables to be kept inside by using the protected memory area.

Second Embodiment

Next, an information processing device, a program developing device, a program verifying method, and a program according to a second embodiment will be described. For the same portions as in the first embodiment described above, a description thereof will be made using same reference numerals or will not be given.

In the first embodiment described above, the description is made of an example in which the dependency relation generation function and the verification function are composed as a way of function modification. In the present embodiment, a description is made of an example in which a verification function itself is modified to produce a new verification function as a way of function modification. In this example, a dependency relation generation function F is not deleted but a change in function argument protection attribute is involved.

Next, the procedure of processing that an information processing device 1 according to the present embodiment automatically determines protection attributes will be described. The procedure of the processing of the present embodiment is almost similar to the procedure illustrated in FIG. 12 but the detailed process of Step S6 is different from the first embodiment. According to the present embodiment, in a protection attribute determination processing involving a function modification of Step S6, an information processing device 1 modifies a verification function of a function pair instead of composing a function pair of a dependency relation generation function and a verification function. An overview of the procedure of the protection attribute determination processing involving a function modification itself is approximately similar to that illustrated in FIG. 17. In the present embodiment, the details of processes of Step S26 and Step S29 of FIG. 17 are different from processes of the first embodiment described above.

Figure 24:
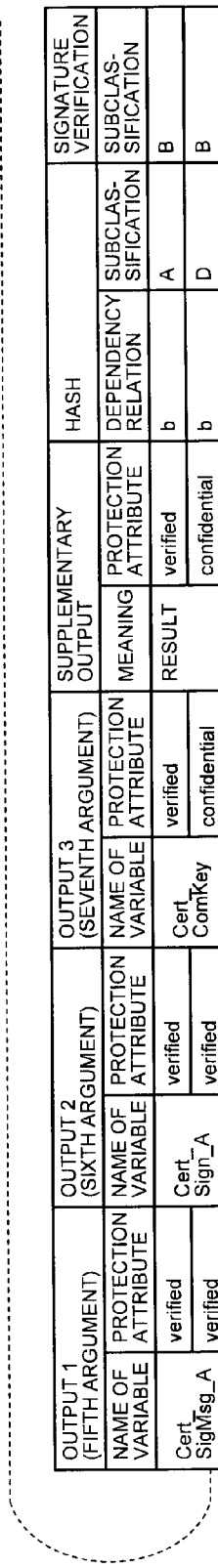
FIG. 24 is a diagram illustrating definitions of a modified verification function "Modified_PKVerify" which is modified from the function "PKVerify" which is a verification function V according to a second embodiment.

Step S20 to Step S25 are similar to processes of the first embodiment described above. In Step S26, the information processing device 1 performs a function definition on triple (dependency relations of the dependency relation generation function F, function argument protection attribute of F, function argument protection attribute of the verification function V) for a function pair that has passed checking similar to that of Step S25 of the first embodiment described above. In the present embodiment, the dependency relation generation function F and the verification function V are not composed. Instead, the dependency relation generation function F remains unchanged but a new security verification function V' is produced by modifying the verification function V such that the information processing device 1 adds variables of a dependent attribute to both input variables and output variables of the verification function V. For this instance, the variables of dependent attribute added to the input variable and the output variable are set to have different names. In regard to the protection attributes for each of these variables, the information processing device 1 causes the protection attributes of respective variables to inherit a protection attribute of an input and a protection attribute of an output that are defined in the entry f of the function argument protection attribute of the dependency relation generation function F. For example, in the case of the data flow of FIG. 13 that is used in the description of the first embodiment, the information processing device 1 defines a definition of an input and a definition of an output of "Modified_PKVerify" that is the new security verification function obtained by modifying the function "PKVerify" by copying inputs and outputs of a function "PKVerify" and adding a variable "ComKey" of the dependent attribute into the input and a variable "Cert_ComKey" renamed therefrom to the output. The input variables and output variables are inherited from the function "PKVerify." In regard to the input variable "ComKey," it inherits the protection attributes from the function "PKVerify" and the function "Hash." On the other hand, in regard to "Cert_ComKey" which is the output variable, the information processing device 1 changes the protection attribute ("exposed" or "concealed") in the function "Hash" to protection attribute (changes to the protection attribute "verified" from the protection attribute "exposed" or to the protection attribute "confidential" from the protection attribute "concealed") which has integrity and still keep confidentiality. FIG. 24 is a diagram illustrating definitions of the new security verification function "Modified_PKVerify" modified from the function "PKVerify" which is the verification function V. In the figure, the input variable "Com_Key" is added as an input 3 and the output variable "Cert_ComKey" is added as an output 3.

Steps S27 to S28 are similar to the first embodiment. In Step S29, the information processing device 1 updates a data flow based on the security verification function V' obtained in Step S26. In the present embodiment, unlike the first embodiment, the information processing device 1 does not delete the dependency relation generation function F, but replaces only the verification function V with the security verification function V'. Further, like the first embodiment, the information processing device 1 turns over the dependency relation to the security verification function V' and rewrites the data flow in accordance with a change in arguments. Still further, in the present embodiment, the information processing device 1 adds a specific attribute to an intermediate variable of the function pair (F, V'). The intermediate variable refers to a variable that is returned from the dependency relation generation function F, taken to the new security verification function V', and not referenced by anything except for the function pair (F, V'). For the intermediate variable, a process is performed by which the intermediate variable cannot be read from the outside and cannot be falsified regardless of semantic confidentially and integrity. Meanwhile, according to the first embodiment, such an intermediate variable is deleted so that it cannot be read from the outside. On the other hand, in the present embodiment, in the definition related to the output of the dependency relation generation function F and the definition related to the input of the verification function V, a specific attribute "capsulated" is defined. Here, the notable point is that the specific attribute "capsulated" refers to an attribute that never permits calculation with any variable other than the intermediate variable of the function pair (F, V'). That is, calculation of the variable given the specific attribute "capsulated" with any variable other than the intermediate variable of the function pair (F, V') is not permitted. For such a reason, the specific attribute "capsulated" needs to be defined separately by each function pair (F, V'). For example, the specific attribute needs to be given in an identifiable manner for each function pair (F, V'), like "capsulated_1", "capsulated_2," and so on. In the example of the pseudo program illustrated in FIG. 11, a variable "SigMsg_A" used only between the function "Hash" and the function "Modified_PKVerify" corresponds to the intermediate variable. Accordingly, the information processing device 1 rewrites the protection attribute of the variable "SigMsg_A" to the specific attribute "capsulated_1" in overload tables of the function "Hash" and the function "Modified_PKVerify." For this instance, the information processing device 1 rewrites the protection attribute for the output variable of the function "Hash" to "capsulated_1" but does not rewrite the protection attribute for the output variable of another hash function even when another hash function other than the function "Hash" is used in the program. In all respects, it should be noted that only the function "Hash," which is a dependency relation generation function as a target, is a target to be rewritten.

In addition, as described above, when generating the dependency relation, it should be performed in a state in which falsification of the input variable and the output variable is prevented. In order to realize this, falsification prevention processing needs to be performed on a variable of the determinant set and a variable of the dependent attribute. For example, a variable to which the protection attribute "exposed" is added is copied to the protection attribute "fixed" directly before the calculation of the dependency relation generation function F as it is done when the signature verification is performed. However, for a variable with the protection attribute "hidden" or the protection attribute "concealed", it is preferable to perform the falsification prevention processing at first. In the example of the pseudo program illustrated in FIG. 11 according to the present embodiment, thanks to this processing, it is guaranteed that a value of the variable "Comkey" taken to the function "Hash" and a value of the variable "Comkey" taken to the function "Modified_PKVerify" are the same. In addition, when the verification was successful, a value of the output variable "Cert_Comkey" is also the same as those values.

Figure 25:
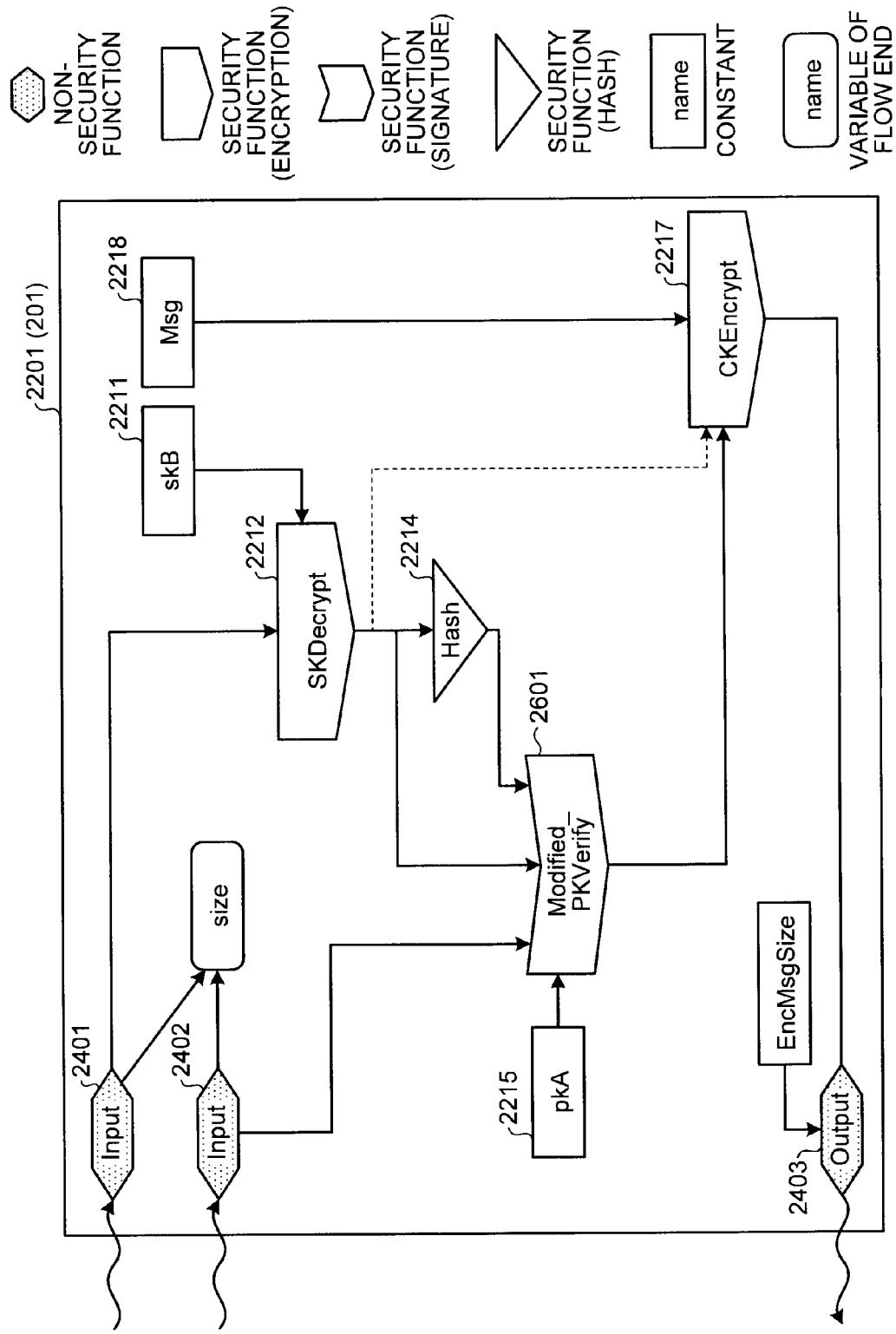
FIG. 25 is a diagram illustrating a data flow generated by updating the data flow of the pseudo program illustrated in FIG. 11 and pruning the updated data flow by two variables.

After the update of the data flow, in Step S30, the information processing device 1 prunes unnecessary variables output from the security verification function V'. In the example of the pseudo program illustrated in FIG. 11 of the present embodiment, two variables of "Cert_SigMsg_A" and "Cert_Sign_A" are candidates of the pruning, but each of these is a variable that is verified by the security verification function V' for its integrity so as to be output. Among these, since the variable "Sign_A" corresponding to the variable "Cert_Sign_A" is connected with only the function "Input" that does not generate dependency relations, it can be pruned. In addition, as for the variable "Cert_SigMsg_A," since a corresponding variable "SigMsg_A" is an intermediate variable of the function "Hash" and the function "Modified_PKVerify," it also can be pruned. Accordingly, the information processing device 1 prunes the two variables of "Cert_SigMsg_A" and "Cert_Sign_A." FIG. 25 is a diagram illustrating the data flow obtained by updating the data flow of the pseudo program illustrated in FIG. 11 and then pruning two variables therefrom. The figure shows that a value of which integrity is confirmed is returned from the function "Modified_PKVerify" resulting from the modification of the function "PKVerify" itself, and the value is taken to the function "CKEncrypt." From the figure, it is also known that, due to the pruning, two variables of "Cert_SigMsg_A" and "Cert_Sign_A" are deleted from the output of the function "Modified_PKVerify." FIG. 26 is a diagram illustrating definitions of the function "Hash" and the security verification function "Modified_PKVerify." The subsequent procedure is the same as that of the first embodiment. The information processing device 1 performs a basic protection attribute determination processing on the data flow which is updated in Step S29 and pruned in Step S30. FIG. 27 is a diagram illustrating the process that, in the present embodiment, the basic protection attribute determination processing is performed on a partial data flow divided in a similar manner to that in the first embodiment. As illustrated in the figure, protection attributes are uniquely determined for respective variables. In addition, as described above, it is notable that, in order to maintain the dependency relations, the protection attribute "concealed" is determined for the variable "ComKey" but the falsification prevention processing has been performed on the variable "ComKey."

As described above, the modification of the verification function itself as well as the composition of the dependency relation generation function and the verification function makes it possible to determine an appropriate protection attribute for each variable. As a result, it is possible to properly store these variables in the protected memory area or the non-protected memory area according to the protection attributes, and it is possible to successfully achieve both handling of input and output from the outside using the non-protected memory area and protection of variables that should be kept inside using the protected memory area.

Third Embodiment

Next, an information processing device, a program developing device, a program verifying method, and a program according to a third embodiment will be described. Incidentally, common portions with the first embodiment or the second embodiment described above will be described using the same reference numerals or will not be described repeatedly.

The first embodiment and the second embodiment described above relate to a case in which detection of an implicit integrity verification occurs once. In the present embodiment, a case is described in which the detection of implicit integrity verification occurs a plurality of times. Hereinbelow, a description is made of a configuration in which protection attributes are automatically determined taking into consideration dependency relations at a plurality of locations using a configuration in which a function modification is achieved by a function composition as in the first embodiment. In addition, it is possible to compose functions being in a nested form.

Figure 28:
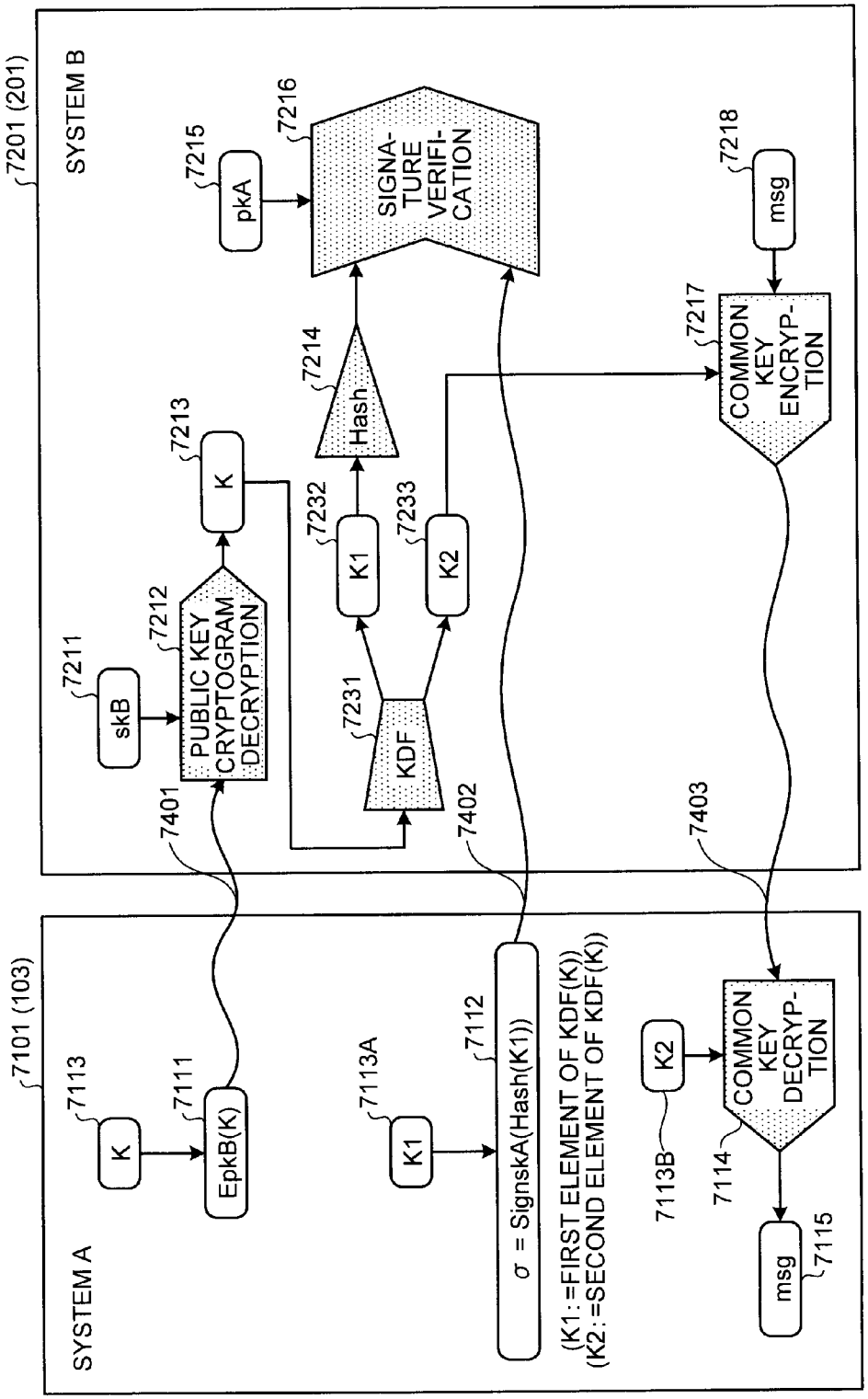
FIG. 28 is a diagram illustrating the procedure of a security protocol according to a third embodiment.

FIG. 28 is diagram illustrating the procedure of a security protocol used in the present embodiment. The security protocol is similar to the security protocol of the hybrid encryption illustrated in FIG. 9 and used in the first embodiment and second embodiments. However, it is different from them in that it uses a KDF. In the figure, a system A 7101 operates in an external device 103 illustrated in FIG. 2, and a system B 7201 is realized by a program module 201 illustrated in FIG. 2. First, before an execution of the security protocol, the system B 7201 acquires a public key (pkA) 7215 of a system A 7101 in advance. The system B 7201 separately verifies integrity of a public key (pkA) 7215 based on a certificate issued by a CA, but this process is not illustrated. In addition, in a program module 201 that actualizes the system B 7201, a secret key (skB) 7211 assigned to the module itself and a message (msg) 7218 are statically embedded in advance.

The system A 7101 generates a common key (temporary key) (K) used to transmit the message (msg) 7218 and delivers the common key (K) 7113 to the KDF, thereby taking a first element (K1) 7113A and a second element (K2) 7113B as a first element and a second element of the KDF (K), respectively. Further, the system A 7101 generates a signature 7112 using its own secret key for a hash value of the first element (K1) 7113A, and sends it to the system B 7201 (7402). In addition, the system A 7101 sends data 7111 obtained by encrypting the common key (K) 7113 by the public key (pkB) of the system B 7201 to the system B 7201 (7401). The system A 7101 separately verifies integrity of the public key (pkB) based on the certificate issued by the CA, but this process is not illustrated in the figure.

On the other hand, the system B 7201 receives the data 7111 sent from the system A 7101 in 7401, and then acquires the common key (K) 7213 based on a public key ciphertext decryption function 7212 using the secret key (skB) 7211 allocated to itself. Next, the system B 7201 delivers the common key (K) 7213 to the KDF 7231 and takes a first element (K1) 7232 and a second element (K2) 7233 as a first element and a second element of the KDF (K). Further, the system B 7201 calculates a hash value based on the hash function 7214 using the first element (K1) 7232 and performs a signature verification using the public key (pkA) 7215 which is verified in advance and the signature 7112 received in 7402, based on the signature verification function 7216. When the signature is successfully verified, integrity of the first element (K1) 7232 is confirmed from the properties of the hash function described with reference to FIG. 10, and integrity of the common key (K) 7213 and the second element (K2) 7233 is also confirmed from the properties of the KDF described in connection with the definition of dependency relations. Then, the second element (K2) 7233 can be used as an encryption key used to encrypt the message (msg) 7218 through the common key encryption. Subsequently, the system B 7201 encrypts the message (msg) 7218 using the second element (K2) 7233 based on the common key encryption function 7217 to generate a ciphertext, and sends the ciphertext to the system A 7101 (7403). The system A 7101 receives the ciphertext, which is sent from the system B 7201 in 7403, delivers the common key (K) 7113, which the system A 7101 has, to the KDF to obtain the second element (K2) 7233, and decrypts the ciphertext using it based on the common key decryption function 7114 to extract the message (msg) 7115. In addition, a pseudo program which is a source to generate the data flow is different from that illustrated in FIG. 11. However, it is not illustrated here.

Next, in the present embodiment, differences between the configuration of the information processing device 1 illustrated in FIG. 2 and the configuration of the first embodiment will be described. An update and replacement unit 51 can update a data flow 21, a function argument protection attribute set 12, and a dependency relation set 13 a plurality of times. The data flow 21, the function argument protection attribute set 12, and the dependency relation set 13 that are updated by the update and replacement unit 51 can be given to the protection attributes determination unit 52 a plurality of times. Subsequently, the protection attributes determination unit 52 outputs a variable protection attribute table and a function overload table that stores protection attributes uniquely determined for respective variables, in a manner similar to the first embodiment, using the data flow 21, the function argument protection attribute set 12, and the dependency relation set 13 that are updated by the update and replacement unit 51.

Figure 29:
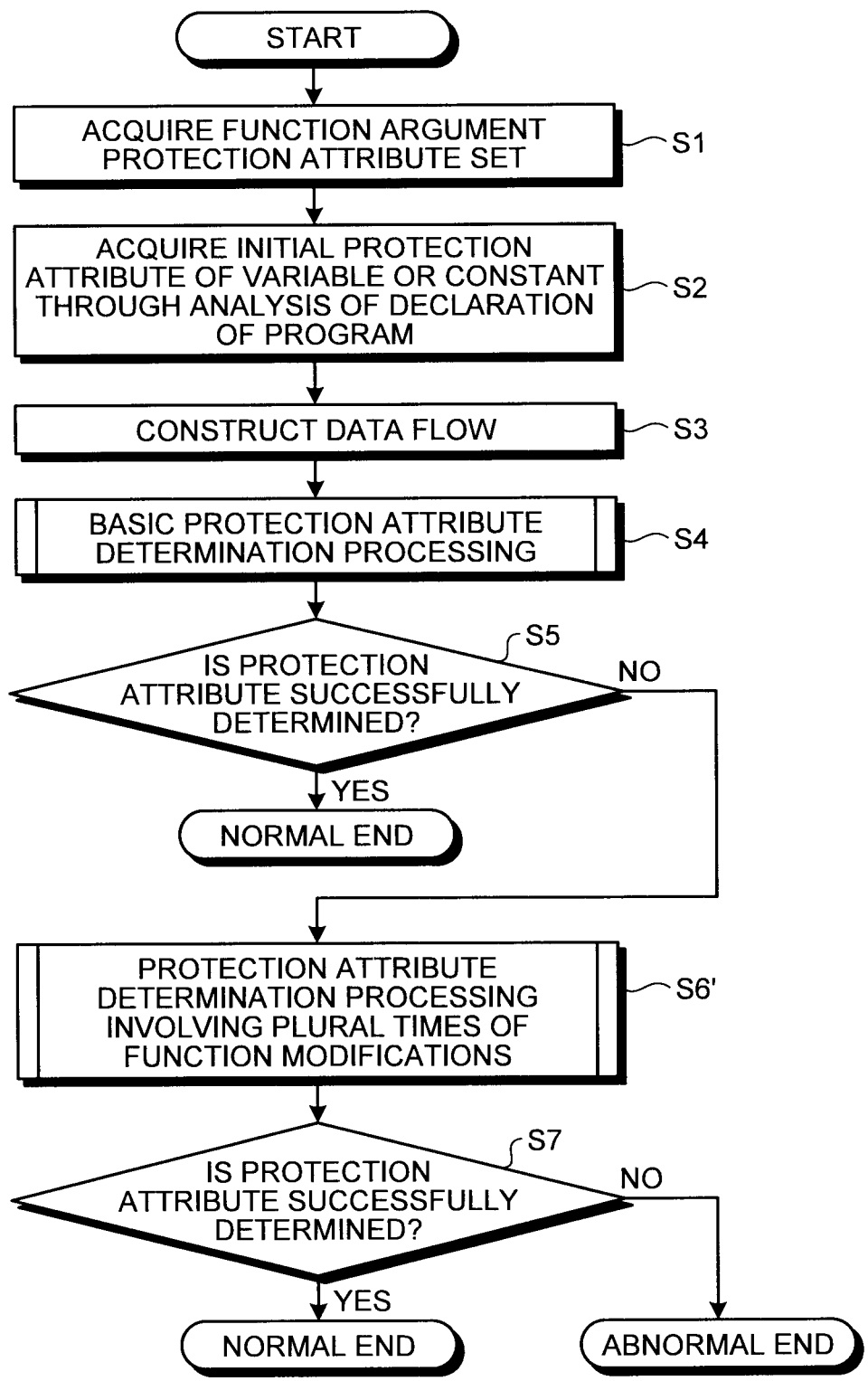
FIG. 29 is a flowchart illustrating the procedure of a protection attribute determination processing performed by the information processing device according to the embodiment.
Figure 30:
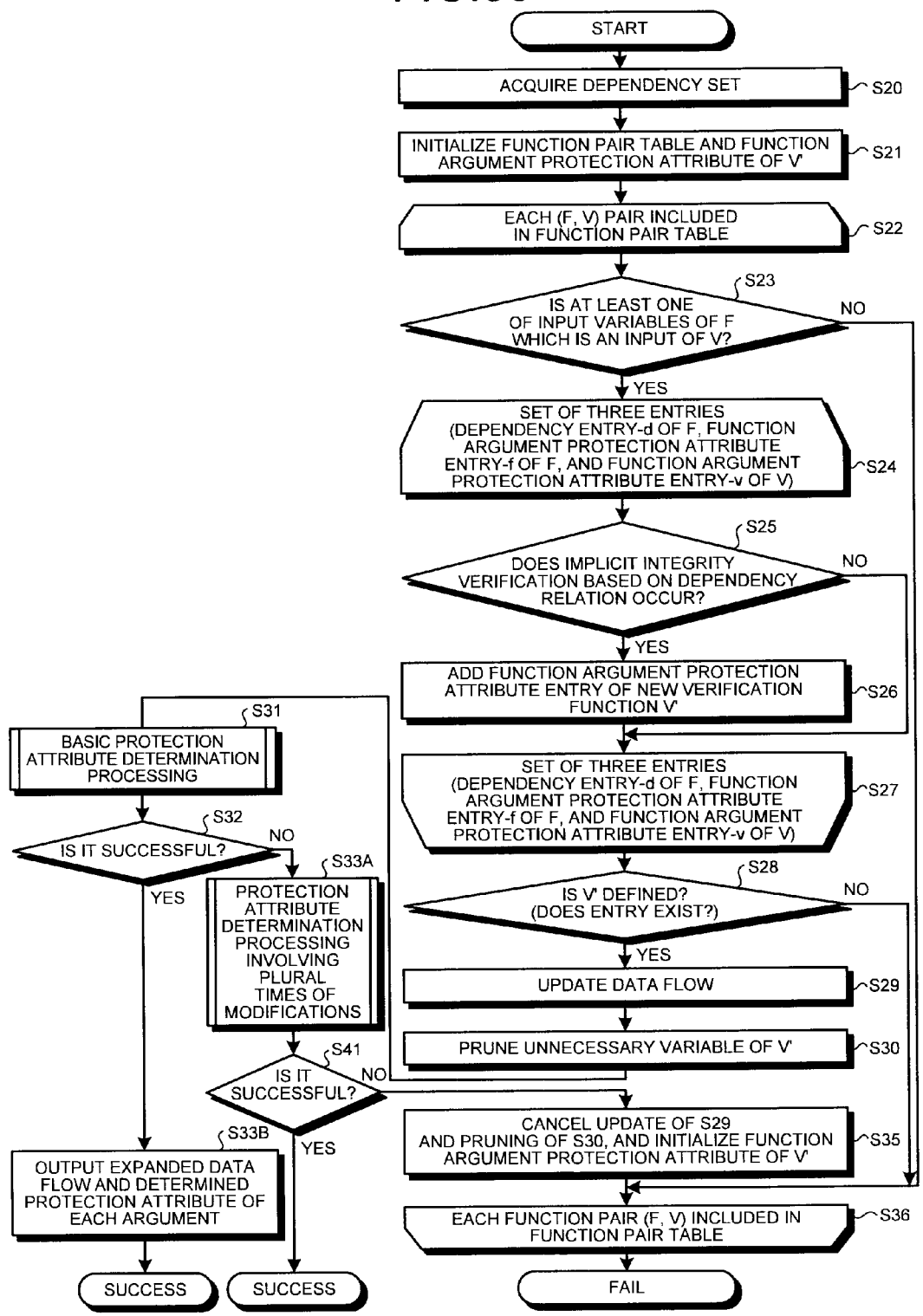
FIG. 30 is a flowchart illustrating the procedure of a protection attribute determination processing involving a plurality of times of function modifications according to the embodiment.

Next, the procedure of a protection attribute determination processing performed by the information processing device 1 according to the present embodiment will be described with reference to FIG. 29. The procedure of the processing according to the present embodiment is substantially similar to the procedure illustrated in FIG. 12, but is different from the first embodiment in the procedure of Step S6'. In the present embodiment, in Step S6', the protection attribute determination processing involving a function modification is not performed but protection attribute determining process involving a plurality of times of function modifications is performed. FIG. 30 is a flowchart illustrating the procedure of the protection attribute determination processing involving a plurality of times of function modifications. The procedure of the protection attribute determination processing involving a plurality of function modifications is different from the protection attribute determination processing involving a function modification of FIG. 17 in that when the basic protection attribute determination processing in Step S31 is failed (No in Step S32), in Step S33A, the protection attribute determining process involving a plurality of times of function modifications which is performed in Step S6' is performed recursively. In the protection attribute determination processing involving a plurality of times of function modifications which is recursively performed in Step S40, when the protection attributes are successfully determined (Yes in Step S41), the information processing device 1 completes the processing in a normal manner, but when the determination of protection attributes is failed (No in Step S41), the process proceeds to Step S35 to put both the modification performed in Step S29 and the pruning performed in Step S30 back. By performing this processing, it is possible to handle function modifications at a plurality of locations. The locations for modification may be separated or may be in a nested form.

Figure 31:
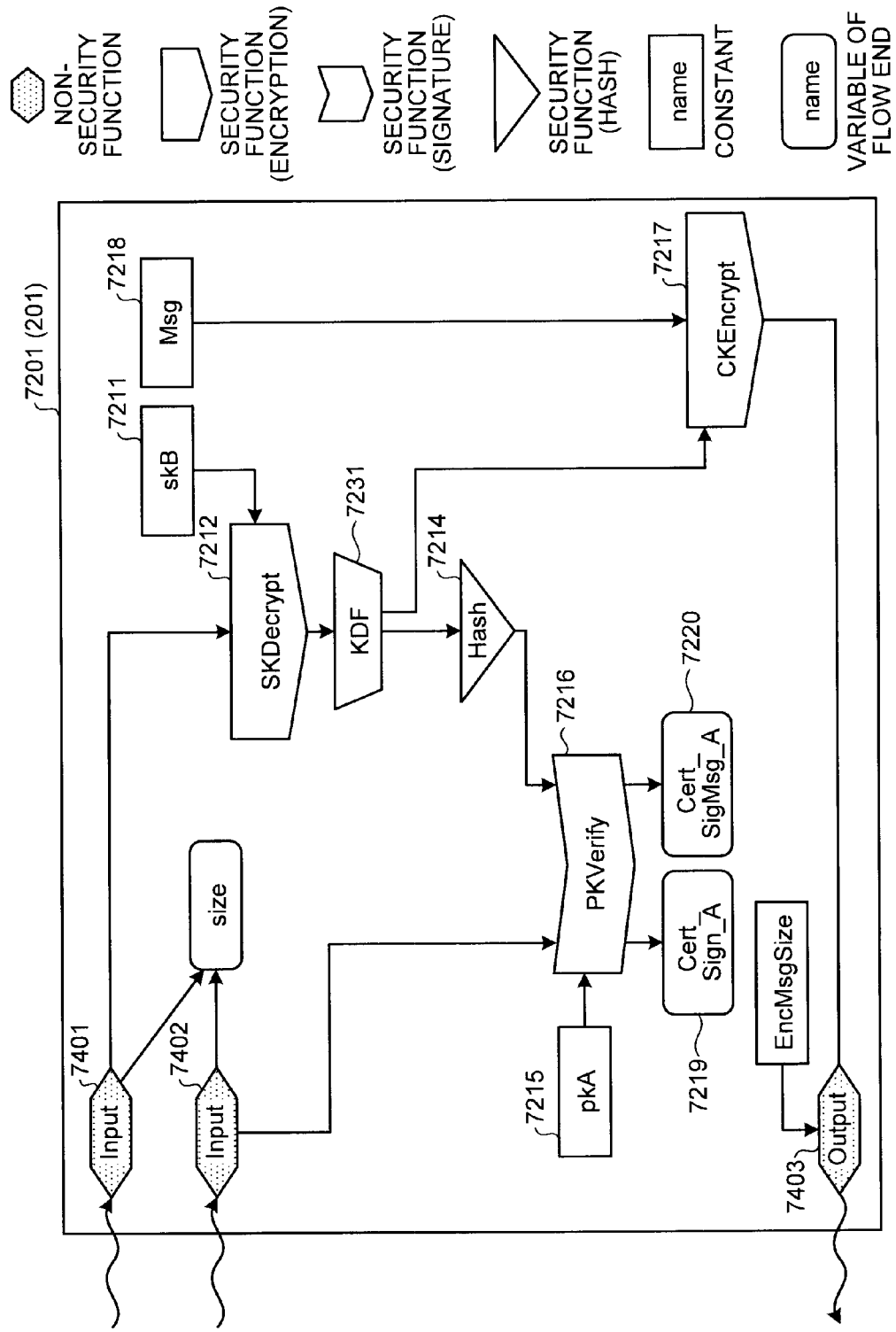
FIG. 31 is a diagram illustrating an example of a data flow according to the embodiment.

Next, the flow of processing will be described using a specific example. FIG. 31 is a diagram illustrating an example of a data flow according to the present embodiment. Since it is substantially similar to FIG. 28, functions and variables similar to those of FIG. 28 are denoted by the same reference numerals. Further, as for the input (7401 to 7402 of FIG. 28) from the system A 7101, they are represented by input functions "Input" 7401 and 7402, respectively. Still further, the public key ciphertext decryption function 7212 is represented by a function "SKDecrypt" 7212, the signature verification function 7216 is represented by a function "PKVerify" 7216, and the common key encryption function 7217 is represented by a function "CKEncrypt" 7217. As for the output (7403 of FIG. 28) from the system B 7201, it is represented by an output function "Output" 7403. In the data flow illustrated in the figure, an output variable of the KDF and an input variable of the function "CKEncrypt" are linked to each other. Since the former is not verified, it is not guaranteed for its integrity. Since the latter is needed to have integrity, the protection attributes therefor cannot be determined. Here, similarly to the first embodiment, the dependency relation between the function "Hash" and the function "PKVerify" is admitted. For this reason, the dependency relation generation function "Hash" and the verification function "PKVerify" are composed to generate a function "Hash_and_PKVerify" as a new security function.

Figure 32:
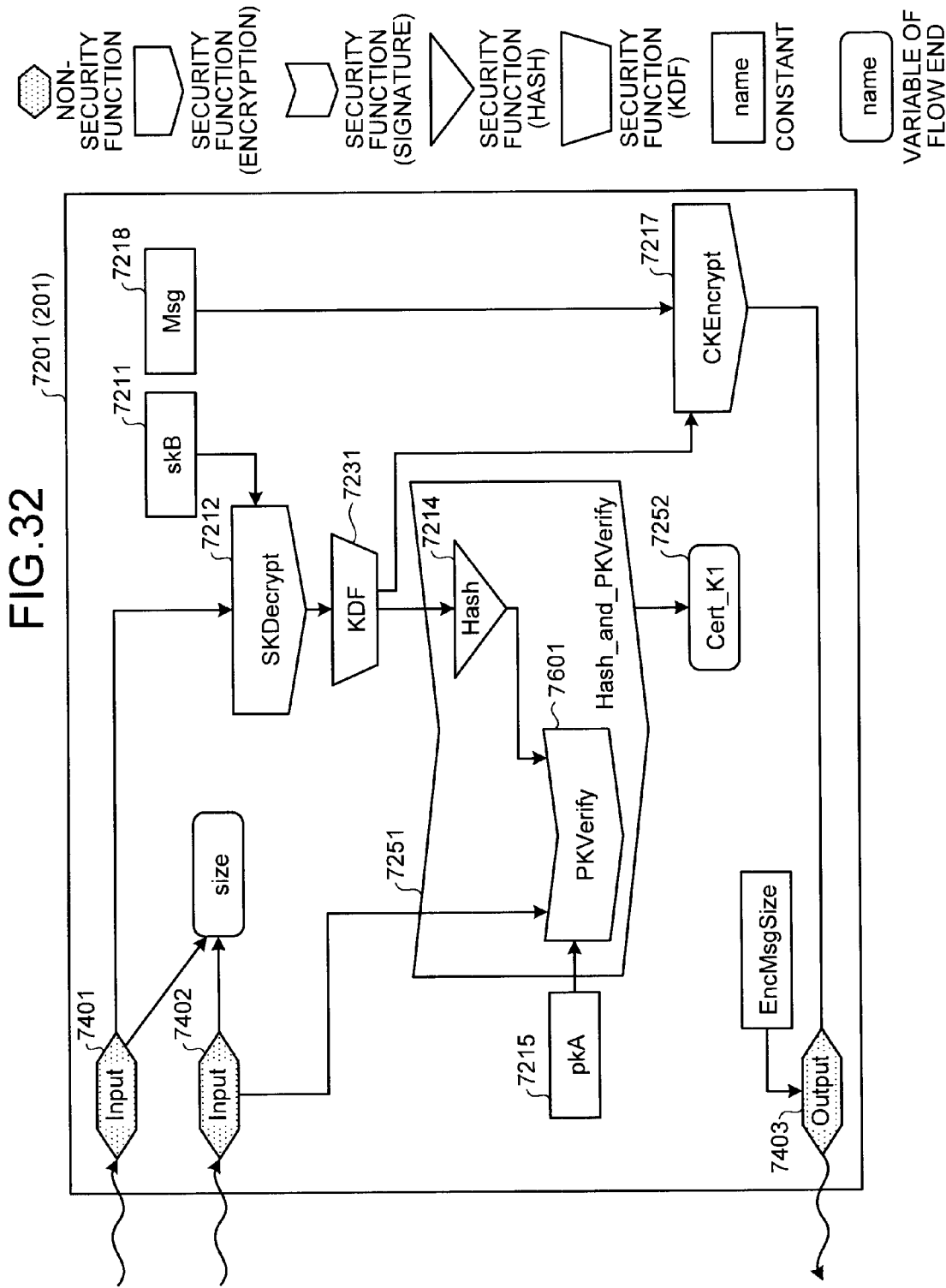
FIG. 32 is a diagram illustrating a data flow obtained by updating the data flow in Step S29 illustrated in FIG. 30.

FIG. 32 is a diagram illustrating a data flow obtainable as a result of update of the data flow in Step S29 of FIG. 30. In the figure, it is illustrated that the function "Hash_and_P-KVerify" is newly constructed as a new security function and a variable "Cert_K1" 7252 of a dependent attribute is present as its output variable. These are defined in Step S26 of FIG. 30. In Step S30, two variables, "SigMsg_A" and "Cert_Sign_A," are pruned for the similar reason to the first embodiment. Incidentally, the pruning is not necessarily performed as in the first embodiment. However, it should be noted that the variable "Cert_K1" cannot be deleted because it is a variable which is an input of the function "Hash_and_P-KVerify" and is then verified and corresponding input K1 which is a first element of the KDF is linked to the KDF which is a dependency relation generation function. After this modification, the determination of protection attributes is performed again in Step S31 of FIG. 30, but an inconsistency between the output variable of the KDF described above and the input variable of the function "CKEncrypt" has not yet eliminated. Accordingly, in Step S40, the protection attribute determination processing involving a plurality of times of function modifications is performed again.

Figure 33:
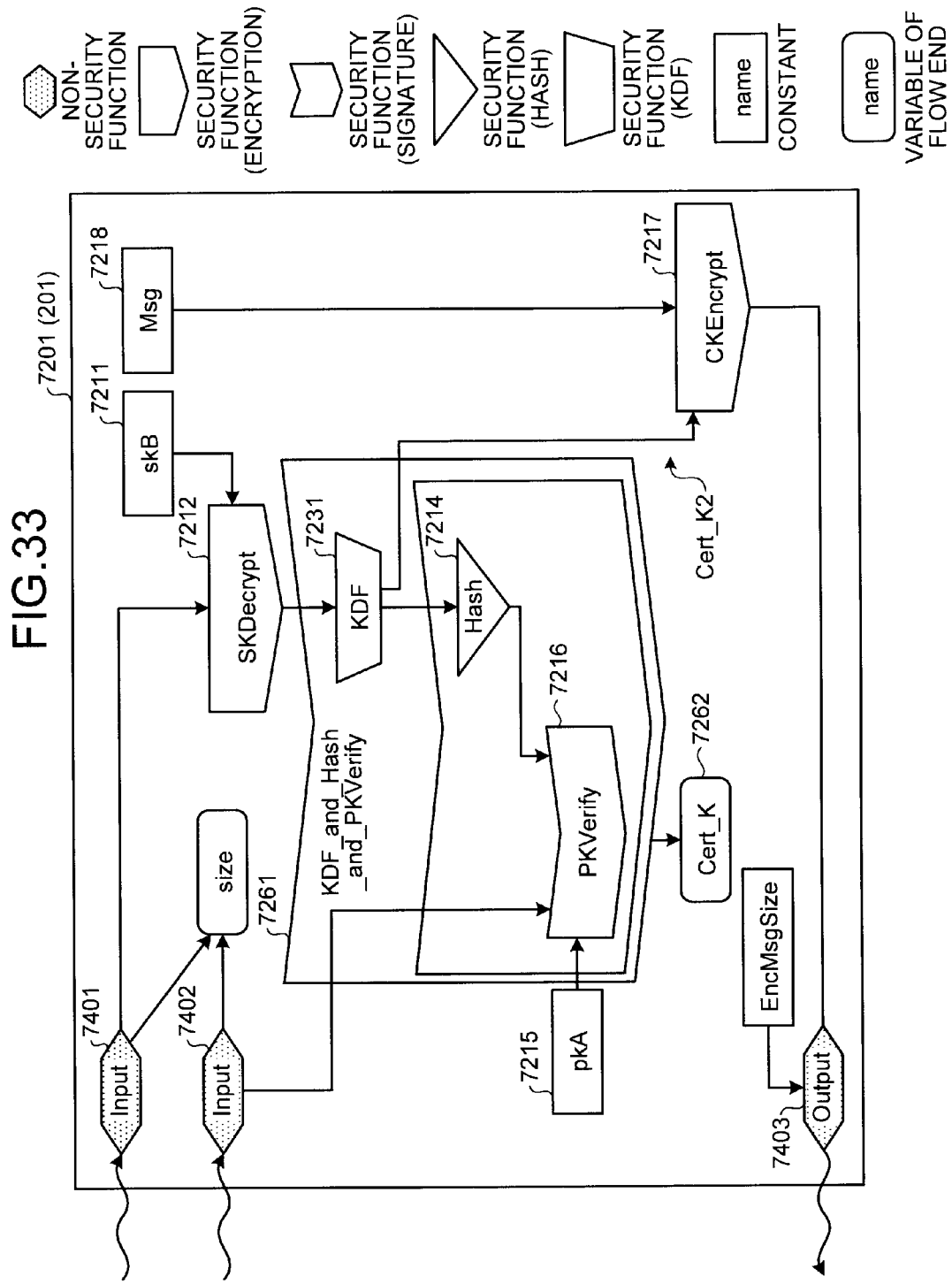
FIG. 33 is a diagram illustrating a data flow as a result from the modification.
Figure 34:
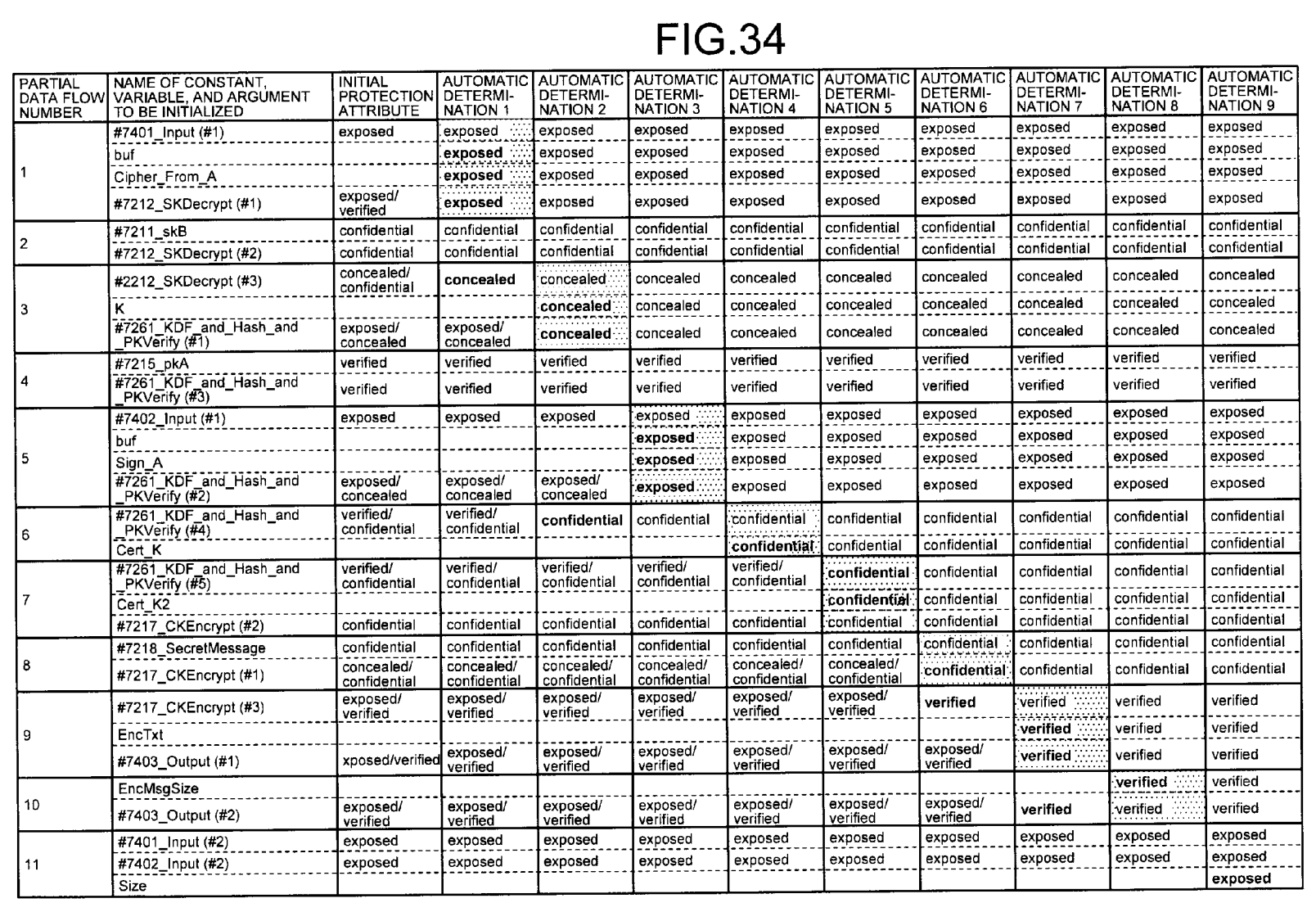

In Step S40, at the starting point of the second round of the protection attribute determination processing involving a plurality of times of function modifications, the information processing device 1 initializes a function pair table in Step S21. Before this time, it deletes the function pair (F,V) which was a processing subject of the first round and adds the security verification function V' generated in the first round of the protection attribute determination processing involving a plurality of times of function modifications to the list instead. In the example of FIG. 31, in the first round of the protection attribute determination processing involving a plurality of times of function modifications, the function pair table is initialized to (SKDecrypt, PKVerify), (KDF, PKVerify), (Hash, PKVerify), and (CKEncrypt, PKVerify). In the second round of the protection attribute determination processing involving a plurality of times of function modifications, the function pair table is initialized to (SKDecrypt, Hash_and_PKVerify), (KDF, Hash_and_PKVerify), and (CKEncrypt, Hash_and_PKVerify). By doing so, in the second round of the protection attribute determination processing involving a plurality of times of function modifications, the dependency relation is admitted between the KDF and the security verification function "Hash_and_PKVerify" generated in the first round of the protection attribute determination processing involving a plurality of times of function modifications. Thanks to this dependency relation, the KDF and the security verification function "Hash_and_PKVerify" are composed to generate the function "KDF_and_Hash_and_PKVerify" as a new security verification function. Subsequently, the update of the data flow in a nested form is performed again. FIG. 33 is a diagram illustrating the data flow obtained through the modification. In the figure, as a new security verification function, it is found that a function "KDF_and_Hash_and_PKVerify" 7261 is newly established. Further, "Cert_K" 7262 and "Cert_K2" that are variables of the dependent attribute are put to the output variable, and the variable "Cert_K2" is given to the function "CKEncrypt" 7217 instead of "K2" which is an output variable from the KDF. The variable "Cert_K1" is deleted through pruning because K1 corresponding to it becomes an internal variable by the function modification and it is not an input of the function "KDF_and_Hash_and_PKVerify." If the basic protection attribute determination processing of Step S31 is performed after such data flow update, this time, the problem which has occurred after the first round of the protection attribute determination processing involving a plurality of times of function modifications is solved and thus the determination of appropriate the protection attributes is properly performed. As a result, the protection attributes are successfully determined and the processing is completed in a normal manner. FIG. 34 is a diagram illustrating the process of the present embodiment in which the basic protection attribute determination processing is performed for a partial data flow divided as in the first embodiment described above. As illustrated in the figure, protection attributes are uniquely determined for respective variables.

According to the configuration described above, even when the implicit verification of integrity is detected a plurality of times, it is possible to appropriately determine protection attributes by modifying functions at a plurality of locations.

In the embodiment described above, the function modifications at a plurality of locations are recursively performed, but it is not limited thereto. That is, it is possible to appropriately determine protection attributes by repeatedly executing the processing while managing necessary information.

Further, in the present embodiment, it is possible to perform the function modifications at a plurality of locations or function modifications in a nested form by applying the configuration of the second embodiment. For this instance, it is required that the modification be not performed again after it is performed once. This means that the modification of the function pair (F, V) is performed, the verification function V is replaced with the new security verification function V', and then the modification of the function pair (F, V') is not performed. If it is attempted to perform this modification, the security verification function V' does not change, and the protection attribute determination processing involving a plurality of times of function modifications of FIG. 30 goes into an infinite loop. In order to avoid this, not only the protection attribute determination processing involving a plurality of times of function modifications is recursively performed, but also a table to store the modified function pairs is prepared and it is preferable to check whether or not the modification has been performed based on the table. Alternatively, it may be possible to apply other methods in which the same process is not performed repeatedly.

Fourth Embodiment

Next, an information processing device, a program developing device, a program verification method, and a program according to a fourth embodiment will be described. Further, portions common with the first to third embodiments described above are described with the same reference numerals or are not described repeatedly here.

In the present embodiment, a system generating and developing a machine language program will be described. In the protection attribute determination processings according to the first to third embodiments described above, a program list of a target program is analyzed, and appropriate protection attributes are determined and added to each variable. However, in order to make it possible to appropriately perform this determination, in regard to the description of the program list of the target program, it is based on the premise that the data flow according to a security protocol is correctly described. Of course, further premise prior to the above premise is included which the specification itself of the security protocol does not have a defect that confidential information is carelessly leaked out. In regard to the safety verification of the specification itself of the security protocol, there are some known techniques. The present embodiment is based on the assumption that the safety of the security protocol as an implementation subject has been already verified. As an example of this technology, an example of protocol verification using a formal approach is disclosed in the following Reference 1. In the present embodiment, the specification of the security protocol which is an implementation subject is not limited to the approach of Reference 1 but is based on the assumption that a certain sort of safety verification is performed in advance. (Reference 1) "Reasoning About Belief in Cryptographic Protocols" Li Gong, Roger Needham, Raphael Yahalom 1990 IEEE Symposium on Security and Privacy, 1990.

When verifying whether the data flow according to the security protocol is correctly implemented, so-called functional test is normally used which judges whether or not input and output by executing the target program correctly satisfy the specification. On the other hand, in the present embodiment, it is possible to automatically determine protection attributes of variables. In order to determine the protection attributes appropriately, it should be based on the assumption that the data flow of the protocol is correctly implemented. Accordingly, a programmer removes errors from the data flow at a first stage, and the information processing device 1 according to the present embodiment automatically determines protection attributes at a second stage.

Figure 35:
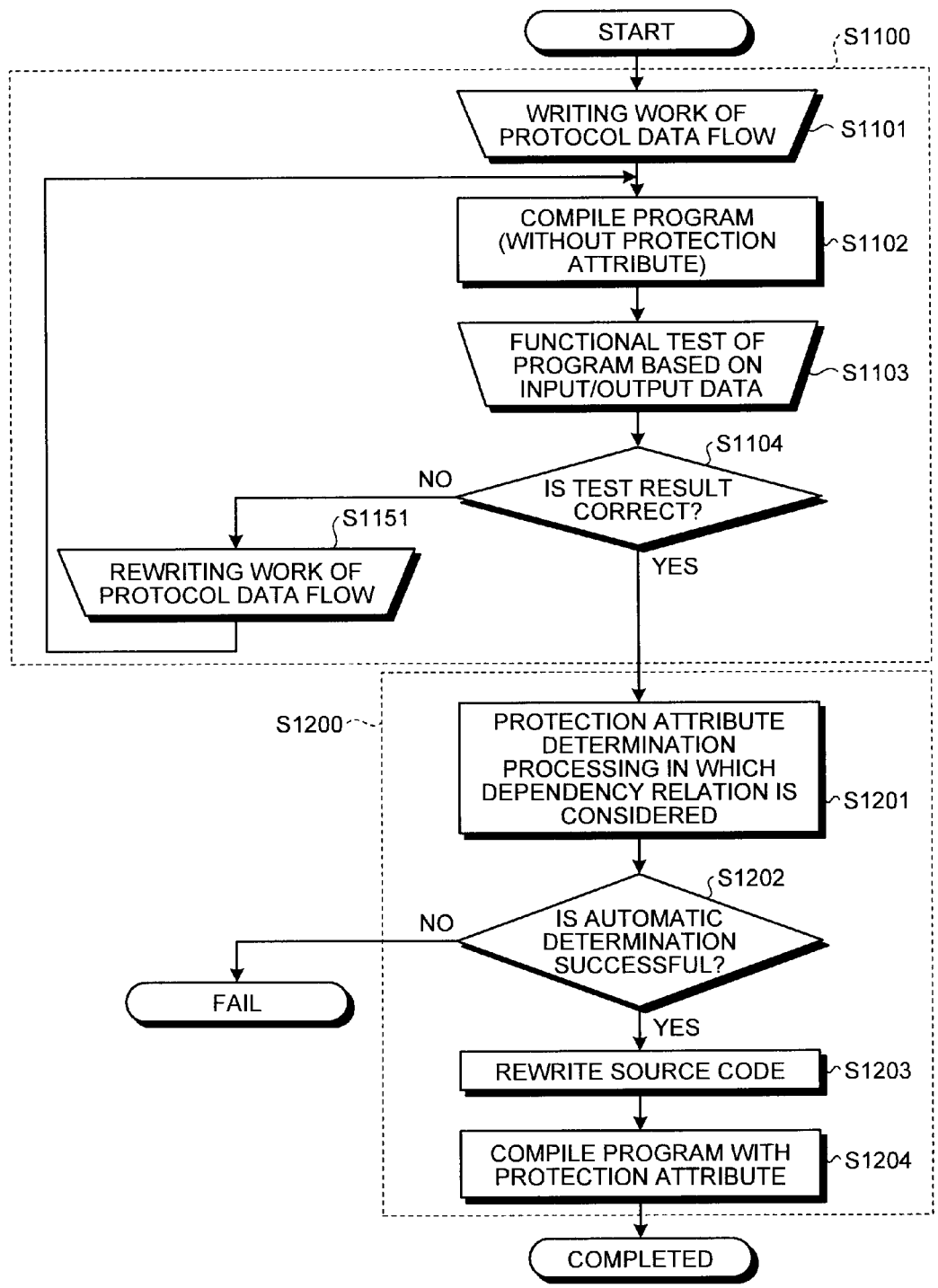
FIG. 35 is a flow of program development to which a protection attribute determination processing according to a fourth embodiment is applied.

FIG. 35 is a program development flow to which the protection attribute determination processing according to the present embodiment is applied. The development flow is roughly divided into two phases. One is a phase S1100 in which a programmer removes errors from the data flow by performing the functional test, and the other is a phase S1200 in which the information processing device 1 automatically determines protection attributes for each variable of the data flow and automatically generates an executable format program. In the phase S1100, the programmer starts the development of the program related to the security protocol and writes a program list of the program with great care about the correctness of the data flow (Step S1101). At this stage, the programmer writes the program list of the program without adding protection attributes to variables. However, at this step, it is generally considered that the programmer figures out appropriate protection attributes for the basic variables to implement the data flow, such as variables to which the root of trust, for example secret keys, is assigned.

Next, the programmer generates an executable format of the program using a complier (Step S1102), and executes it to perform a functional test of whether or not desired output data can be obtained for input data of the functional test (Step S1103). When it is failed in this functional test (No in Step S1104), the programmer corrects the error in the data flow (Step S1151), performs the compiling and functional test again in Step S1102 to Step S1103. Until the result of the functional test is correct (Yes in Step S1104), and the programmer repeatedly performs Steps S1151 and S1102 to S1103. If the input data appropriate for the functional test is provided, the error in the data flow is supposed to be removed at the stage when the functional test result is correct. Subsequently, the programmer inputs the program to the information processing device 1 as a target program, and causes the information processing device 1 to perform the protection attribute determination processing that takes into consideration the dependency relation which is illustrated in FIGS. 12 and 29 and is described in connection with the first to third embodiments described above (Step S1201). As an input to the information processing device 1, the protection attributes for variables of the root of trust described above and that the programmer has figured out in Step S1101 may be given as initial values. Subsequently, when the determination of the protection attributes is failed (No in Step S1202) as a result of the protection attribute determination processing, even if the data flow is correctly described in accordance with the specification of the security protocol, since the programmer has added extra variables or data flows for implementation, it is considered that confidential information is returned or leaked out to the outside, or that variables that should be protected are tainted with untrustful inputs.

When the protection attributes are successfully determined (Yes in Step S1202), the information processing device 1 rewrites the program list of the target program. When the function modification described in the first to third embodiments described above is performed, the information processing device 1 rewrites the program list in accordance with the modification and at the same time adds the protection attributes that are automatically determined for respective variables to the program list (Step S1203). FIG. 36 is a diagram illustrating an example in which the program list of the pseudo program illustrated in FIG. 11 is rewritten. In the figure, it is illustrated that protection attributes are added to a parameter in line 6 and variables in line 8 to line 13, and the security verification function by the function modification is defined in line 15 to line 23. The definition portion of this function needs not be shown to a user, and may be separately provided as the new security verification function. Finally, the information processing device 1 compiles the program produced by rewriting the program list in Step S1203 (Step S1204). As a result, an executable format program is generated which stores data appropriately in the protected memory or the non-protected memory in accordance with the protection attributes.

According to the configuration described above, even if a program related to a security protocol is developed by a programmer who has little knowledge of security, the information processing device 1 can automatically determine appropriate protection attributes for each variable. Accordingly, it is possible to improve development environment of a program related to a security protocol.

In the phase 1200, Steps S1201 to S1202 may be performed by the information processing device 1, and Step S1203 and the subsequent processes may be performed by a programmer.

[Modification]

In the above-described respective embodiments described above, various programs executed in the information processing device 1 may be configured to be provided such that they are stored in a computer connected to a network, such as the Internet or the like so as to be downloaded via the network. In addition, the various programs may be configured to be provided in the form of an installable or executable format file as being recorded in a computer readable recording medium, such as a CD-ROM, a flexible disk (FD), a CD-R, a digital versatile disk (DVD), or the like.

In the above-described respective embodiments, as the basic protection attribute determination processing performed in Step S4 of FIG. 12, protection attributes for the partial data flows obtained through the division are sequentially determined. However, this basic protection attribute determination processing is not limited to those of the embodiments. For example, a method can be considered which obtains protection attributes by converting the data flow into a logical formula and applying a solving algorithm of the logical formula thereof. The method of conversion to the logical formula can be easily inferred from the conversion to the logical formula in an NP problem, and many solving algorithms for logical formula are suggested.

An overview thereof will be described using an example of the data flow illustrated in FIG. 15. First of all, logical variables corresponding to each protection attributes are prepared for all variables and all arguments appearing in the partial data flows. For example, for the case of "buf" illustrated in FIG. 15, the prepared logical variables are preferably "exposed_buf," "fixed_buf," . . . , and "confidential_buf." Next, logical formulae are generated. The logical formula may be formulated such that, for example, all of the followings (e) to (h) are connected by ^ (a logical symbol that means "and").

(e) expresses a constraint condition with a logical formula that makes the protection attributes identical for each partial data flow. For example, for the case of a partial data flow with the partial data flow number "1" of FIG. 15, this may be expressed as follows: (exposed_#2401_Input(#1)^exposed_ buf^exposed_Cipher_From_A^exposed_#2212_SKDecrypt (#1))(fixed_#2401_Input(#1)^fixed_buf^fixed_Cipher_From_A^fixed_#2212_SKDecrypt(#1)) . . . (confidential_#2401_Input(#1)^ confidential_buf^confidential_Cipher_From_A ^confidential_#2212_SKDecrypt(#1)) ( is a logical symbol that means "or").

(f) expresses a constraint condition with a logical formula for arguments of each security function. For example, in the case of a public key ciphertext decryption function "SKDecrypt," from the input/output constraint in FIGS. 5A and 5B, it may be as follows:
(exposed_#2212_SKDecrypt(#1)^
confidential_#2212_SKDecrypt(#2)^
concealed_#2212_SKDecrypt(#3))
(verified_#2212_SKDecrypt(#1)^
confidential_#2212_SKDecrypt(#2)^
confidential_#2212_SKDecrypt(#3)).

(g) expresses an initial protection attribute of variable. For example, since an initial value of the protection attribute added to, for example, a first argument "#2401_Input(#1)" of a function "Input" is "exposed," it is "exposed_#2401_Input (#1)."

(h) expresses a constraint condition for guaranteeing that each variable has only one protection attribute with a logical formula. For example, in regard to "buf," it is satisfactory that a logical formula that only any one of "exposed_buf," "fixed_buf,"..., and "confidential_buf" is true but the others are false is generated, and this can be easily generated.

If the logical formula of the above procedure is given to a solving algorithm of a logical formula, the solution can be obtained. Next, a logical variable to which the "1" out of the solutions is assigned is searched for, and the protection attribute is determined therefrom. For example, since "1" is assigned to "exposed_buf" in the above example, the protection attribute of "buf" is determined to be "exposed." For this case, it is guaranteed that "0" is assigned to all logical variables ("fixed_buf," "confidential_buf," and the like) corresponding to "buf" except for "exposed_buf" due to the above described condition (g).

In addition, a method of conversion to a more effective logical formula or a method of conversion to other logical formulae can be considered, but those can be easily inferred from the above.

As the security function, each embodiment described above covers the public key ciphertext decryption function, the signature verification function, the common key encryption function, the common key decryption function and the hash function, but is not limited thereto. For example, at least one among a public key encryption function, a secret key encryption function, a common key decryption function, a signature generation function, a MAC generation function, a MAC verification function, and a key derivation function may be covered. The function argument protection attribute of each function is defined, for example, as follows.

In regard to the function argument protection attribute of the public key encryption function, a public key, an argument related to an input to be encrypted, and an argument related to an encrypted output, are defined with integrity protection, with confidentiality protection, and with no protection, respectively; or a public key, an argument related to an input to be encrypted, and an argument related to an encrypted output, are defined with integrity protection, with confidentiality protection and integrity protection, and with integrity protection, respectively.

In regard to the function argument protection attribute of the secret key encryption function, a secret key, an argument related to an input to be encrypted, and an argument related to an encrypted output, are defined with confidentiality protection and integrity protection, with confidentiality protection, and with no protection, respectively; or a secret key, an argument related to an input to be encrypted, and an argument related to an encrypted output, are defined with confidentiality protection and integrity protection, with confidentiality protection and integrity protection, and with integrity protection, respectively.

In regard to the function argument protection attribute of the common key decryption function, a decryption key, an argument related to an input to be decrypted, and an argument related to a decrypted output are defined with confidentiality and integrity protection, with integrity protection, and with confidentiality protection and integrity protection, respectively; or a decryption key, an argument related to an input to be decrypted, and an argument related to a decrypted output are defined with confidentiality protection and integrity protection, with no protection, and with confidentiality protection, respectively.

In regard to the function argument protection attribute of the MAC generation function, a MAC generation key, an argument related to an input of which a MAC is generated, and a MAC are defined with confidentiality protection and integrity protection, with integrity protection, and with integrity protection, respectively; or a MAC generation key, an argument related to an input of which a MAC is generated, and a MAC are defined with confidentiality protection and integrity protection, with confidentiality protection and integrity protection, and with confidentiality protection and integrity protection, respectively.

In regard to the function argument protection attribute of the MAC verification function, a MAC verification key, a message, an argument related to an input which is a MAC, and arguments related to outputs into which the message and the MAC are copied when the verification is successful are defined with confidentiality protection and integrity protection, with confidentiality protection, with confidentiality protection, and with confidentiality and integrity protection, respectively; or a MAC verification key, a message, an argument related to an input which is a MAC, and arguments related to outputs into which the message and the MAC are copied when verification is successful, are defined with confidentiality protection and integrity protection, with no protection, with no protection, and with integrity protection, respectively.

In regard to the function argument protection attribute of the key derivation function, arguments related to inputs and arguments related to outputs are defined with the same protection attribute; arguments related to inputs and arguments related to outputs are defined with confidentiality protection and with no protection, respectively; or arguments related to inputs and arguments related to outputs are defined with confidentiality protection and integrity protection and with integrity protection, respectively.

Further, the dependency relation will be defined as follows. In regard to the common key decryption function, when the determinant set consists of an encrypted output and a decryption key, the dependent attribute is defined as an input to be encrypted. In regard to the key derivation function, when the determinant set consists of inputs, the dependent attribute is defined as two outputs; or when the determinant set consists of one of two outputs, the dependent attribute is defined as a set of an input and the other output of two outputs. In regard to the MAC verification function, when the MAC verification is successful, the determinant set consists of an input and a MAC and the dependent attribute is defined as a verification key; or when the MAC verification is successful, the determinant set consists of a verification key and the dependent attribute is defined as a set of an input and a MAC.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising a memory and a processor,
    wherein, the memory includes:
        a first storage area that stores a plurality of types of security functions each defining therein a protection attribute requiring that, for each argument related to an input and each argument related to an output of data that should be protected, the value of the argument is stored in a protected memory area or a non-protected memory area;
        a second storage area that stores therein a program list, in which the protection attribute added to a variable indicating the memory area to store the data and an execution procedure of a processing using any one or all of the security functions stored in the first storage area, are described; and
        a third storage area that stores function argument protection attributes, which are determined based on the presence or absence of a computational one-wayness property and based on the presence or absence of guarantee of integrity between arguments related to inputs and arguments related to outputs in a computation performed by the security function used in the processing, and dependency relations each of which is defined by a determinant set and a dependent attribute that satisfies a condition that, when, among the arguments used in the security function, values of arguments included in the determinant set are fixed, it is difficult to find two or more kinds of values that can be taken by arguments included in the dependent attribute; and
    wherein, the processor
        detects a combination of a first security function and a second security function where, among the security functions used in the processing, integrity of variables included in a determinant set of one dependency relation in the first security function are verified by the second security function,
        generates a third security function that adds protection attributes guaranteeing integrity, to variables included in a dependent attribute of the dependency relation in the first security function when verification of the second security function is successful and outputs the variables, without changing an action of the processing, and
        updates the function argument protection attribute and the dependency relation concomitantly with an addition of the third security function.

2. The information processing device according to claim 1, wherein, in the program list, a first variable set being a collection of variables of which protection attributes are defined, and a second variable set being a collection of variables of which protection attributes are undefined are described, and
    wherein the processor determines protection attributes of the second variable set based on a description of the first variable set and a procedure of the processing, and on a definition of the function argument protection attribute.

3. The information processing device according to claim 1, wherein, in the protection attribute, as a protection method, any one of no-protection that means protection is not performed, confidentiality protection that means only confidentiality is protected, integrity protection that means only integrity is protected, and confidentiality and integrity protection that means both confidentiality and integrity are protected is defined.

4. The information processing device according to claim 1, wherein, in a public key authentication system or a common key authentication system, the security function is at least one one-way function out of a public key encryption function that performs encryption using a public key, a common key encryption function that performs encryption using a common key, a public key ciphertext decryption function that decrypts a ciphertext which is encrypted using a public key, a common key decryption function that decrypts a ciphertext which is encrypted using a common key, a signature generation function that generates a signature, a MAC generation function that generates a Message Authentication Code (MAC), a signature verification function that verifies a signature, a MAC verification function, a hash function, and a key derivation function.

5. The information processing device according to claim 4, wherein, regarding the function argument protection attribute of the public key encryption function,
    the public key, an argument related to an input to be encrypted, and an argument related to an encrypted output are defined with integrity protection, with confidentiality protection, and with no protection, respectively; or
    the public key, an argument related to an input to be encrypted, and an argument related to an encrypted output are defined with integrity protection, with confidentiality protection and integrity protection, and with integrity protection, respectively.

6. The information processing device according to claim 4, wherein, regarding the function argument protection attribute of the secret key encryption function,
    the secret key, an argument related to an input to be encrypted, and an argument related to an encrypted output are defined with confidentiality protection and integrity protection, with confidentiality protection, and with no protection, respectively; or
    the secret key, an argument related to an input to be encrypted, and an argument related to an encrypted output are defined with confidentiality protection and integrity protection, with confidentiality protection and integrity protection, and with integrity protection, respectively.

7. The information processing device according to claim 4, wherein, regarding the function argument protection attribute of the public key ciphertext decryption function,
    a decryption key, an argument related to an input to be decrypted, and an argument related to a decrypted output are defined with confidentiality and integrity protection, with integrity protection, and with confidentiality protection and integrity protection, respectively; or a decryption key, an argument related to an input to be decrypted, and an argument related to a decrypted output are defined with confidentiality protection and integrity protection, with no protection, and with confidentiality protection, respectively.

8. The information processing device according to claim 4, wherein, regarding the function argument protection attribute of the common key decryption function, a decryption key, an argument related to an input to be decrypted, and an argument related to a decrypted output are defined with confidentiality and integrity protection, with integrity protection, and with confidentiality protection and integrity protection, respectively; or a decryption key, an argument related to an input to be decrypted, and an argument related to a decrypted output are defined with confidentiality protection and integrity protection, with no protection, and with confidentiality protection, respectively.

9. The information processing device according to claim 4, wherein, regarding the function argument protection attribute of the signature generation function, a generation key of the signature, an argument related to an input of which a signature is generated, and a signature which is an argument related to an output are defined with confidentiality protection and integrity protection, with integrity protection, and with integrity protection, respectively; or a generation key of the signature, an argument related to an input of which a signature is generated, and a signature which is an argument related to an output are defined with confidentiality protection and integrity protection, with confidentiality protection and integrity protection, and with confidentiality protection and integrity protection, respectively.

10. The information processing device according to claim 4, wherein, regarding the function argument protection attribute of the MAC generation function, a generation key of the MAC, an argument related to an input of which a MAC is generated, and a MAC that is an argument related to an output are defined with confidentiality protection and integrity protection, with integrity protection, and with integrity protection, respectively; or a generation key of the MAC, an argument related to an input of which a MAC is generated, and a MAC that is an argument related to an output are defined with confidentiality protection and integrity protection, with confidentiality protection and integrity protection, and with confidentiality protection and integrity protection, respectively.

11. The information processing device according to claim 4, wherein, regarding the function argument protection attribute of the MAC verification function, a verification key of the MAC, a message, and an argument related to an input of a MAC are defined with confidentiality protection and integrity protection, with confidentiality protection, and with confidentiality protection, respectively, and arguments related to outputs into which a message and a MAC are copied are defined with confidentiality and integrity protection when a verification is successful; or a verification key of the MAC, a message, and an argument related to an input of a MAC are defined with confidentiality protection and integrity protection, with no protection, and with no protection, respectively, and arguments related to outputs into which the message and the MAC are copied are defined with integrity protection when a verification is successful.

12. The information processing device according to claim 4, wherein, regarding the function argument protection attribute of the signature verification function, a verification key of the signature, a message, and a signature are defined with integrity protection, with confidentiality protection, and with confidentiality protection, respectively, and arguments related to outputs into which a message and a signature are copied are defined with confidentiality protection and integrity protection when a verification is successful;

a verification key of the signature, a message, and a signature are defined with integrity protection, with no protection, and with no protection, respectively, and arguments related to outputs into which a message and a signature are copied are defined with integrity protection when a verification is successful; or a verification key of the signature, a message, and a signature are defined with confidentiality protection and integrity protection, with confidentiality protection, and with no protection, respectively, and arguments related to outputs into which a message and a signature are copied are defined with confidentiality protection and integrity protection when a verification is successful.

13. The information processing device according to claim 4, wherein, regarding the function argument protection attribute of the hash function, protection attributes of an arguments related to inputs and protection attributes of arguments related to outputs are identically defined;

arguments related to inputs are defined with confidentiality protection and arguments related to outputs are defined with no protection; or arguments related to inputs are defined with confidentiality protection and integrity protection and arguments related to outputs are defined with integrity protection.

14. The information processing device according to claim 4, wherein, regarding the function argument protection attribute of the key derivation function, protection attributes of arguments related to inputs and protection attributes of arguments related to outputs are identically defined;

arguments related to inputs are defined with confidentiality protection and arguments related to outputs are defined with no protection; or arguments related to inputs are defined with confidentiality protection and integrity protection and arguments related to outputs are defined with integrity protection.

15. The information processing device according to claim 2, wherein, in the program list, further non-security functions in which the protection attributes for arguments related to inputs and arguments related to outputs of the data are all identical, are described, wherein, the function argument protection attribute of the non-security function is defined such that protection attributes of arguments of inputs and protection attributes of arguments of outputs are identical, and wherein the processor determines a protection attribute of the second variable set, based on a description of a procedure of the processing and the first variable set and a definition of the function argument protection attributes related to each of the security function and the non-security function.

16. The information processing device according to claim 4,
wherein, regarding a dependency relation of the public key ciphertext decryption function, when a determinant set consists of an encrypted output and a decryption key, a dependent attribute is defined as being an input to be encrypted.

17. The information processing device according to claim 4,
wherein, regarding a dependency relation of the common key decryption function, when a determinant set consists an encrypted output and a decryption key, a dependent attribute is defined as being an input to be encrypted.

18. The information processing device according to claim 4,
wherein, regarding a dependency relation of the hash function,
when a determinant set consists of inputs, a dependent attribute is defined as being a set of outputs; or
when a determinant set consists of outputs, a dependent attribute is defined as being a set of inputs.

19. The information processing device according to claim 4,
wherein, regarding a dependency relation of the key derivation function,
when a determinant set consists of inputs, a dependent attribute is defined as being a set of two outputs; or
when a determinant set consists of one of two outputs, a dependent attribute is defined as being a set of an input and the other of two outputs.

20. The information processing device according to claim 4,
wherein, regarding a dependency relation of the MAC verification function, in a case in which a MAC is successfully verified,
when a determinant set consists of an input and a MAC, a dependent attribute is defined as being a verification key; or
when a determinant set consists of a verification key, a dependent attribute is defined as being a set of an input and a MAC.

21. The information processing device according to claim 1,
wherein the processor generates a data flow showing functions including the security function, and associations between inputs of the functions and outputs of the functions by analyzing the program list, and
wherein the processor detects a combination of the first security function and the second security function from the functions shown in the data flow, the combination satisfying that integrity of a variables included in a determinant set of the one dependency relation of the first security function are verified by the second security function.

22. The information processing device according to claim 21,
wherein the processor generates the third security function by composing the first security function and the second security function without changing an action of the processing when the verification of the second security function is successful, and wherein the processor deletes the first security function and the second security function from the data flow, and adds the third security function to the data flow.

23. The information processing device according to claim 21,
wherein the processor generates the third security function by modifying the second security function without changing an action of the processing when the verification of the second security function is successful, and
wherein the processor deletes the second security function from the data flow and adds the third security function to the data flow.

24. The information processing device according to claim 21,
wherein the processor updates the data flow concomitantly with an addition of the third security function.

25. The information processing device according to claim 21,
wherein the processor deletes variables which are not input or output of functions other than the third security function with respect to the data flow.

26. The information processing device according to claim 2,
wherein the processor judges whether or not protection attributes of all arguments related to input and all arguments related to output of the security function match protection attributes of types of a security function associated with the security function stored in the first storage area, and
wherein the processor outputs error information indicating mismatching when mismatching is reported as a result of the judgment.

27. The information processing device according to claim 26,
wherein the processor generates a data flow showing a function including the security function and associations between inputs of the functions and outputs of the functions by analyzing the program list,
wherein the processor converts the data flow into a logical formula,
wherein the processor determines the protection attribute of the second variable set by using logical variables to which solutions, obtained by applying a solving algorithm for the logical formula, are assigned.

28. A program developing device that generates an executable format program that is executable by a computer from a program list described by a user, the program developing device comprising a memory and a processor,
wherein, in an information processing device in which the executable format program is executed, an access to both a first memory area where writing and reading from a program other than the executable format program is allowed and a second memory area where writing and reading from a program other than the executable format program is prohibited is allowed,
wherein, the memory
stores a plurality of types of security functions each defining therein a protection attribute requiring that, for each argument related to an input and each argument related to an output of data to be protected, a value of the argument is stored in a second memory area when a value of the argument needs to be protected or a value of the argument is stored in a first memory area when a value of the argument needs not be protected, and wherein the processor
receives input of a program list in which an execution procedure of a processing using any one or all of security functions stored in the memory is described and the protection attribute added to a variable representing the memory area in which the data to be stored is described,
receives input of a function argument protection attribute determined based on the presence or absence of guarantee of integrity and the presence or absence of a computational one-wayness property between arguments related to inputs and arguments related to outputs in a computation performed by a security function used in the processing, and receives input of dependency relations each of which defined by a determinant set and a dependent attribute that satisfies a condition that, when, among arguments used in the function, values of arguments included in the determinant set are fixed, it is difficult to find two or more kinds of values that can be taken by arguments included in the dependent attribute,
generates a data flow showing a function including the security function, and associations between inputs of the function and outputs of the function by analyzing the program list,
detects a combination of a first security function and a second security function where, among the security functions used in the processing, integrity of variables included in a determinant set of one dependency relation in the first security function are verified by the second security function,
generates a third security function that adds protection attributes guaranteeing integrity, to variables included in a dependent attribute of the dependency relation in the first security function when verification of the second security function is successful and outputs the variables, without changing an action of the processing,
updates the function argument protection attribute and the dependency relation concomitantly with an addition of the third security function,
determines protection attributes of arguments related to inputs and arguments related to outputs of the security function described in the program list based on protection attributes of the variable,
judges whether or not protection attributes of all arguments related to input and all arguments related to output of the security function match protection attributes of types of a security function associated with the security function stored in the first storage area,
rewrites the program list in such a manner that each variable is stored in the memory based on the protection attribute added to the variable, and at the same time the processing to be performed in accordance with memory area in which each variable is stored is described, based on the updated data flow when matching is reported as a result of the judgment, and generates the executable format program from the program list by compiling the rewritten program list.

29. A program verification method that is executed in an information processing device including a memory and a processor, in which the memory stores therein
a plurality of types of security functions each defining therein a protection attribute requiring that, for each argument related to an input and each argument related to an output of data that should be protected, the value of the argument is stored in a protected memory area or a non-protected memory area,
a program list, in which the protection attribute added to a variable indicating the memory area to store the data and an execution procedure of a processing using any one or all of the security functions stored in the first storage area, are described, and
function argument protection attributes, which are determined based on the presence or absence of a computational one-wayness property and based on the presence or absence of guarantee of integrity between arguments related to inputs and arguments related to outputs in a computation performed by the security function used in the processing, and dependency relations each of which is defined by a determinant set and a dependent attribute that satisfies a condition that, when, among the arguments used in the security function, values of arguments included in the determinant set are fixed, it is difficult to find two or more kinds of values that can be taken by arguments included in the dependent attribute, the method comprising:
causing the processor to detect a combination of a first security function and a second security function where, among the security functions used in the processing, integrity of variables included in a determinant set of one dependency relation in the first security function are verified by the second security function;
causing the processor to generate a third security function that adds protection attributes guaranteeing integrity, to variables included in a dependent attribute of the dependency relation in the first security function when verification of the second security function is successful and outputs the variables, without changing an action of the processing; and
causing the processor to update the function argument protection attribute and the dependency relation concomitantly with an addition of the third security function.

30. A non-transitory computer readable medium having computer-readable instructions stored therein, the instructions when executed by a computer, cause the computer to perform the program verification method of claim 29.

* * * * *